US011202250B2

(12) United States Patent
Li et al.

(10) Patent No.: US 11,202,250 B2
(45) Date of Patent: Dec. 14, 2021

(54) COMMUNICATION METHOD FOR REDUCING DELAY IN AN IDLE OR INACTIVE MODE AND DEVICE THEREOF

(71) Applicant: HUAWEI TECHNOLOGIES CO., LTD., Shenzhen (CN)

(72) Inventors: Meng Li, Beijing (CN); Qiang Deng, Shenzhen (CN); Zhenglei Huang, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 14 days.

(21) Appl. No.: 16/569,735

(22) Filed: Sep. 13, 2019

(65) Prior Publication Data

US 2020/0008137 A1 Jan. 2, 2020

Related U.S. Application Data

(63) Continuation of application No. PCT/CN2017/077388, filed on Mar. 20, 2017.

(51) Int. Cl.
*H04W 48/16* (2009.01)
*H04W 76/11* (2018.01)
(Continued)

(52) U.S. Cl.
CPC ............ *H04W 48/16* (2013.01); *H04W 8/08* (2013.01); *H04W 8/245* (2013.01);
(Continued)

(58) Field of Classification Search
CPC ....... H04W 48/16; H04W 76/11; H04W 8/08; H04W 8/245; H04W 64/006;
(Continued)

(56) References Cited

U.S. PATENT DOCUMENTS

2017/0251357 A1 8/2017 Iwai et al.
2017/0295557 A1 10/2017 Chamarty et al.
(Continued)

FOREIGN PATENT DOCUMENTS

CA 2879201 A1 4/2014
CN 101287169 A 10/2008
(Continued)

OTHER PUBLICATIONS

3GPP TS 36.401 V8.6.0 (Jul. 2009) LTE; Evolved Universal Terrestrial Radio Access Network (E-UTRAN); Architecture description (3GPP TS 36.401 version 8.6.0 Release 8) (Year: 2009).*
(Continued)

*Primary Examiner* — Justin T Van Roie
(74) *Attorney, Agent, or Firm* — Maier & Maier, PLLC

(57) ABSTRACT

A communication method, including, when a terminal device is in an idle mode or an inactive mode, a first control plane functional entity that obtains access network information of the terminal device and sends context information of the terminal device to an access network device corresponding to the access network information. Therefore, when the terminal device is in the idle mode or the inactive mode, the first control plane functional entity obtains the access network information of the terminal device and pre-sends the context information of the terminal device to the access network device corresponding to the access network information. When the terminal device needs to transmit data, the terminal device does not need to wait for the process of transmitting the context information of the terminal device, thereby facilitating reducing a delay.

18 Claims, 21 Drawing Sheets

(51) Int. Cl.
   *H04W 8/08*   (2009.01)
   *H04W 8/24*   (2009.01)
   *H04W 64/00*  (2009.01)
   *H04W 80/10*  (2009.01)

(52) U.S. Cl.
   CPC .......... *H04W 64/006* (2013.01); *H04W 76/11* (2018.02); *H04W 80/10* (2013.01)

(58) Field of Classification Search
   CPC ..... H04W 80/10; H04W 48/20; H04W 76/27; H04W 52/0203; Y02D 30/70
   See application file for complete search history.

(56) References Cited

U.S. PATENT DOCUMENTS

| | | |
|---|---|---|
| 2017/0347389 A1 | 11/2017 | Cho et al. |
| 2018/0249408 A1 | 8/2018 | Yi et al. |
| 2019/0021130 A1* | 1/2019 | Kim ..................... H04W 76/20 |

FOREIGN PATENT DOCUMENTS

| | | |
|---|---|---|
| CN | 101815281 A | 8/2010 |
| CN | 103634849 A | 3/2014 |
| CN | 103687055 A | 3/2014 |
| CN | 104737619 A | 6/2015 |
| CN | 105592533 A | 5/2016 |
| EP | 1954083 A1 | 8/2008 |
| WO | 2016/035230 A1 | 3/2016 |
| WO | 2016/064142 A1 | 4/2016 |
| WO | 2016/077762 A1 | 5/2016 |
| WO | WO-2017126928 A1 * | 7/2017 .......... H04W 72/042 |

OTHER PUBLICATIONS

3GPP TR 23.799 V14.0.0, "3rd Generation Partnership Project; Technical Specification Group Services and System Aspects; Study on Architecture for Next Generation System (Release 14)", Dec. 2016, total 522 pages.

CATT. "UL small data transmission in inactive state." 3GPP TSG-RAN WG3 #Ad-hoc R3-170073. Spokane, Washington, USA. Jan. 17-19, 2017. 3 pages.

* cited by examiner

COMMUNICATION METHOD FOR REDUCING DELAY IN AN IDLE OR INACTIVE MODE AND DEVICE THEREOF

CROSS-REFERENCE TO RELATED APPLICATIONS

This application is a continuation of International Application No. PCT/CN2017/077388, filed on Mar. 20, 2017, the disclosure of which is hereby incorporated by reference in its entirety.

FIELD

Embodiments of this application relate to the communications field, and more particularly, to a communication method and a device thereof.

BACKGROUND

A power capacity of a terminal device is usually limited. Therefore, when the terminal device has no data to be transmitted, the terminal device is switched from a radio resource control connected (RRC Connected) mode to a radio resource control idle (RRC-Idle) mode or a radio resource control inactive mode, to reduce power consumption of the terminal device. The radio resource control connected mode is referred to as a connected mode for short, the radio resource control idle mode is referred to as an idle mode for short, and the radio resource control connected inactive mode is referred to as an inactive mode for short.

In a case when the terminal device in the idle mode sends or receives data, some resources previously released when the terminal device is switched from the connected mode to the idle mode are resumed, for example, a bearer is re-set up, and a connection is resumed. Although introduction of the idle mode can reduce the power consumption of the terminal device, when the terminal device is switched from the idle mode to the connected mode, a network device needs to obtain context information of the terminal device. Consequently, an additional delay is caused.

In another case, when the terminal device is in the inactive mode, if the terminal device is switched from the inactive mode to the connected mode, the network device also needs to obtain the context information of the terminal device. Consequently, the additional delay is also caused.

Therefore, how to reduce a delay when a terminal device is switched from an idle mode or an inactive mode to a connected mode is a current technical problem that needs to be resolved urgently.

SUMMARY

Embodiments of this application provide a communication method to reduce a delay caused when a terminal device is switched to a connected mode.

According to a first aspect, a communication method is provided. The method includes: obtaining, by a first control plane functional entity, access network information of a terminal device, where the terminal device is in an idle mode or an inactive mode; and sending, by the first control plane functional entity, context information of the terminal device to an access network device based on the access network information.

Therefore, when the terminal device is in the idle mode or the inactive mode, in this embodiment of this application, the first control plane functional entity obtains the access network information of the terminal device, and pre-sends the context information of the terminal device to the access network device corresponding to the access network information. When the terminal device needs to transmit data, the terminal device needs to be switched from the idle mode or the inactive mode to a connected mode, the terminal device does not need to wait for a process of transmitting the context information of the terminal device, thereby facilitating reducing a delay.

With reference to the first aspect, in a first possible implementation of the first aspect, the context information of the terminal device includes: user plane context information of the terminal device and control plane context information of the terminal device.

Optionally, in an implementation of this application, the context information of the terminal device may include only the control plane context information of the terminal device.

It should be understood that the control plane context information and the user plane context information may be carried in a same message, or may be carried in different messages, and when the control plane context information and the user plane context information are carried in different messages, an execution order of the two messages is not limited in this implementation of this application.

With reference to any one of the first aspect and the foregoing implementation of the first aspect, in a second possible implementation of the first aspect, the method further includes: receiving, by the first control plane functional entity, first identification information and second identification information that are sent by the access network device, where the first identification information is used to identify a connection between the access network device and the first control plane functional entity; and the second identification information is used to identify a connection between the access network device and a user plane functional entity. Therefore, the first control plane functional entity obtains the first identification information and the second identification information that are sent by the access network device, to pre-set up a first connection between the access network device and the first control plane functional entity based on the first identification information, and pre-set up a second connection between the access network device and the user plane functional entity based on the second identification information, so that when the terminal device has needs to transmit data, the terminal device can perform communication by using the set-up connection without waiting for a connection setup process, thereby facilitating reducing the delay.

With reference to any one of the first aspect and the foregoing implementations of the first aspect, in a third possible implementation of the first aspect, the method further includes: sending an update request message to the user plane functional entity, where the update request message includes the second identification information; and receiving an update response message sent by the user plane functional entity.

For example, the first control plane functional entity sends the update request message to the user plane functional entity, so that the user plane functional entity obtains the second identification information sent by the access network device, to set up the second connection between the user plane functional entity and the access network device.

With reference to any one of the first aspect and the foregoing implementations of the first aspect, in a fourth possible implementation of the first aspect, the method further includes: the obtaining, by a first control plane functional entity, access network information of a terminal device includes: receiving, by the first control plane functional entity, the access network information of the terminal device from a network capability exposure functional entity or a second control plane functional entity; or receiving, by the first control plane functional entity, location prediction information of the terminal device from a network capability exposure functional entity or a second control plane functional entity, and obtaining the access network information of the terminal device based on the location prediction information.

It should be understood that when the first control plane functional entity receives the access network information of the terminal device or the location prediction information of the terminal device from the second control plane functional entity, the second control plane functional entity also obtains the access network information of the terminal device or the location prediction information of the terminal device by receiving a message sent by the network capability exposure functional entity.

With reference to any one of the first aspect and the foregoing implementations of the first aspect, in a fifth possible implementation of the first aspect, when the terminal device is in the inactive mode, the method further includes: obtaining, by the first control plane functional entity, the context information of the terminal device from the access network device on which the terminal device currently camps.

With reference to any one of the first aspect and the foregoing implementations of the first aspect, in a sixth possible implementation of the first aspect, the method further includes: obtaining, by the first control plane functional entity, current location information of the terminal device or information about an access network device to which the terminal device connects when the terminal device is switched to the connected mode.

It should be understood that the access network information may include identification information and/or cell identification information of the access network device.

With reference to any one of the first aspect and the foregoing implementations of the first aspect, in a seventh possible implementation of the first aspect, the method further includes: sending, by the first control plane functional entity, a feedback message to the network capability exposure functional entity, where the feedback message includes the current location information of the terminal device or the information about the access network device to which the terminal device connects when the terminal device is switched to the connected mode.

Therefore, the network capability exposure functional entity can further optimize, based on the feedback message sent by the control plane functional entity, prediction the access network device to which the terminal device may connect when the terminal device is switched to the connected mode, to improve accuracy of the connection that is pre-set up.

According to a second aspect, a communication method is provided. The method includes: receiving, by an access network device, context information of a terminal device that is sent by a first control plane functional entity, where the terminal device is in an idle mode or an inactive mode; and transmitting, by the access network device, data with the terminal device based on the context information of the terminal device.

With reference to the second aspect, in a first possible implementation of the second aspect, the method further includes: sending first identification information and second identification information to the first control plane functional entity, where the first identification information includes identification information of a connection between the access network device and the first control plane functional entity, and the second identification information includes identification information of a connection between the access network device and a user plane functional entity.

With reference to any one of the second aspect and the foregoing implementation of the second aspect, in a second possible implementation of the second aspect, the method further includes: sending, by the access network device, current location information of the terminal device or information about the access network device to the first control plane functional entity.

Therefore, when the terminal device is in the idle mode or the inactive mode, in this embodiment of this application, the first control plane functional entity obtains the access network information of the terminal device, and pre-sends the context information of the terminal device to the access network device corresponding to the access network information. When the terminal device needs to transmit data, the terminal device needs to be switched from the idle mode or the inactive mode to a connected mode, the terminal device does not need to wait for a process of transmitting the context information of the terminal device, thereby facilitating reducing a delay.

According to a third aspect, a core network device is provided. The core network device is configured to perform the method according to any one of the first aspect or the possible implementations of the first aspect. For example, the core network device includes units configured to perform the method according to any one of the first aspect or the possible implementations of the first aspect.

According to a fourth aspect, an access network device is provided. The access network device is configured to perform the method according to any one of the second aspect or the possible implementations of the second aspect. For example, the access network device includes units configured to perform the method according to any one of the second aspect or the possible implementations of the second aspect. According to a fifth aspect, a core network device is provided. The core network device includes a transceiver, a memory, a processor, and a bus system. The transceiver, the memory, and the processor are connected to each other by using the bus system. The memory is configured to store an instruction. The processor is configured to execute the instruction stored in the memory, to control the transceiver to send and/or receive a signal. In addition, when the processor executes the instruction stored in the memory, the execution enables the processor to perform the method according to any one of the first aspect or the possible implementations of the first aspect.

According to a sixth aspect, an access network device is provided. The access network device includes a transceiver, a memory, a processor, and a bus system. The transceiver, the memory, and the processor are connected to each other by using the bus system. The memory is configured to store an instruction. The processor is configured to execute the instruction stored in the memory, to control the transceiver to send and/or receive a signal. In addition, when the processor executes the instruction stored in the memory, the execution enables the processor to perform the method according to any one of the second aspect or the possible implementations of the second aspect.

According to a seventh aspect, a computer-readable medium is provided. The computer-readable medium is configured to store a computer program, and the computer program includes an instruction used to perform the method according to any one of the first aspect or the possible implementations of the first aspect.

According to an eighth aspect, a computer-readable medium is provided. The computer-readable medium is configured to store a computer program, and the computer program includes an instruction used to perform the method according to any one of the second aspect or the possible implementations of the second aspect.

DETAILED DESCRIPTION OF EMBODIMENTS

The following describes technical solutions of embodiments in this application with reference to accompanying drawings.

In the embodiments of this application, a terminal device may be user equipment (UE), an access terminal, a subscriber unit, a subscriber station, a mobile station, a mobile console, a remote station, a remote terminal, a mobile device, a user terminal, a wireless communications device, a user agent, or a user apparatus. An access terminal may be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, an in-vehicle device, a wearable device, or a terminal device in a future 5G network.

Further, in the embodiments of this application, an access network device may be a network device configured to communicate with the terminal device. For example, the access network device may be a base station (BTS) in a GSM system or CDMA, or a NodeB (NB) in a WCDMA system, or a base station (Evolutional Node B, eNB or eNodeB) in an LTE system. Alternatively, the access network device may be a relay station, an access point, an in-vehicle device, a wearable device, or a network side device in a future 5G network, for example, a next generation radio access network (NG-(R)AN).

Figure 1:
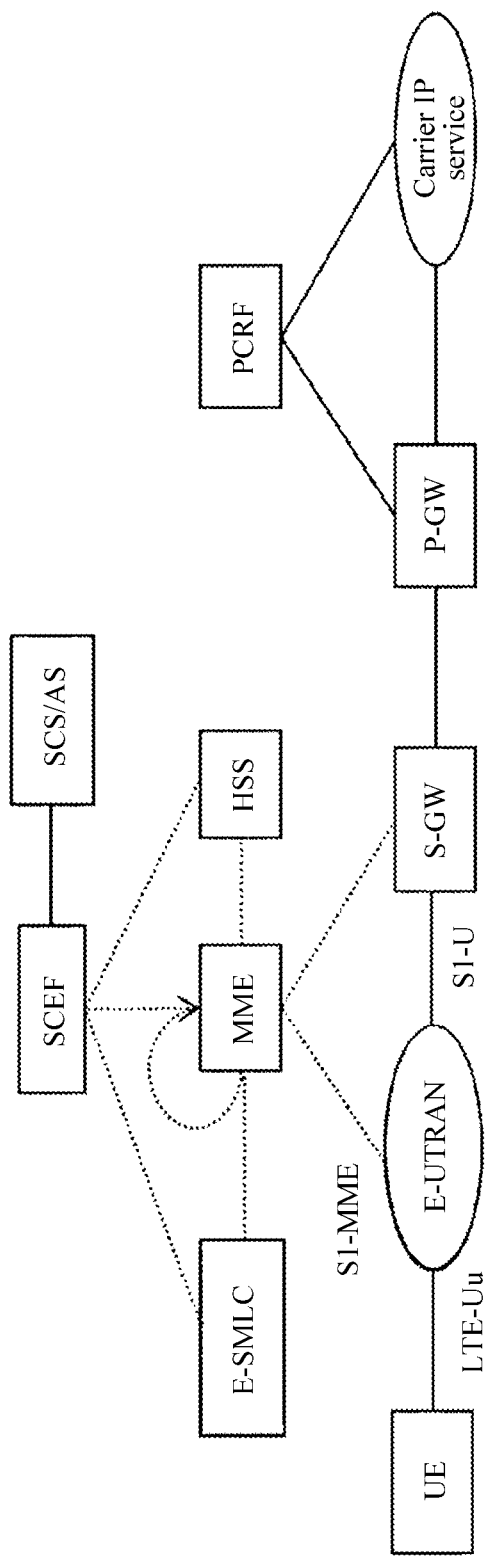
FIG. 1 is a schematic architectural diagram of an application scenario according to an embodiment of this application.
Figure 2:
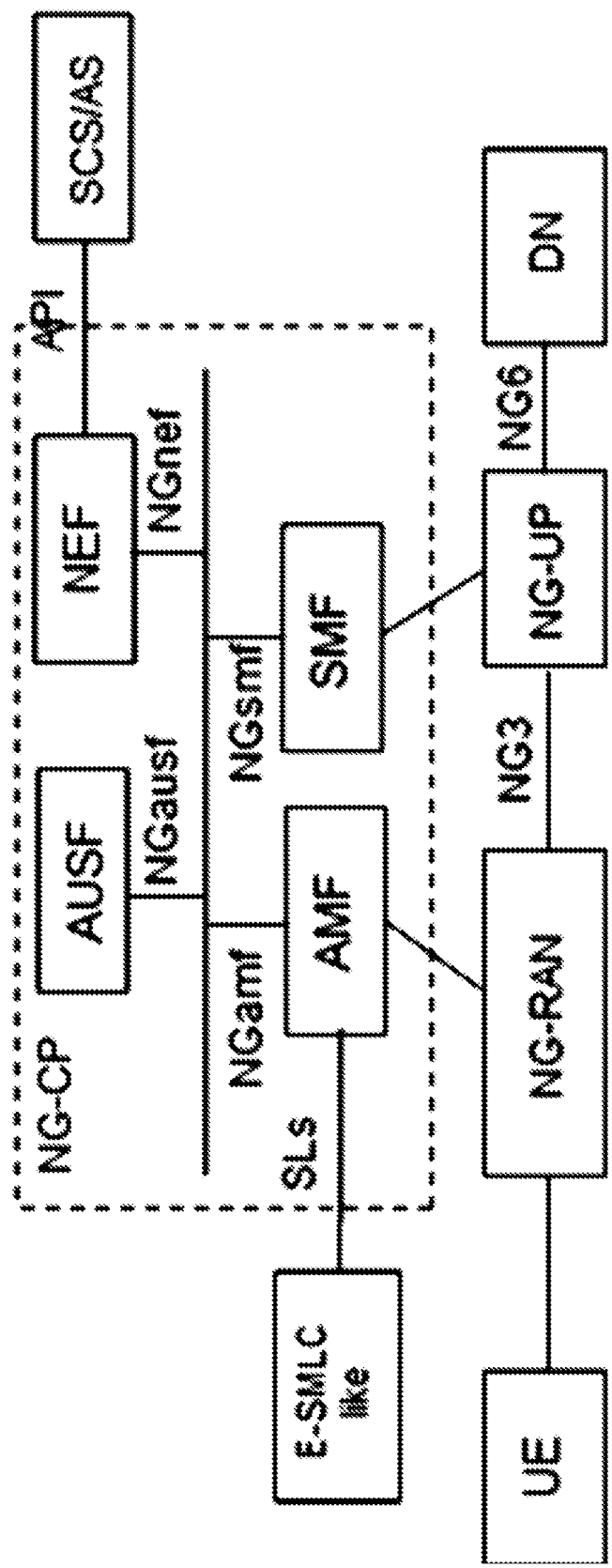
FIG. 2 is a schematic architectural diagram of an application scenario according to another embodiment of this application.

First, in this application, schematic diagrams of application scenarios according to embodiments of this application are introduced with reference to FIG. 1 and FIG. 2. For example, network elements in the embodiments of this application are as follows:

a service capability server (SCS), configured to: implement service logic, and provide application layer information to a user. An application server (AS), configured to: implement service logic, and provide application layer information to a user;

a service capability exposure function (SCEF) entity, used for authentication and granting, supporting an external entity in discovering a network, policy execution, cross-operator accounting, an external entity interconnection-related function, and the like;

a network exposure function (NEF) entity, configured to securely open up, to the outside, a service and a capability that are provided by a 3rd generation partnership project (3GPP) network function;

an access management function (Access and Mobility Management Function, AMF) entity, where main functions of the AMF entity include being served as a termination point of a radio access network control plane, being served as a termination point of non-access signaling, mobility management, lawful interception, access granting or authorization, and the like;

a session management function (SMF) entity, used for session management, IP address assignment and management, selecting a manageable user plane function, downlink data notification, policy control, served as a charging function interface termination point, and the like;

a next generation user plane (NG-UP) entity, used for packet routing and transferring, user plane data quality of service (QoS) processing, and the like;

a mobility management entity (MME), used for core network control plane management, where main functions of the MME include mobility management, session management, access control, network element selection, user context storage, and the like; and an evolved serving mobile location center (E-SMLC) entity, providing information related to a terminal device location, and the like.

It should be understood that in this application, an RRC-connected mode may also be referred to as an RRC connected mode or a connected mode, and an RRC-idle mode may also be referred to as an RRC idle mode or an idle mode. This is not limited in this application.

It should be further understood that all of the RAN, the NG-(R)AN, and the (R)AN that are described in this application are network side devices in a 5G network, and they can be replaced with each other in descriptions of the embodiments. FIG. 1 is a schematic architectural diagram of an application scenario according to an embodiment of this application. FIG. 1 shows a 4G system in a service capability exposure architecture applied to a 3GPP system. First, data sent by the SCS/AS is transmitted to the SCEF by using an API interface. Afterwards, the SCEF interacts with a home subscriber server (HSS) to verify whether the SCS/AS is granted. Then, the SCEF sends the data to the MME by using a T6a interface, to perform network-related control and optimization.

In FIG. 1, the HSS is a server configured to store user subscription information, and is mainly responsible for managing user subscription data and mobile user location information.

A service gateway (Serving GateWay, S-GW) belongs to a user plane functional entity; is responsible for user plane data routing processing, terminating downlink data sending of a terminal device in an idle mode, and managing and storing system architecture evolution (System Architecture Evolution, SAE) context information of a terminal device; and is an anchor of a user plane in the 3GPP system.

A packet data network gateway (P-GW) is a gateway responsible for enabling a terminal device to access a packet data network (Packet Data Network, PDN). The P-GW allocates an IP address to the terminal device, and is also a mobility anchor of 3GPP and non-3GPP access systems.

A policy and charging rules function (PCRF) entity includes a policy control decision function and a flow based charging control function.

An evolved universal terrestrial radio access network (E-UTRAN) includes an eNB, and provides a radio resource for a terminal device to access a network, to provide higher uplink and downlink rates, a lower transmission delay, and more reliable wireless transmission.

An S1-MME is a control plane interface between the eNB and the MME, and is configured to: control a bearer and a connection between a terminal device and a network, and control sending of a non-access stratum (NAS) message. An S1-U is a reference point of a user plane between the eNB and the S-GW, and provides transmission of a packet data unit of the user plane between the eNB and the S-GW through a tunnel. An LTE-Uu is a wireless connection interface between the terminal device and the eNB.

It should be understood that names of the foregoing connections are merely examples, and this embodiment of this application is not limited thereto.

FIG. 2 is a schematic architectural diagram of an application scenario according to another embodiment of this application. As shown in FIG. 2, in a 5G system, data sent by the SCS/AS is transmitted to the network exposure function (NEF) entity. Afterwards, the NEF entity interacts with an authentication server function (AUSF) entity to verify whether the SCS/AS is granted, and then the NEF sends the data to the AMF and the SMF, to perform network-related control and optimization.

In FIG. 2, the NEF entity is configured to securely open up, to the outside, a service, a capability, and the like that are provided by a 3GPP network function.

Main functions of a next generation user plane (NG-UP) entity include packet routing and transferring, user plane data QoS processing, and the like.

A next-generation (radio) access network Next Generation-((Radio) Access Network, (R)AN) provides a network resource for access of a terminal.

Main functions of the AUSF entity include user authentication and the like.

A data network is a network configured to transmit data, for example, the Internet.

An N2 interface is a reference point between the (R)AN and a core network control plane, and is configured to send an NAS message, and the like. An N3 interface is a reference point of a user plane between the (R)AN and the NG-UP entity, and is configured to transmit data of the user plane, and the like.

It should be understood that names of the foregoing connections are merely examples, and this embodiment of this application is not limited thereto.

Figure 3:
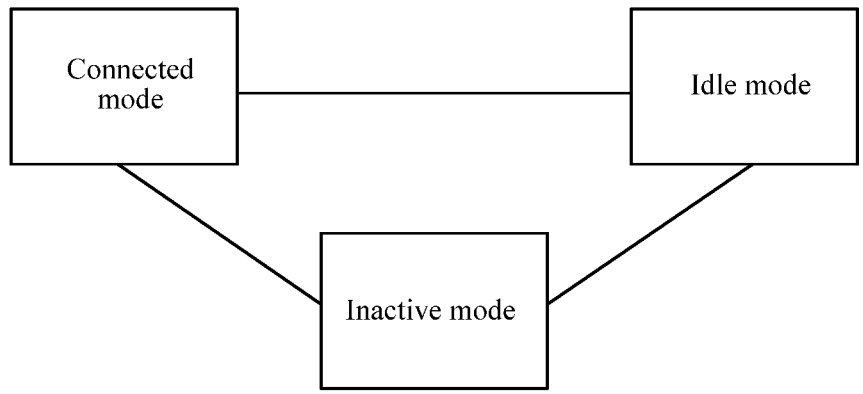
FIG. 3 is a schematic diagram of a mode switching relationship of a terminal device.

FIG. 3 is a schematic diagram of a mode switching relationship of a terminal device. As shown in FIG. 3, when the terminal device attaches a network, the terminal device is switched from an idle mode to a connected mode. Then, in some cases, for example, when the terminal device has not performed data transmission for a long time, the terminal device is switched from the connected mode to the idle mode, and when the terminal device needs to transmit data, the terminal device is switched from the idle mode to the connected mode. In some other cases, for example, when the terminal device is not moved (such as a water meter, an electric meter, a temperature sensor, or a humidity sensor) or the terminal device is moved at a very low rate, the terminal device may be switched to an inactive mode, then when the terminal device needs to transmit data, the terminal device is switched from the inactive mode to the connected mode.

Using an LTE system as an example, if the terminal device is in the inactive mode, an eNB releases an RRC connection and a data radio bearer (DRB) between the terminal device and the eNB without releasing an S1-MME connection between the eNB and an MME and an S1-U connection between the eNB and an S-GW. Therefore, when the terminal device is switched from the inactive mode to the connected mode, only an RRC connection and a DRB need to be set up, so that compared with the process in which the terminal device is switched from the connected mode to the idle mode, a delay caused by setting up a connection between the terminal device and the MME is shortened and a delay caused by setup of a connection between the terminal device and the S-GW is shortened.

However, when the terminal device is switched from the inactive mode to the connected mode, if the terminal device connects to a target base station, a connection retained between a source base station and the MME or a connection retained between a source base station and the S-GW cannot continue to provide a service to the terminal device. Therefore, the terminal device sets up a connection to the MME or the S-GW by using the connected target base station, to transmit data of the terminal device.

For example, when the terminal device is moved out of coverage of the source base station, the terminal device connects to the target base station, and the target base station is directly connected to the source base station (for example, an X2 interface exists). In this case, the target base station requests context information of the terminal device from the source base station, and then the source base station sends the context information of the terminal device to the target base station. Afterwards, the target base station sends a path switching request to the MME, and then the target base station sends a context connection release message to the source base station. In this case, the terminal device successfully connects to the target base station. Therefore, when there is a direct connection between the source base station and the target base station, the source base station needs to always maintain the context information of the terminal device, so that when the target base station sets up a connection to the terminal device, the target base station may obtain the context information of the terminal device from the source base station. Consequently, unnecessary resource consumption is caused.

For another example, when the terminal device is moved out of coverage of the source base station, if there is no direct connection between the target base station and the source base station, the target base station sends context information of the terminal device to the MME, and then the MME forwards the context information of the terminal device to the source base station. After receiving a terminal device context information response sent by the source base station, the MME forwards the context information of the terminal device to the target base station. Afterwards, the target base station sends a path switching request to the MME. After receiving acknowledgment information, the target base station sends terminal device context connection release information to the source base station. In this case, the terminal device successfully connects to a new base station. Therefore, in this solution, a quantity of interaction signaling between a network device and a terminal device is large, network load is heavy, and a delay caused by the connection setup is high.

Based on the foregoing problem, embodiments of this application provide a communication method and a device thereof, to pre-deliver context information of a terminal device before the terminal device needs to transmit data, and further pre-set up a connection to a network device. Therefore, a time required by the terminal device for waiting for context information transmission is reduced, thereby reducing a delay caused by the connection setup, and improving user experience.

Figure 4:
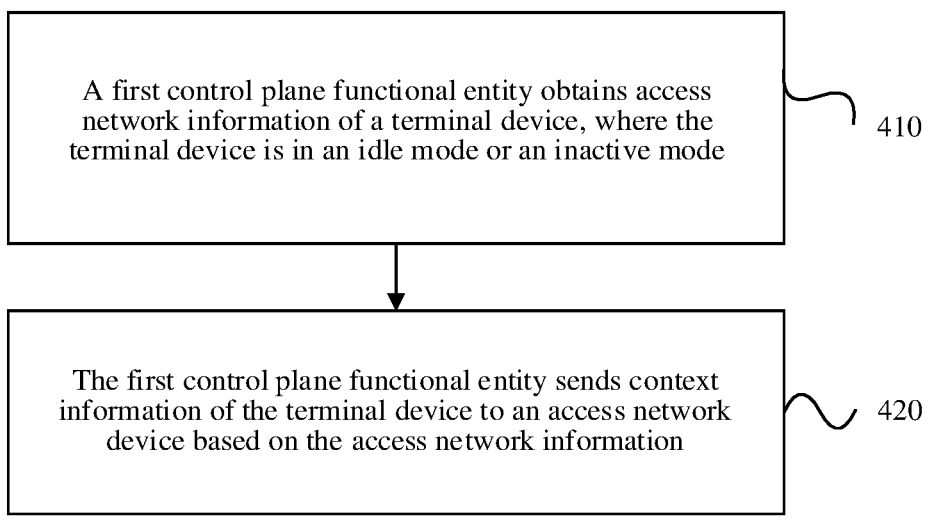
FIG. 4 is a schematic flowchart of a method according to an embodiment of this application.

FIG. 4 is a schematic flowchart of a method according to an embodiment of this application. As shown in FIG. 4, the method 400 includes the following steps.

In Step 410, a first control plane functional entity obtains access network information of a terminal device, where the terminal device is in an idle mode or an inactive mode.

In Step 420, the first control plane functional entity sends context information of the terminal device to an access network device based on the access network information.

For example, the first control plane functional entity may be any one of the following: an MME, an AMF entity, and an SMF entity. It should be understood that each entity has a function similar to a function of the AMF entity or the SMF entity falls within the scope of this embodiment of this application. This is not limited in this application. In addition, the AMF entity or the SMF entity may be an independent physical device, or may be integrated into a same physical device with another functional entity. This is not limited.

It should be understood that the method 400 can be applied to the application scenario shown in FIG. 1 or FIG. 2; for example the first control plane functional entity may be the MME in FIG. 1, or may be the AMF entity or the SMF entity shown in FIG. 2. Correspondingly, the access network device may be the eNB shown in FIG. 1, or may be the NG-(R)AN shown in FIG. 2.

The access network information may include cell information, for example, an E-UTRAN cell global identifier (E-UTRAN Cell Global Identifier, ECGI) or a base station identifier.

In step 420, the first control plane functional entity may determine, based on the access network information, the access network device corresponding to the access network information, and send the context information of the terminal device to the access network device.

It should be further understood that there may be one or more access network devices, and the access network device may be an access network device that is predicted by a prediction network element and to which the terminal device connects when the terminal device is switched to a connected mode. The prediction network element may be a functional entity such as the NEF or the SCEF. This is not limited in this application.

For example, a manner of obtaining the access network information of the terminal device by the first control plane functional entity may be receiving the access network information sent by the prediction network element.

It should be understood that the manner of obtaining the access network information by the first control plane functional entity may alternatively be that the first control plane functional entity proactively initiates a request to another network element, to obtain the access network information, or the like. This is not limited in this application.

For example, when the terminal device is in the idle mode or the inactive mode, the terminal device does not access any access network device. In this case, when data needs to be transmitted between the terminal device and a particular access network device, the terminal device first needs to set up a connection to the access network device, and then the first control plane functional entity sends the context information of the terminal device to the access network device, for example, the terminal device can transmit data with the access network device only after the first control plane functional entity sends the context information of the terminal device to the access network device, so that before starting to transmit data, the terminal device needs to wait for the process in which the first control plane functional entity sends the context information of the terminal device to the access network device. Therefore, a relatively high delay exists.

It should be further understood that when the first control plane functional entity obtains the context information of the terminal device from an access network device on which the terminal device currently camps, and the access network device determined based on the access network information in step 420 and the access network device on which the terminal device currently camps are the same, the first control plane functional entity may not send the context information of the terminal device to the access network device on which the terminal device currently camps.

Therefore, when the terminal device is in the idle mode or the inactive mode, in this embodiment of this application, the first control plane functional entity obtains the access network information of the terminal device, and pre-sends the context information of the terminal device to the access network device corresponding to the access network information. When the terminal device needs to transmit data, for example, the terminal device needs to be switched from the idle mode or the inactive mode to the connected mode, the terminal device does not need to wait for the process of transmitting the context information of the terminal device, thereby facilitating reducing a delay.

Optionally, the method further includes:

The first control plane functional entity sets up a first connection to the access network device, and the first connection is used to transmit control signaling of the terminal device between the access network device and the first control plane functional entity. The first control plane functional entity is the MME or the AMF entity. A user plane functional entity sets up a second connection to the access network device, and the second connection is used to transmit data of the terminal device between the access network device and the user plane functional entity. In this case, the terminal device is still in the idle mode or the inactive mode, and the user plane functional entity is the S-GW entity or the NG-UP entity.

For example, in the application scenario shown in FIG. 1, the access network device is the eNB, and the first control plane functional entity is the MME. In this case, the first connection may be an S1-MME connection between the eNB and the MME, and the second connection may be an S1-U connection between the eNB and the S-GW entity. However, in the application scenario shown in FIG. 2, the access network device is the NG-(R)AN, the first control plane functional entity is the SMF entity, and the second control plane functional entity is the AMF entity. In this case, the first connection may be an N2 connection between the NG-(R)AN and the AMF entity, and the second connection may be an N3 connection between the NG-(R)AN and the NG-UP entity. It should be understood that in some scenarios, the first connection may also be used to transmit data. This is not limited in this application.

Optionally, in an embodiment of this application, the context information of the terminal device includes: user plane context information of the terminal device and control plane context information of the terminal device.

The user plane context information may include at least one of the following information: QoS information of the second connection, for example, QoS information of a PDU session in the 5G system or QoS information of a network bearer in the 4G system; and identification information of the second connection in the user plane functional entity, for example, a general packet radio service tunneling protocol tunnel endpoint identifier (gTP-TEID) of the S1-U connection in the S-GW in the 4G system or tunnel information of the N3 connection in the NG-UP in the 5G system, where the user plane functional entity includes the S-GW, the NG-UP, or the like.

The control plane context information may include at least one of the following information: security context information of the first connection, for example, a key of the first connection; identification information of the first connection in the control plane functional entity, for example, an MME-UE-S1AP-ID of the S1-MME connection in the MME the 4G system or an AMF signaling connection identification of the N2 connection in the AMF entity in the 5G system; handover restriction information, and the like.

Optionally, in an embodiment of this application, the context information of the terminal device may include only the control plane context information of the terminal device.

Optionally, in an embodiment of this application, when the terminal device is in the inactive mode, the method further includes: obtaining, by the first control plane functional entity, the context information of the terminal device from the access network device on which the terminal device currently camps; or selecting, by the first control plane functional entity, the context information of the terminal device from locally stored context information of at least one terminal device, for example, determining the context information of the terminal device based on identification information of the terminal device. It should be understood that there may be another manner of obtaining the context information of the terminal device. This is not limited in this application.

For step 420, when the context information of the terminal device includes the control plane context information and the user plane context information, the control plane context information and the user plane context information may be carried in a same message, or may be respectively carried in different messages. When the control plane context information and the user plane context information are carried in different messages, an execution order of the two messages is not limited in this embodiment of this application.

For example, in the application scenario shown in FIG. 1, when the first control plane functional entity is the MME, an initial context setup request message carries the context information of the terminal device, and the initial context setup request message carries indication information used to instruct not to immediately set up a DRB between the terminal device and the access network device.

For example, the initial context setup request message includes an indication bit, and the indication bit is used to instruct the access network device not to immediately set up the DRB to the terminal device.

For example, after receiving the initial context setup request message, the access network device does not immediately set up the DRB between the terminal device and the access network device. Only when the terminal device needs to transmit data, the terminal device proactively initiates, to the access network device, a request for setting up the DRB, or the DRB is set up only after an RRC connection between the terminal device and the access network device is set up.

For example, the initial context setup request message carries an identifier "MME-UE-S AP-ID" of the S1-MME connection in the MME. For example, the "MME-UE-S1AP-ID" may be 211. Therefore, the eNB and the MME can set up the first connection between the access network device and the first control plane functional entity based on the identifier. Further, the initial context setup request message carries an identifier "gTP-TEID" of the S1-U connection in the S-GW. For example, the "gTP-TEID" in the S-GW may be 7e10b568. Therefore, the eNB and the S-GW can set up the second connection between the access network device and the user plane functional entity based on the identifier.

In the application scenario shown in FIG. 2, the first control plane functional entity is the SMF entity, the second control plane functional entity is the AMF entity, and an N2 connection setup response message and an N3 connection setup request message respectively carry the control plane context information and the user plane context information of the terminal device, and the N2 connection setup response message or the N3 connection setup request message carries indication information used to instruct not to immediately set up a DRB between the terminal device and the access network device.

For example, the N2 connection setup response message includes an indication bit, used to instruct not to immediately set up the DRB between the terminal device and the access network device.

For example, after receiving the N2 connection setup response message or the N3 connection setup request message, the access network device does not immediately set up the DRB between the terminal device and the access network device. Only when the terminal device determines that data needs to be transmitted, the terminal device proactively initiates, to the access network device, a request for setting up the DRB, or the DRB is set up only after an RRC connection between the terminal device and the access network device is set up.

For example, the N2 connection setup response message carries an identifier "AMF Signaling Connection ID" of the N2 connection in the AMF entity. Therefore, the (R)AN and the AMF entity can set up the connection between the access network device and the second control plane functional entity, namely, AMF entity based on the identifier. Further, the N3 connection setup request message carries identification information of the N3 connection in the NG-UP that is stored in the first control plane functional entity. Therefore, the (R)AN and the NG-UP can set up the connection between the access network device and the user plane functional entity, namely, the NG-UP based on the identification information.

Optionally, in an embodiment of this application, the method further includes: receiving, by the first control plane functional entity, first identification information and second identification information that are sent by the access network device, where the first identification information is used to identify the connection between the access network device and the first control plane functional entity; and the second identification information is used to identify the connection between the access network device and the user plane functional entity.

It should be understood that the first identification information and the second identification information may be carried in a same message, or may be carried in different messages. This is not limited in this application. For example, the first identification information and the second identification information may be carried in an initial context setup response message.

For example, the first identification information may be identification information of the connection between the access network device and the first control plane functional entity in the access network device. For example, in the 4G system, the access network device is the eNB, and the first control plane functional entity is the MME. In this case, the eNB adds the first identification information to the initial context setup response message sent to the MME, and the first identification information is an identifier "ENB-UE-S1AP-ID" of the S1-MME connection in the eNB. For example, the "ENB-UE-S1AP-ID" may be 2. The second identification information is identification information of the connection between the access network device and the user plane functional entity in the access network device. For example, in the 4G system, the second identification information is an identifier "gTP-TEID" of the S1-U connection in the eNB. For example, the "gTP-TEID" may be 6f84e480.

In another example, in the 5G system, the access network device is the NG-(R)AN device, and the first control plane functional entity is the SMF entity. In this case, the first identification information includes an identifier "(R)AN Signaling Connection ID" of the N2 connection in the (R)AN device, and the second identification information is used to identify the connection between the access network device and the user plane functional entity. For example, in the 5G system, the second identification information is tunnel information of the N3 connection in the (R)AN device "RAN Tunnel info".

Optionally, in an embodiment of this application, the method further includes: sending an update request message to the user plane functional entity, where the update request message includes the second identification information; and receiving an update response message sent by the user plane functional entity.

For example, the user plane functional entity may be the S-GW in the 4G system, or the user plane functional entity may be the NG-UP entity in the 5G system.

For example, the first control plane functional entity may add the second identification information to the update request message, and send the update request message to the user plane functional entity, to set up the second connection. After receiving the message, the user plane functional entity sends the update response message to the first control plane functional entity, to notify the first control plane functional entity that the second connection is set up.

In other words, after receiving the second identification information sent by the access network device, the first control plane functional entity stores the second identification information, and then sends the update request message to the user plane functional entity, and the update request message carries the second identification information of the second connection in the access network device. The user plane functional entity sets up the second connection based on the second identification information carried in the update request message, and returns the update response message to the control plane functional entity after setting up the second connection. For example, the update response message may be an acknowledgment message.

For example, in the application scenario shown in FIG. 1, the first control plane functional entity is the MME, and the user plane functional entity is the S-GW entity. In this case, the second identification information includes the identifier "gTP-TEID" of the S1-U connection in the eNB. Further, the MME sends the identification information of the S1-U connection in the eNB to the S-GW entity, and the identification information is carried in a bearer modification request message. Herein, the bearer modification request message is the update request message. The S-GW sets up the S1-U connection based on the identification information. After the connection is set up, the S-GW returns a bearer modification reply message to the MME. Herein, the bearer modification reply message is the update response message.

For example, in the application scenario shown in FIG. 2, when the first control plane functional entity is the SMF entity, the second control plane functional entity is the AMF entity, and the user plane functional entity includes the NG-UP entity, the AMF entity stores the second identification information of the second connection in the access network device. For example, the second identification information is identification information of the N3 connection in the NG-(R)AN device. Further, the AMF entity sends the identification information of the N3 connection in the NG-(R)AN device to the NG-UP entity by using the SMF entity, and the identification information is carried in a user plane update request message. Herein, the user plane update request message is the update request message. The NG-UP entity sets up the N3 connection based on the identification information. After the connection is set up, the NG-UP entity returns a user plane update reply message to the SMF entity. Herein, the update reply message is the update response message.

Based on the foregoing steps, when the terminal device is in the idle mode or the inactive mode, the first connection between the control plane functional entity and the access network device is already set up, the second connection between the access network device and the user plane functional entity is already set up. When the terminal device needs to transmit data, the terminal device sets up a radio bearer between the terminal device and a target access network device, and transmits the data by using the first connection and/or the second connection.

Optionally, in an embodiment of this application, the obtaining, by a first control plane functional entity, access network information of a terminal device includes: obtaining, by the first control plane functional entity, the access network information of the terminal device from a network capability exposure functional entity or the second control plane functional entity; or obtaining, by the first control plane functional entity, location prediction information of the terminal device from a network capability exposure functional entity or the second control plane functional entity, and obtaining the access network information of the terminal device based on the location prediction information.

The solution may include two cases. One case is that the first control plane functional entity receives the access network information of the terminal device or the location prediction information of the terminal device from the network capability exposure functional entity.

For example, the network capability exposure functional entity may be the SCEF entity in the application scenario in FIG. 1, or may be the NEF entity in the application scenario in FIG. 2. This is not limited in this application.

The location prediction information of the terminal device may include predicted longitude and latitude coordinates of the terminal device at a specified moment or predicted GPS information. This is not limited in this application.

For example, when the terminal device is switched from the connected mode to the idle mode or the inactive mode, the first control plane functional entity learns of the change. For example, in the application scenario shown in FIG. 1, the MME determines, by using a terminal device context release message sent by the eNB, that the terminal device is switched from the connected mode to the idle mode or the inactive mode. Further, the first control plane functional entity triggers a network element responsible for information collection to collect information related to the terminal device, for example, a historical moving track, a moving direction, a speed, and navigation information. It should be understood that the network element responsible for information collection may be an existing network element such as the E-SMLC entity, or may be a new network element. This is not limited in this application. Further, the network element responsible for information collection informs the prediction network element of the collected information related to the terminal device, and the prediction network element predicts a location and a moment at which the terminal device is switched to the connected mode. The prediction may be implemented by matching historical information or based on the navigation information and the moving speed. It should be understood that the prediction network element may be an existing network element such as the SCEF entity, or may be a new network element. This is not limited in this application. Finally, the prediction network element generates prediction information, and the prediction information carries information about the location at which the terminal device is switched to the connected mode and the identification information of the terminal device. Further, the prediction information may further carry information about the moment at which the terminal device is switched to the connected mode.

Optionally, when the prediction information sent by the prediction network element to the network capability exposure functional entity carries the information about the location at which the terminal device is switched to the connected mode, the identification information of the terminal device, and the moment at which the terminal device is switched to the connected mode, the network capability exposure functional entity generates a timer. An initial moment at which timing of the timer is started is a moment at which the network capability exposure functional entity receives the prediction information sent by the prediction network element. When the timer times out, the network capability exposure functional entity sends a connection setup request message to the first control plane functional entity, and timing duration of the timer is a time interval between the moment at which the terminal device is switched to the connected mode and a current moment.

Optionally, the prediction network element generates a timer, timing duration of the timer is a time interval between the moment at which the terminal device is switched to the connected mode and a current moment, and an initial moment at which timing of the timer is started is a moment at which the prediction network element determines the prediction information. When the timer times out, the prediction network element sends the prediction information to the network capability exposure functional entity, and the prediction information carries the information about the location at which the terminal device is switched to the connected mode and the identification information of the terminal device.

After receiving the prediction information, the network capability exposure functional entity sends a first message to the first control plane functional entity, and the first message carries the information about the location at which the terminal device is switched to the connected mode and the identification information of the terminal device, so that the first control plane functional entity obtains the access network information of the terminal device in step 410 based on the message; or the first message directly carries the access network information of the terminal device and the identification information of the terminal device, so that the first control plane functional entity obtains the access network information of the terminal device by using the first message.

It should be understood that the connection setup request message may explicitly instruct the first control plane functional entity to start a process of setting up the first connection and/or a process of setting up the second connection, or may implicitly instruct the first control plane functional entity to start a process of setting up the first connection and/or a process of setting up the second connection.

For example, in the explicit indication manner, the connection setup request message may include a flag bit used to instruct to set up the first connection and/or the second connection, the information, such as an ECGI, about the location at which the terminal device is switched to the connected mode, the identification information, such as an international mobile subscriber identity (IMSI), of the terminal device, and the like.

For example, in an implicit message, a name of the connection setup request message may be used to instruct to set up the first connection and/or the second connection. Therefore, the implicit connection setup request message includes the information, such as an ECGI, about the location at which the terminal device is switched to the connected mode, the identification information, such as an IMSI, of the terminal device, and the like.

In another case, the first control plane functional entity obtains the access network information of the terminal device or the location prediction information of the terminal device from the second control plane functional entity.

In this case, in the 5G system, the first control plane functional entity is the SMF entity, the second control plane functional entity is the AMF entity, and information content carried in a second message sent by the second control plane functional entity is obtained by receiving a message sent by the network capability exposure functional entity.

Optionally, in an embodiment of this application, the method further includes: obtaining, by the first control plane functional entity, current location information of the terminal device or access network information of an access network device to which the terminal device connects when the terminal device is switched to a connected mode.

For example, the first control plane functional entity obtains the access network information of the access network device to which the terminal device actually connects when the terminal device is switched to the connected mode or current location information of the terminal device, and the information may be sent to the first control plane functional entity by the access network device to which the terminal device actually connects when the terminal device is switched to the connected mode. It should be understood that the access network device to which the terminal device actually connects when the terminal device is switched to the connected mode may be the access network device in step 420, or may be another access network device. This is not limited in this application.

Therefore, the access network device to which the terminal device actually connects when the terminal device is switched to the connected mode may send, to the first control plane functional entity, the current location information of the terminal device or the access network information of the access network device to which the terminal device actually connects when the terminal device is switched to the connected mode. It should be understood that the access network information may include identification information and/or cell identification information of a target access network device.

Optionally, in an embodiment of this application, the first control plane functional entity sends a feedback message to the network capability exposure functional entity, and the feedback message includes the current location information of the terminal device or the access network information of the access network device to which the terminal device connects when the terminal device is switched to the connected mode.

For example, the network capability exposure functional entity can further optimize, based on the feedback message sent by the control plane functional entity, prediction of the access network device to which the terminal device may connect when the terminal device is switched to the connected mode, to improve accuracy of the connection that is pre-set up.

Figure 5:
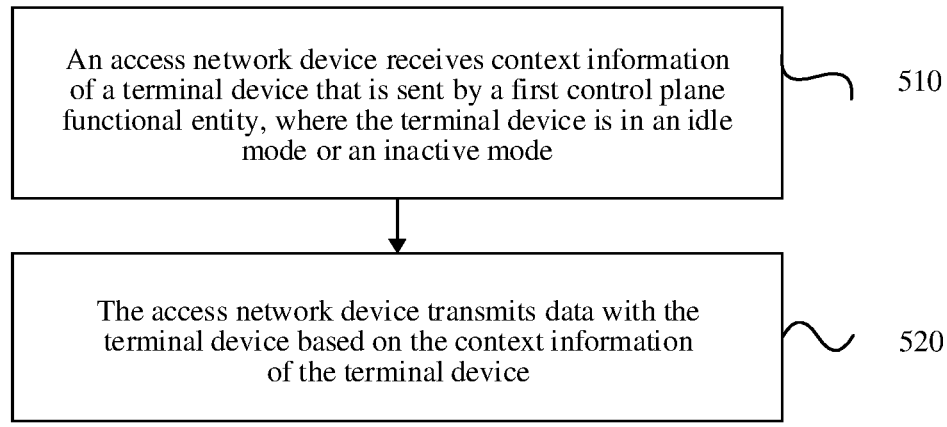
FIG. 5 is a schematic flowchart of a method according to another embodiment of this application.

FIG. 5 is a schematic flowchart of a method according to another embodiment of this application. The method may be performed by an access network device. As shown in FIG. 5, the method 500 includes the following steps.

In Step 510, the access network device receives context information of a terminal device that is sent by a first control plane functional entity, where the terminal device is in an idle mode or an inactive mode.

In Step 520, the access network device transmits data with the terminal device based on the context information of the terminal device.

It should be understood that the foregoing communication includes uplink communication and/or downlink communication.

For the context information of the terminal device, refer to the descriptions of the embodiment shown in FIG. 4, and details are not described again.

It should be further understood that the method 500 can be applied to the application scenario shown in FIG. 1 or FIG. 2, for example, the first control plane functional entity may be the MME in FIG. 1, or may be the AMF entity or the SMF entity shown in FIG. 2. Correspondingly, the access network device may be the eNB shown in FIG. 1, or may be the NG-(R)AN device shown in FIG. 2.

Optionally, in an embodiment of this application, the method further includes: sending first identification information and second identification information to the first control plane functional entity, where the first identification information includes identification information of a connection between the access network device and the first control plane functional entity, and the second identification information includes identification information of a connection between the access network device and a user plane functional entity.

Optionally, the method further includes: sending, by the access network device, first identification information and second identification information to the first control plane functional entity, where the first identification information is used to identify a connection between the access network device and the first control plane functional entity; and the second identification information is used to identify a connection between the access network device and a user plane functional entity.

Therefore, when the terminal device is in the idle mode or the inactive mode, in this embodiment of this application, the first control plane functional entity obtains access network information of the terminal device, and pre-sends the context information of the terminal device to the access network device corresponding to the access network information. When the terminal device needs to transmit data, for example, the terminal device needs to be switched from the idle mode or the inactive mode to a connected mode, the terminal device does not need to wait for a process of transmitting the context information of the terminal device, thereby facilitating reducing a delay.

Various exemplary solutions of the embodiments of this application are described below with reference to examples.

Figure 6:
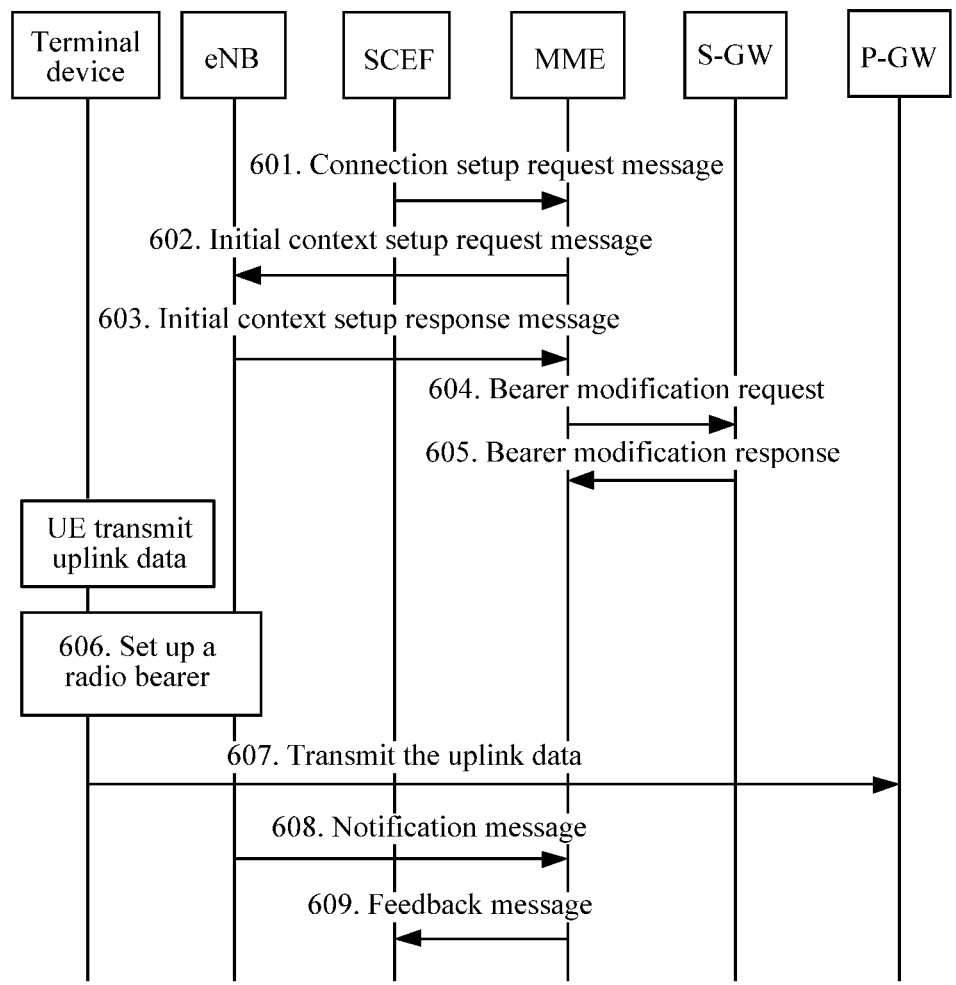
FIG. 6 is a schematic flowchart of a method according to an embodiment of this application.

FIG. 6 is a schematic flowchart of a method according to an embodiment of this application. In this embodiment, the control plane functional entity is the MME, the user plane functional entity is the S-GW entity, and the network capability exposure functional entity is the SCEF. As shown in FIG. 6, the method includes the following steps.

In Step 601, the SCEF entity sends a connection setup request message to the MME.

It should be understood that before step 601, as described in the embodiment in FIG. 4, the MME determines, based on a context release message sent by the terminal device, that the terminal device is switched from the connected mode to the idle mode or the inactive mode. Further, the MME can send prediction information of the terminal device to the SCEF entity by using the prediction network element, and the prediction information includes a location and a moment at which the terminal device is predicted to be switched to the connected mode. Further, the SCEF entity generates the connection setup request message based on the foregoing information.

The connection setup request message may explicitly instruct the MME to set up a connection for the terminal device, or may implicitly instruct the MME to set up a connection for the terminal device.

Before sending the connection setup request message, the SCEF entity may switch an identifier of the terminal device outside a core network to an identifier of the terminal device in the core network.

It should be understood that the connection setup request message may be the first message shown in the embodiment in FIG. 4.

For example, in the explicit indication manner, the connection setup request message may include a flag bit used to instruct to set up an S1-MME connection and/or an S1-U connection, the information, such as an ECGI, about the predicted location at which the terminal device is switched to the connected mode, identification information, such as an IMSI, of the terminal device, and the like. It should be understood that the identification information of the terminal device may be the identifier of the terminal device outside the core network or the identifier of the terminal device in the core network.

For example, in an implicit message, a name of the connection setup request message may be used to instruct to set up a first connection and/or a second connection. Therefore, the implicit connection setup request message includes the information, such as the ECGI, about the location at which the terminal device is switched to the connected mode, the identification information, such as the IMSI, of the terminal device, and the like.

After the MME receives the connection setup request message sent by the SCEF entity, if the connection setup request message sent in step 601 is an explicit message, the MME determines, based on a value of the flag bit that is used to instruct to set up the connection and that is in the connection setup request message, that the connection setup needs to be started. For example, the value of the flag bit used to instruct to set up the connection is 1.

Then, the MME finds, based on the information that is about the predicted location at which the terminal device is switched to the connected mode and that is in the connection setup request message, a corresponding eNB from a relationship list stored in the MME locally. Therefore, the eNB shown in FIG. 6 is the access network device described in step 420 in the embodiment in FIG. 4, and the MME predicts that the terminal device connects to the eNB when the terminal device is switched to the connected mode.

In Step 602, the MME sends an initial context setup request message to the eNB.

The initial context setup request message may carry context information of the S1-MME connection between the eNB and the MME in the MME, for example, a connection port number of the S1-MME connection in the MME; and context information of the S1-U connection between the eNB and the S-GW entity in the S-GW entity, for example, a tunnel number of the S1-U connection in the S-GW entity. The tunnel number is prestored in the MME when the terminal device attaches a network.

It should be understood that control plane context information of the terminal device includes the context information of the S1-MME connection between the eNB and the MME in the MME; and user plane context information of the terminal device includes the context information of the S1-U connection between the eNB and the S-GW entity in the S-GW entity.

For example, the initial context setup request message includes an indication bit indicating that a DRB between the terminal device and the eNB is not immediately set up, the initial context setup request message is further used to inform the eNB of the context information belonging to the terminal device, and the initial context setup request message is further used to trigger the eNB to allocate resources required by the connections to the terminal device.

After receiving the message, the eNB stores the information carried in the initial context setup request message, for example, identification information MME-UE-S1AP-ID of the S1-MME connection between the MME and the eNB in the MME, and identification information of the S1-U connection between the eNB and the S-GW entity in the S-GW entity, to separately allocate the network resources to the connections.

It should be understood that the initial context setup request message in the embodiment in FIG. 6 includes the first identification information and the second identification information in the embodiment in FIG. 4.

In Step 603, the eNB sends an initial context setup response message to the MME.

The initial context setup response message may carry identification information ENB-UE-S1AP-ID of the S1-MME connection between the MME and the eNB in the eNB, namely, the first identification information in the embodiment in FIG. 4; and the identification information gTP-TEID of the S1-U connection between the eNB and the S-GW in the S-GW entity, namely, the second identification information in the embodiment in FIG. 4.

After receiving the initial context setup response message, the MME determines that the S1-MME connection between the eNB and the MME is set up.

In Step 604, the MME sends a bearer modification request message to the S-GW entity.

The bearer modification request message may carry identification information gTP-TEID of the S1-U connection in the eNB.

In Step 605, the S-GW entity sends a bearer modification reply message to the MME.

The message may be used to confirm that the bearer modification request message sent in step 604 is received, so that it is determined that the S1-U connection between the eNB and the S-GW is set up.

In Step 606, when the terminal device has uplink data to be sent, the terminal device sets up a connection to the eNB.

The connection may include an RRC connection and a DRB that are set up between the terminal device and the eNB. In this case, the terminal device may send the uplink data to the eNB.

In Step 607, the terminal device transmits the uplink data.

In Step 608, the eNB sends a notification message to the MME.

The notification message may include an internal ID of the terminal device. It should be understood that the notification message is the third message in the embodiment in FIG. 4 and is used to inform the MME of current location information of the terminal device and/or information about a current connected eNB.

In Step 609, the MME sends a feedback message to the SCEF entity.

Figure 7:
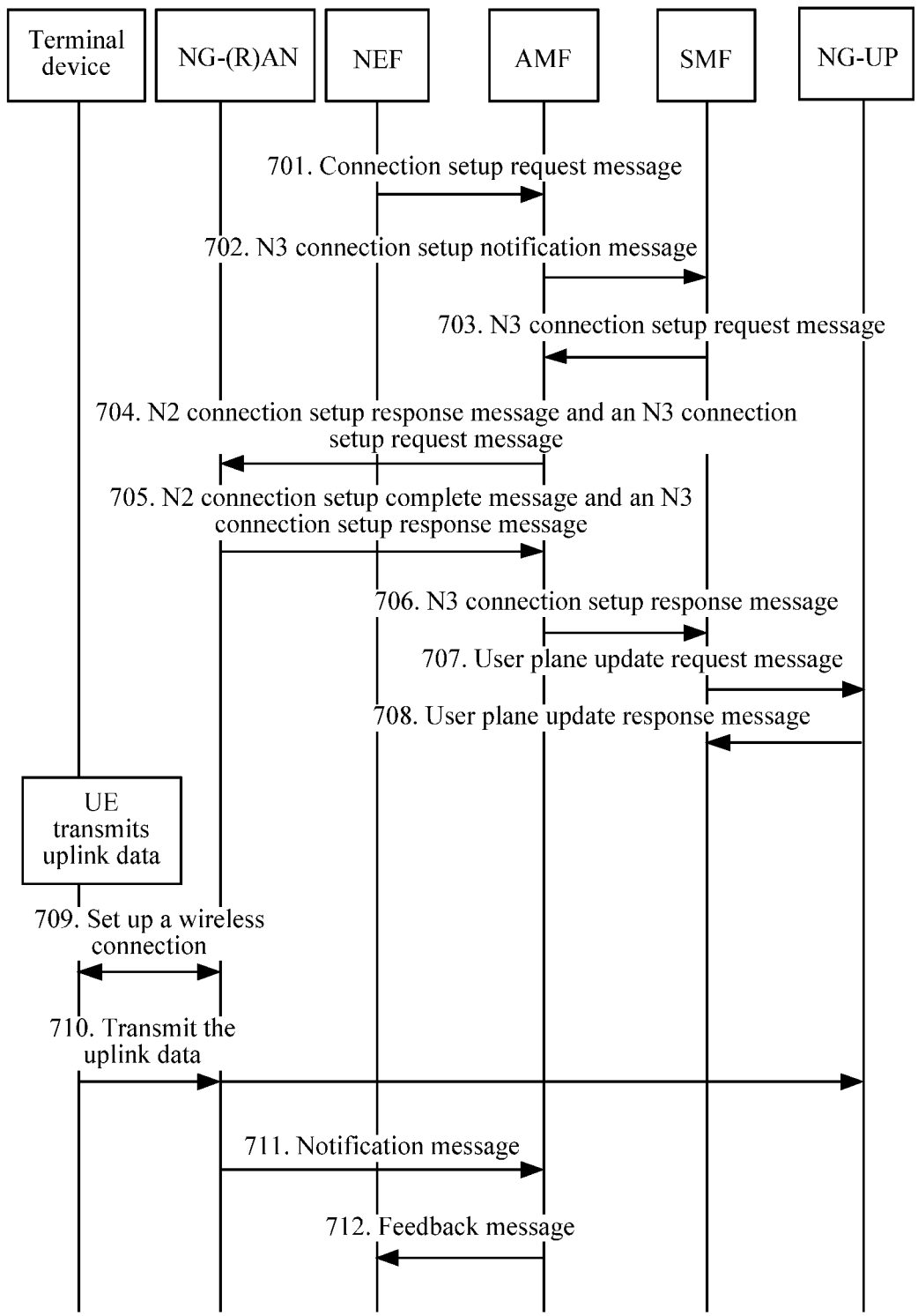
FIG. 7 is a schematic flowchart of a method according to an embodiment of this application.

The feedback message may be used to represent that the terminal device can transmit data by using the S1-MME connection and the S1-U connection that are set up in the foregoing processes. The feedback message may include the current location information of the terminal device and/or the information about the current connected eNB. It should be understood that FIG. 6 shows detailed steps or operations in this embodiment of this application, but these steps or operations are merely examples. In this embodiment of this application, another operation or variations of the various operations in FIG. 6 may further be performed. In addition, the steps in FIG. 6 may be performed in an order different from that presented in FIG. 6, and the operations in FIG. 6 may not necessarily be all performed. FIG. 6 is a schematic flowchart of a method according to this application. In this embodiment, the first control plane functional entity is the SMF entity, the second control plane functional entity is the AMF entity, the user plane functional entity is the NG-UP entity, and the network capability exposure functional entity is the NEF entity. As shown in FIG. 7, the method includes the following steps.

In Step 701, the NEF entity sends a terminal device connection setup request message to the AMF entity, where the message includes information about a location at which the terminal device is switched to the connected mode and identification information of the terminal device.

It should be understood that before step 701, as described in the embodiment in FIG. 4, the AMF determines, based on a context release message sent by the terminal device, that the terminal device is switched from the connected mode to the idle mode or the inactive mode. Further, the AMF can send prediction information of the terminal device to the NEF by using the prediction network element, and the prediction information includes the location and a moment at which the terminal device is predicted to be switched to the connected mode. Further, the NEF generates the connection setup request message based on the foregoing information.

Then, the AMF entity may find, based on the information that is about the location at which the terminal device is switched to the connected mode and that is in the connection setup request message, a corresponding NG-(R)AN device from a mapping relationship list stored in the AMF entity locally. Therefore, the NG-(R)AN device shown in FIG. 7 is the access network device described in step 420 in the embodiment in FIG. 4.

It should be understood that the setup request message may be the first message in the embodiment in FIG. 4. The connection setup request message may explicitly instruct the control plane functional entity to start a process of setting up an N2 connection and/or a process of setting up an N3 connection, or may implicitly instruct the control plane functional entity to start a process of setting up an N2 connection and/or a process of setting up an N3 connection. For example, the first connection in the embodiment shown in FIG. 4 or FIG. 5 is the N2 connection in the embodiment in FIG. 7, and the second connection is the N3 connection in the embodiment in FIG. 7.

In Step 702, the AMF entity sends an N3 connection notification message to the SMF entity.

The N3 connection notification message may be the second message described in the embodiment in FIG. 4. The N3 connection notification message includes the information carried in the connection setup request message in step 701. The N3 connection notification message is further used to request the SMF entity to return context information of the N3 connection that is stored in the SMF entity to the AMF entity. For example, the notification message may be a PDU session activation request message.

In Step 703, after receiving the message in step 702, the SMF entity sends an N3 connection setup request message to the AMF entity.

The connection setup request message carries the context information of the N3 connection in the SMF entity. For example, the connection setup request message includes identification information of the N3 connection in the SMF entity.

In Step 704: the AMF entity forwards the received N3 connection setup request message to the NG-(R)AN device, and sends an N2 connection setup response message to the NG-(R)AN device.

It should be understood that the N3 connection setup request message and the N2 connection setup response message may be a same message, or may be two different messages. If the N3 connection setup request message and the N2 connection setup response message are two different messages, an order of sending the messages is not limited in this application.

The N3 connection setup request message may include endpoint information of the N3 connection in the NG-UP entity and the like, and the N2 connection setup response message includes identification information of the N2 connection in the AMF entity and the like. It should be understood that the N2 connection setup response message and/or the N3 connection setup request message may further include indication information indicating that a wireless connection does not need to be immediately set up.

After receiving the message sent in step 704, the NG-(R)AN may store identification information of the N3 connection in the NG-UP and the identification information of the N2 connection in the AMF.

Further, in step 705, the NG-(R)AN device sends an N2 connection setup complete message and an N3 connection setup response message to the AMF entity.

The N3 connection setup response message may include identification information of the N3 connection in the NG-(R)AN device and the like, and the N2 connection setup complete message may include identification information of the N2 connection in the NG-(R)AN and the like.

After receiving the message sent in step 705, the AMF obtains the identification information of the N2 connection in the NG-(R)AN device. In this case, the N2 connection is set up.

In addition, in step 706, the AMF entity forwards the N3 connection setup response message to the SMF entity.

In Step 707, after receiving the N3 connection setup response message, the SMF entity sends a user plane update request message to the NG-UP entity.

The user plane update request message may include context information of the N3 connection in the NG-(R)AN device in the N3 connection setup response message.

After receiving the message, the NG-UP entity stores NG-(R)AN device-related information used to set up the N3 connection. In this case, the N3 connection is set up.

In Step 708, the NG-UP entity sends a user plane update response message to the SMF entity, to confirm that the N3 connection is set up.

Optionally, in step 709, when the terminal device has uplink data to be sent, the terminal device sets up a wireless connection to the NG-(R)AN device.

The wireless connection may include an RRC connection and a DRB that are set up between the terminal device and the NG-(R)AN device.

Further, the connection for sending the uplink data by the terminal device is already set up. Therefore, the terminal device may directly send the uplink data, for example, perform step 710 of transmitting the uplink data.

Optionally, the method further includes step 711 and step 712.

In Step 711, the NG-(R)AN device sends a notification message to the AMF entity.

It should be understood that the notification message is the third message in the embodiment in FIG. 4, and the notification message represents that NG-(R)AN already successfully provides a service to the terminal device. It should be understood that the notification message includes the identification information of the terminal device.

In Step 712, the AMF sends a feedback message to the NEF, where the message is used to represent that the terminal device can transmit data by using the N3 connection and the N2 connection that are set up in the foregoing processes, and the feedback message includes context information of the terminal device. It should be understood that FIG. 7 shows detailed steps or operations in this embodiment of this application, but these steps or operations are merely examples. In this embodiment of this application, another operation or variations of the various operations in FIG. 7 may further be performed. In addition, the steps in FIG. 7 may be performed in an order different from that presented in FIG. 7, and the operations in FIG. 7 may not necessarily be all performed.

Figure 8:
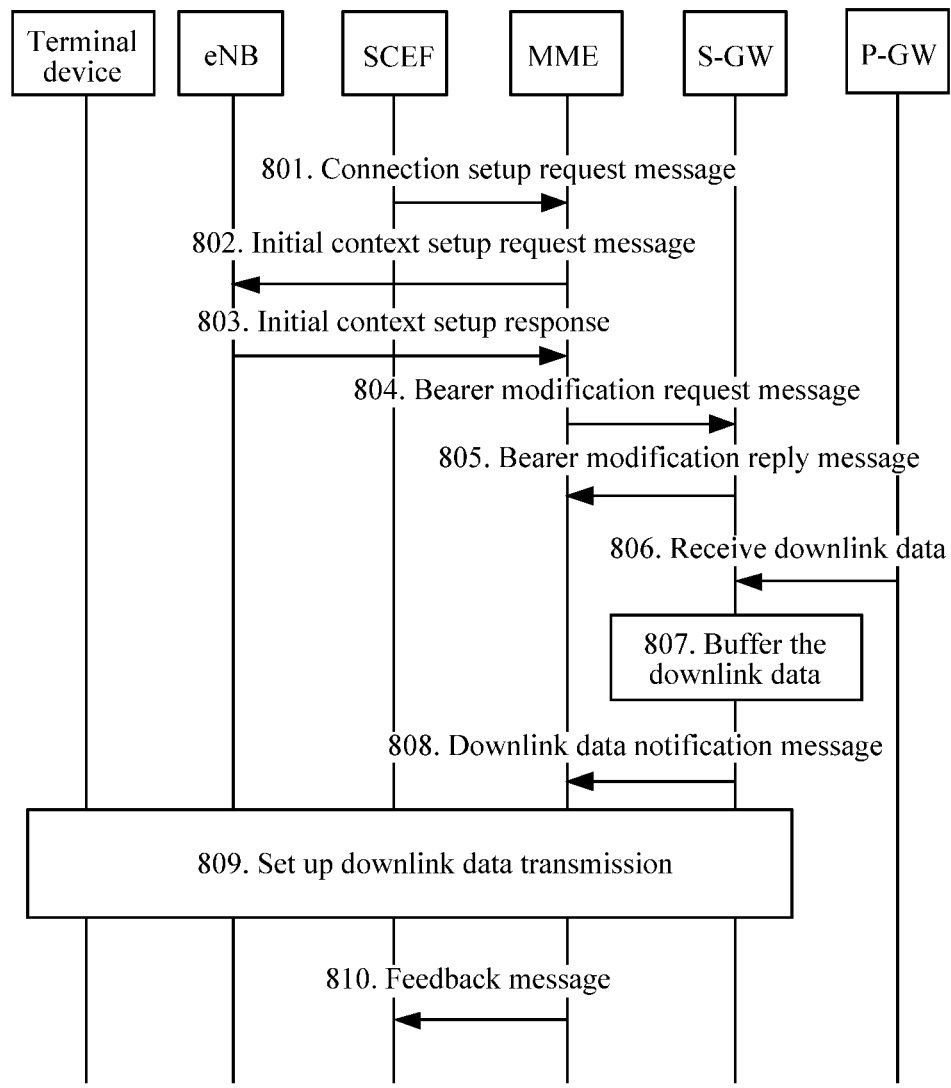
FIG. 8 is a schematic flowchart of a method according to an embodiment of this application.

FIG. 8 is a schematic flowchart of a method according to an embodiment of this application. In this embodiment, the control plane functional entity is the MME, the user plane functional entity is the S-GW entity, and the network capability exposure functional entity is the SCEF entity. As shown in FIG. 8, the method includes the following steps.

In Step 801, the SCEF entity sends a connection setup request message to the MME.

It should be understood that before step 801, as described in the embodiment in FIG. 4, the MME determines, based on a context release message sent by the terminal device, that the terminal device is switched from the connected mode to the idle mode or the inactive mode. Further, the MME can send prediction information of the terminal device to the SCEF entity by using the prediction network element, and the prediction information includes a location and a moment at which the terminal device is predicted to be switched to the connected mode. Further, the SCEF entity generates the connection setup request message based on the foregoing information.

The message may explicitly instruct the MME to set up a connection for the terminal device, or may implicitly instruct the MME to set up a connection for the terminal device.

It should be understood that the connection setup request message may be the first message shown in the embodiment in FIG. 4.

For example, in the explicit indication manner, the connection setup request message may include a flag bit used to set up an S1-MME connection and/or an S1-U connection, information, such as an ECGI, about the location at which the terminal device is switched to the connected mode, identification information, such as an IMSI, of the terminal device, and the like.

For example, in an implicit message, a name of the connection setup request message may be used to instruct to set up a first connection and/or a second connection. Therefore, the implicit connection setup request message includes the information, such as the ECGI, about the location at which the terminal device is switched to the connected mode, the identification information, such as the IMSI, of the terminal device, and the like.

After the MME receives the connection setup request message sent by the SCEF entity, if the connection setup request message sent in step 801 is an explicit message, the MME determines, based on a value of the flag bit that is used to instruct to set up the connection and that is in the connection setup request message, that the connection setup needs to be started. For example, the value of the flag bit used to instruct to set up the connection is 1.

Then, the MME may find, based on the information that is about the location at which the terminal device is switched to the connected mode and that is in the connection setup request message, a corresponding eNB, namely, an eNB shown in FIG. 8, from a mapping relationship list stored in the MME locally.

In Step 802, the MME sends an initial context setup request message to the eNB.

The initial context setup request message may carry context information of the S1-MME connection between the eNB and the MME in the MME, for example, a connection port number of the S1-MME connection in the MME; and context information of an S1-U connection between the eNB and the S-GW entity in the S-GW entity, for example, a tunnel number of the S1-U connection in the S-GW. The tunnel number is prestored in the MME when the terminal device attaches a network.

The MME sends context information of the terminal device to the eNB by using step 802.

For example, the initial context setup request message includes an indication bit indicating that a DRB between the terminal device and the eNB is not immediately set up.

After receiving the context setup request message, the eNB stores the information carried in the initial context setup request message, for example, identification information MME-UE-S1AP-ID of the S1-MME connection between the MME and the eNB in the MME, and identification information of the S1-U connection between the eNB and the S-GW entity in the S-GW, to separately allocate network resources to the S1-U connection and the S1-MME connection.

In Step 803, send an initial context setup response message to the MME. The initial context setup response message carries identification information ENB-UE-S1AP-ID of the S1-MME connection between the MME and the eNB in the eNB, where the identification information corresponds to the first identification information in the embodiment in FIG. 4; and identification information gTP-TEID of the S1-U connection between the eNB and the S-GW in the eNB, where the identification information corresponds to the second identification information in the embodiment in FIG. 4.

After receiving the initial context setup response message, the MME stores the ENB-UE-S1AP-ID. In this case, the S1-MME connection between the eNB and the MME is set up.

In Step 804, the MME sends a bearer modification request message to the S-GW entity, where the bearer modification request message carries the identification information gTP-TEID of the S1-U connection in the eNB.

Further, the bearer modification request message in step 804 includes indication information, and the indication information is used to instruct the S-GW to locally buffer data information of the terminal device that is delivered by the P-GW entity. After the S-GW entity learns that the terminal device is already successfully connected to the eNB, the S-GW entity sends the buffered data information to the eNB.

It should be understood that the S-GW entity buffers the data information of the terminal device instead of sending, by the S-GW, the data information of the terminal device to the eNB for buffering, so that network load of the eNB is not increased.

In Step 805, the S-GW entity sends a bearer modification reply message to the MME, where the message is used to confirm that the bearer modification request message sent in step 804 is received, so that the S1-U connection between the eNB and the S-GW entity is set up.

In Step 806, the P-GW entity receives downlink data of the terminal device.

In Step 807, the S-GW entity buffers, based on the bearer modification request message received from the MME, the downlink data of the terminal device that is sent by the P-GW entity.

In Step 808, send a downlink data notification message to the MME, so that the S-GW entity informs the MME that the downlink data of the terminal device needs to be sent.

In Step 809, the MME sends a paging message to the terminal device, and the terminal device sets up a connection to the eNB, where the connection includes an RRC connection and a DRB that are set up between the terminal device and the eNB, so that the terminal device can receive the downlink data sent by the eNB, and the eNB sends a notification message to the MME, where the notification message represents that the terminal device can transmit data by using the S1-MME connection and the S1-U connection that are set up in the foregoing processes.

In Step 810, the MME sends a feedback message to the SCEF entity, where the feedback message is used to represent that the terminal device can transmit data by using the S1-MME connection and the S1-U connection that are set up in the foregoing processes, and the feedback message includes the context information of the terminal device.

It should be understood that FIG. 8 shows detailed steps or operations in this embodiment of this application, but these steps or operations are merely examples. In this embodiment of this application, another operation or variations of the various operations in FIG. 8 may further be performed. In addition, the steps in FIG. 8 may be performed in an order different from that presented in FIG. 8, and the operations in FIG. 8 may not necessarily be all performed.

Figure 9:
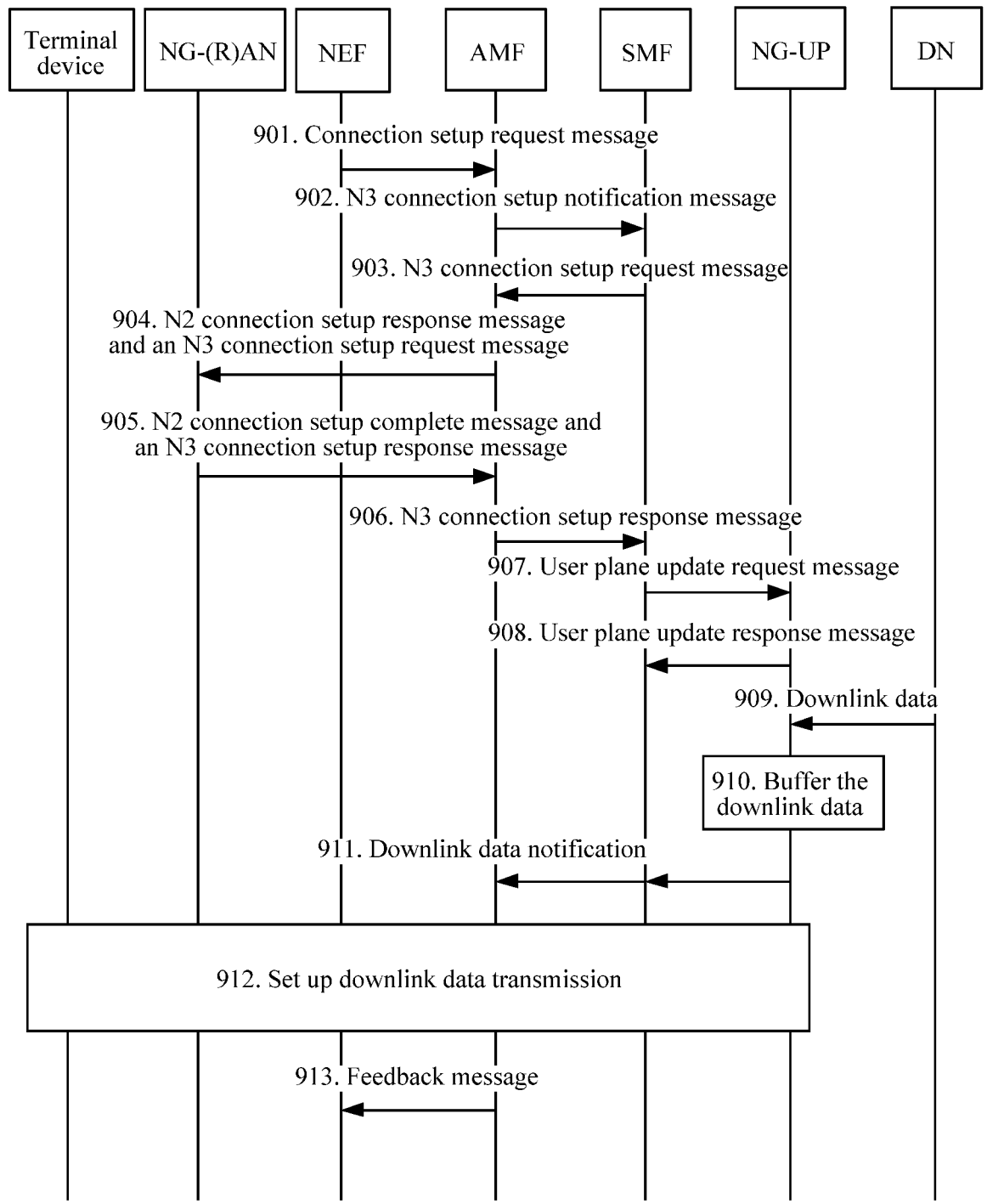
FIG. 9 is a schematic flowchart of a method according to an embodiment of this application.

FIG. 9 is a schematic flowchart of a method according to an embodiment of this application. In this embodiment, the first control plane functional entity is the SMF entity, the second control plane functional entity is the AMF entity, the user plane functional entity is the NG-UP entity, and the network capability exposure functional entity is the NEF entity. As shown in FIG. 9, the method includes the following steps.

In Step 901, the NEF entity sends a terminal device connection setup request message to the AMF entity, where the message includes information, such as an ECGI, about a predicted location at which the terminal device is switched to the connected mode and identification information of the terminal device.

It should be understood that before step 901, as described in the embodiment in FIG. 4, the AMF entity determines, based on a context release message sent by the terminal device, that the terminal device is switched from the connected mode to the idle mode or the inactive mode. Further, the AMF entity can send prediction information of the terminal device to the NEF entity by using the prediction network element, and the prediction information includes the location and a moment at which the terminal device is predicted to be switched to the connected mode. Further, the NEF entity generates the connection setup request message based on the foregoing information. Then, the AMF entity finds, based on the information that is about the predicted location at which the terminal device is switched to the connected mode and that is in the connection setup request message, a corresponding NG-(R)AN device from a mapping relationship list stored in the AMF entity locally. Therefore, the NG-(R)AN device shown in FIG. 9 is the access network device described in step 420 in the embodiment in FIG. 4, and the AMF entity predicts that the terminal device connects to the NG-(R)AN device when the terminal device is switched to the connected mode.

It should be understood that the connection setup request message may explicitly instruct the control plane functional entity to start a process of setting up an N2 connection and/or a process of setting up an N3 connection, or may implicitly instruct the control plane functional entity to start a process of setting up an N2 connection and/or a process of setting up an N3 connection. For example, the first connection in the embodiment shown in FIG. 4 or FIG. 5 is the N2 connection in the embodiment in FIG. 9, and the second connection is the N3 connection in the embodiment in FIG. 9.

It should be further understood that the connection setup message may explicitly or implicitly instruct the AMF entity to set up the connection for the terminal device.

In Step 902, the AMF entity sends an N3 connection notification message to the SMF entity.

The N3 connection notification message may be the second message described in the embodiment in FIG. 4, the N3 connection notification message is further used to request the SMF entity to return context information of the N3 connection in the SMF entity to the AMF entity. For example, the notification message may be a PDU session activation request message.

In Step 903, after receiving the message in step 902, the SMF entity sends an N3 connection setup request message to the AMF entity, where the connection setup request message includes identification information of the N3 connection in the SMF entity.

In Step 904, the AMF entity forwards, to the NG-(R)AN device, the N3 connection setup request message received from the SMF entity, and sends an N2 connection setup response message to the NG-(R)AN device.

For example, in step 904, the SMF entity sends context information of the terminal device to the NG-(R)AN device.

It should be understood that the N3 connection setup request message and the N2 connection setup response message may be a same message, or may be two different messages. If the N3 connection setup request message and the N2 connection setup response message are two different messages, an order of sending the messages is not limited in this application.

After receiving the message sent in step 904, the NG-(R)AN device stores identification information of the N3 connection in the NG-(R)AN and identification information of the N2 connection in the AMF entity.

Further, in step 905, the NG-(R)AN device sends an N2 connection setup complete message and an N3 connection setup response message to the AMF entity.

The N3 connection setup response message may include the identification information of the N3 connection in the NG-(R)AN device and the like, and the N2 connection setup complete message may include identification information of the N2 connection in the NG-(R)AN and the like.

Optionally, after receiving the message sent in step 905, the AMF entity stores the identification information of the N2 connection in the NG-(R)AN device. In this case, the N2 connection is set up.

In addition, in step 906, the AMF entity forwards the N3 connection setup response message to the SMF entity.

In Step 907, after receiving the N3 connection setup response message, the SMF entity sends a user plane update request message to the NG-UP entity, where the user plane update request message includes the identification information of the N3 connection in the NG-(R)AN device.

Optionally, after receiving the message, the NG-UP entity stores the identification information of the N3 connection in the NG-(R)AN device. In this case, the N3 connection is set up.

Further, the setup response message in step 907 may include indication information, and the indication information is used to instruct the NG-UP to locally buffer data information of the current terminal device that is delivered by the DN. After the NG-UP learns that the terminal device is already successfully connected to the NG-(R)AN, the NG-UP sends the buffered data information to the NG-(R) AN.

In Step 908, the NG-UP entity sends a user plane update response message to the SMF entity, to confirm that the N3 connection is set up.

In Step 909, the data network sends downlink data to the NG-UP entity.

In Step 910, the NG-UP entity buffers, based on the connection setup response message received from the SMF entity, the downlink data sent to the terminal device.

In Step 911, the SMF entity sends a downlink data notification message to the AMF entity.

The notification message may be used to inform the AMF entity that the downlink data needs to be transmitted to the terminal device.

In Step 912 the AMF entity sends a paging message to the terminal device, the terminal device sets up a wireless connection to the NG-(R)AN device, and the NG-(R)AN device sends a downlink data transmission requirement to the NG-UP entity. When the terminal device transmits the downlink data, and the wireless connection is already set up between the terminal device and the NG-(R)AN device, the NG-UP entity sends the downlink data to the terminal device.

In Step 913, the AMF entity sends a feedback message to the NEF entity.

The message may be used to represent that the terminal device can transmit data by using the N3 connection and the N2 connection that are set up in the foregoing processes, and the feedback message includes the context information of the terminal device.

It should be understood that FIG. 9 shows detailed steps or operations in this embodiment of this application, but these steps or operations are merely examples. In this embodiment of this application, another operation or variations of the various operations in FIG. 9 may further be performed. In addition, the steps in FIG. 9 may be performed in an order different from that presented in FIG. 9, and the operations in FIG. 9 may not necessarily be all performed.

Figure 10:
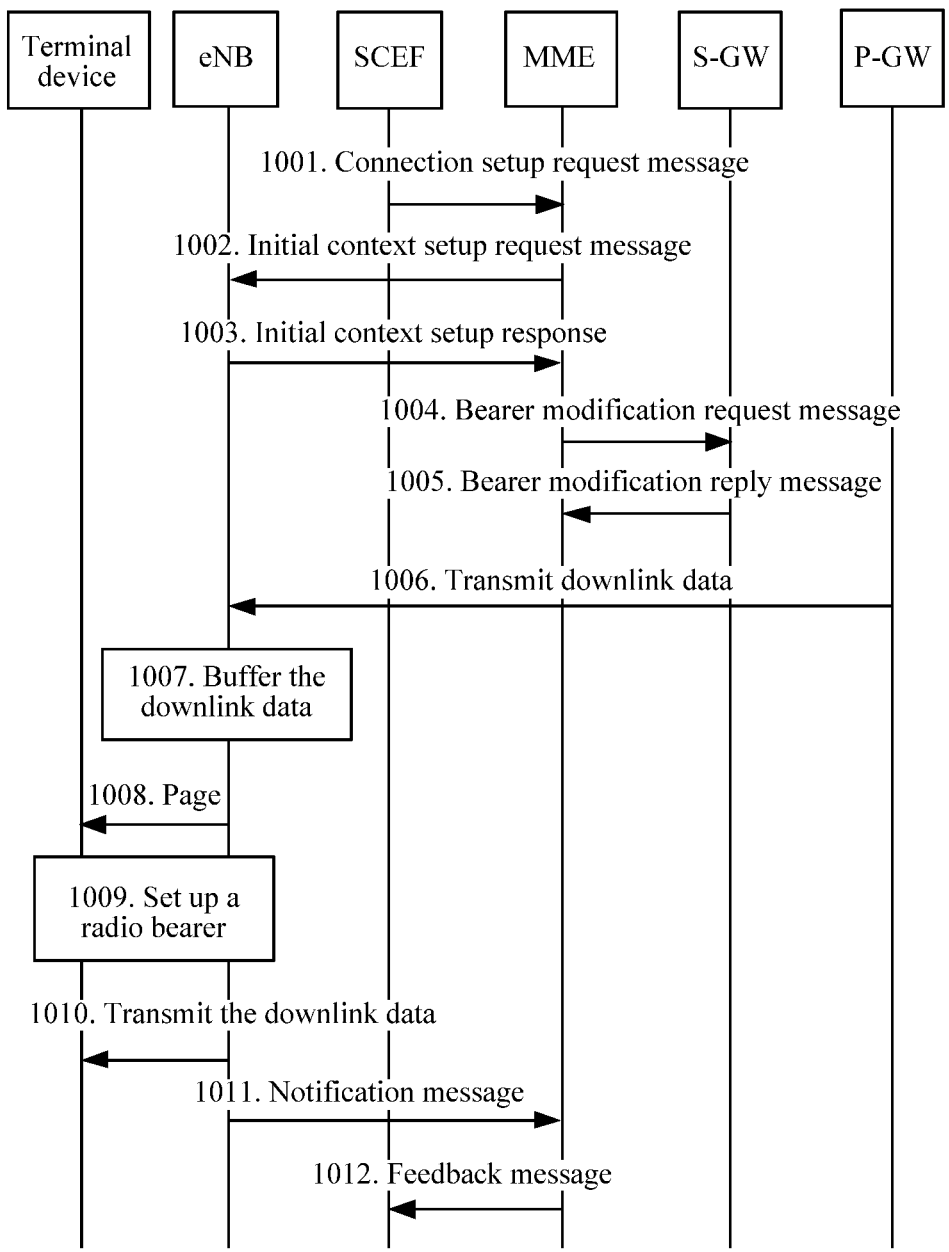
FIG. 10 is a schematic flowchart of a method according to an embodiment of this application.

FIG. 10 is a schematic flowchart of a method according to an embodiment of this application. In this embodiment, the control plane functional entity is the MME, the user plane functional entity is the S-GW entity, and the network capability exposure functional entity is the SCEF entity. As shown in FIG. 10, the method includes the following steps.

In Step 1001, the SCEF entity sends a connection setup request message to the MME.

It should be understood that before step 1001, as described in the embodiment in FIG. 4, the MME determines, based on a context release message sent by the terminal device, that the terminal device is switched from the connected mode to the idle mode or the inactive mode.

Further, the MME can send prediction information of the terminal device to the SCEF entity by using the prediction network element, and the prediction information includes a location and a moment at which the terminal device is predicted to be switched to the connected mode. Further, the SCEF entity generates the connection setup request message based on the foregoing information.

The message may explicitly instruct the MME to set up a connection for the terminal device, or may implicitly instruct the MME to set up a connection for the terminal device.

For example, in the explicit indication manner, the connection setup request message includes a flag bit used to set up an S1-MME connection and/or an S1-U connection, information, such as an ECGI, about the location at which the terminal device is switched to the connected mode, identification information, such as an IMSI, of the terminal device, and the like.

For example, in an implicit message, a name of the connection setup request message may be used to instruct to set up a first connection and/or a second connection. Therefore, the implicit connection setup request message includes the information, such as the ECGI, about the location at which the terminal device is switched to the connected mode, the identification information, such as the IMSI, of the terminal device, and the like.

After the MME receives the connection setup request message sent by the SCEF entity, if the connection setup request message sent in step 1001 is an explicit message, the MME determines, based on a value of the flag bit that is used to instruct to set up the connection and that is in the connection setup request message, that the connection setup needs to be started. For example, the value of the flag bit used to instruct to set up the connection is 1.

Then, the MME finds, based on the information that is about the location at which the terminal device is switched to the connected mode and that is in the connection setup request message, a corresponding eNB from a mapping relationship list stored in the MME locally. The eNB is the access network device in step 420 in the embodiment in FIG. 4.

In Step 1002, the MME sends an initial context setup request message to the eNB.

The initial context setup request message carries a connection port number of the S1-MME connection between the eNB and the MME in the MME, and a tunnel number of the S1-U connection between the eNB and the S-GW entity in the S-GW entity. The tunnel number is prestored in the MME when the terminal device attaches a network.

For example, the initial context setup request message may include an indication bit used to instruct not to immediately set up a DRB between the terminal device and the eNB.

After receiving the message, the eNB stores the information carried in the initial context setup request message, for example, identification information MME-UE-S1AP-ID of the S1-MME connection between the MME and the eNB in the MME, and identification information of the S1-U connection between the eNB and the S-GW entity in the S-GW entity, to separately allocate network resources to the S1-MME connection and the S1-U connection.

It should be understood that the initial context setup request message in the embodiment in FIG. 10 may be the first connection setup request message or the second connection setup request message in the embodiment in FIG. 4.

In Step 1003, send an initial context setup response message to the MME, where the initial context setup response message carries identification information ENB-UE-S1AP-ID of the S1-MME connection between the MME and the eNB in the eNB, and identification information gTP-TEID of the S1-U connection between the eNB and the S-GW entity in the eNB.

After receiving the initial context setup response message, the MME stores the ENB-UE-S1AP-ID. In this case, the S1-MME connection between the eNB and the MME is set up.

It should be understood that the initial context setup response message in the embodiment in FIG. 10 may be the first connection setup response message or the second connection setup response message in the embodiment in FIG. 4.

In Step 1004, the MME sends a bearer modification request message to the S-GW entity, where the bearer modification request message carries the identification information gTP-TEID of the S1-U connection in the eNB.

In Step 1005, the S-GW entity sends a bearer modification reply message to the MME, where the message is used to confirm that the bearer modification request message sent in step 604 is received, so that the S1-U connection between the eNB and the S-GW entity is set up.

It should be understood that the bearer modification request message is the update request message in the embodiment in FIG. 4, and the bearer modification reply message is the update response message in the embodiment in FIG. 4.

In Step 1006, the P-GW entity generates downlink data to be sent to the terminal device.

In Step 1007, the eNB buffers the downlink data of the terminal device.

In Step 1008, the MME sends a paging message to the terminal device.

In Step 1009, after receiving the paging message, the terminal device sets up a wireless connection to the eNB.

The wireless connection may include an RRC connection and a DRB that are between the terminal device and the eNB. In this case, the terminal device may receive the downlink data sent by the eNB.

In Step 1011, the eNB sends a notification message to the MME.

The notification message may be used to inform the MME that the terminal device can transmit data by using the S1-MME connection and the S1-U connection that are set up in the foregoing processes.

In Step 1012, the MME sends a feedback message to the SCEF entity.

The message may be used to represent that the terminal device can transmit data by using the S1-MME connection and the S1-U connection that are set up in the foregoing processes, and the feedback message includes context information of the terminal device.

Figure 11:
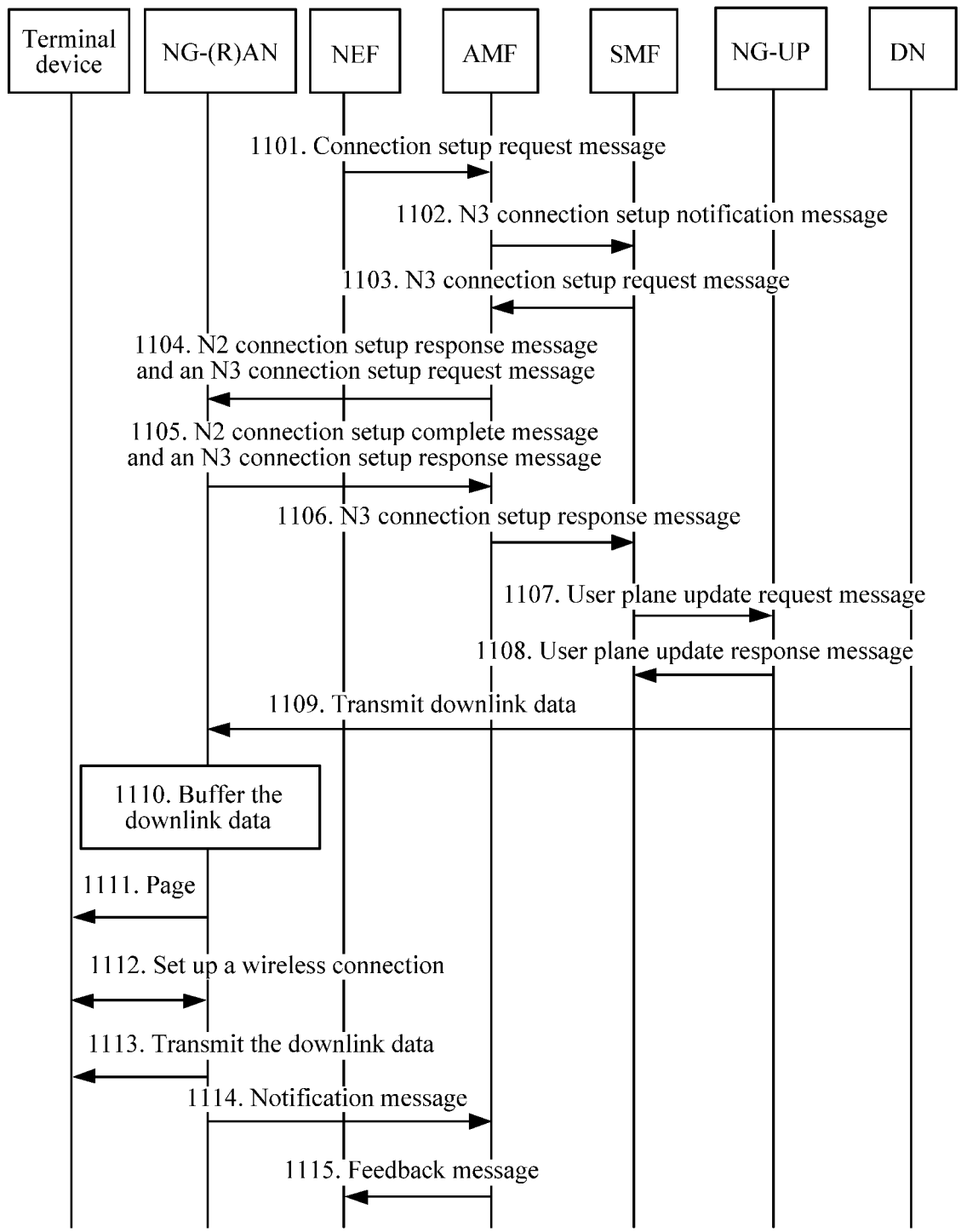
FIG. 11 is a schematic flowchart of a method according to an embodiment of this application.

It should be understood that FIG. 10 shows detailed steps or operations in this embodiment of this application, but these steps or operations are merely examples. In this embodiment of this application, another operation or variations of the various operations in FIG. 10 may further be performed. In addition, the steps in FIG. 10 may be performed in an order different from that presented in FIG. 10, and the operations in FIG. 10 may not necessarily be all performed. FIG. 11 is a schematic flowchart of a method according to an embodiment of this application. In this embodiment, the control plane functional entity includes the AMF entity and the SMF entity, the user plane functional entity is the NG-UP entity, and the network capability exposure functional entity is the NEF entity. As shown in FIG. 11, the method includes the following steps.

In Step 1101: The NEF sends a terminal device connection setup request message to the AMF, where the message includes information about a predicted location at which the terminal device is switched to the connected mode and identification information of the terminal device.

It should be understood that before step 1101, as described in the embodiment in FIG. 4, the AMF entity determines, based on a context release message sent by the terminal device, that the terminal device is switched from the connected mode to the idle mode or the inactive mode. Further, the AMF entity can send prediction information of the terminal device to the NEF entity by using the prediction network element, and the prediction information includes the location and a moment at which the terminal device is predicted to be switched to the connected mode. Further, the NEF entity generates the connection setup request message based on the foregoing information.

It should be understood that the connection setup request message may explicitly instruct the control plane functional entity to start a process of setting up an N2 connection and/or a process of setting up an N3 connection, or may implicitly instruct the control plane functional entity to start a process of setting up an N2 connection and/or a process of setting up an N3 connection. For example, the first connection in the embodiment shown in FIG. 4 or FIG. 5 is the N2 connection in the embodiment in FIG. 11, and the second connection is the N3 connection in the embodiment in FIG. 11.

It should be further understood that the connection setup message may explicitly or implicitly instruct the AMF entity to set up the connection for the terminal device.

In Step 1102, the AMF entity sends an N3 connection notification message to the SMF entity, where the message is used to request the SMF entity to return identification information of the N3 connection in the SMF entity to the AMF entity.

In Step 1103, after receiving the message in step 1102, the SMF entity sends an N3 connection setup request message to the AMF entity, where the connection setup request message carries identification information of the N3 connection in the NG-UP entity.

In Step 1104, the AMF entity forwards, to the NG-(R)AN device, the N3 connection setup request message received from the SMF entity, and sends an N2 connection setup response message to the NG-(R)AN device.

It should be understood that the N3 connection setup request message and the N2 connection setup response message may be a same message, or may be two different messages. If the N3 connection setup request message and the N2 connection setup response message are two different messages, an order of sending the messages is not limited in this application.

It should be further understood that the N3 connection setup request message is the second connection request message in the embodiment in FIG. 4 or FIG. 5, and the N2 connection setup response message is the first connection request message in the embodiment in FIG. 4 or FIG. 5.

After receiving the message sent in step 1104, the NG-(R)AN device stores the identification information of the N3 connection in the NG-UP entity and identification information of the N2 connection in the AMF entity.

Further, in step 1105, an N2 connection setup complete message and an N3 connection setup response message are sent to the AMF entity. The N3 connection setup response message may include identification information of the N3 connection in the NG-(R)AN device and the like, and the N2 connection setup complete message may include identification information of the N2 connection in the NG-(R)AN and the like.

After receiving the message sent in step 1105, the AMF entity stores context information of the N2 connection in the NG-(R)AN device. In this case, the N2 connection is set up.

In addition, in step 1106, the AMF entity forwards the N3 connection setup response message to the SMF entity.

In Step 1107, after receiving the N3 connection setup response message, the SMF entity sends a user plane update request message to the NG-UP entity, where the message includes context information of the N3 connection in the NG-(R)AN device.

After receiving the message, the NG-UP stores the context information used to set up the N3 connection. In this case, the N3 connection is set up.

In Step 1108, T the he NG-UP entity sends a user plane update response message to the SMF entity.

The user plane update response message may be used to confirm that the N3 connection is set up.

In Step 1109, the DN sends downlink data of the terminal device to the NG-(R)AN device by using the NG-UP entity.

In Step 1110, the NG-(R)AN device buffers the downlink data of the terminal device that is sent by the DN.

In Step 1111, the AMF entity sends a paging message to the terminal device.

In Step 1112, after the terminal device receives the paging message, the terminal device sets up a wireless connection to the NG-(R)AN device.

In Step 1113, the NG-(R)AN device sends the buffered downlink data of the terminal device to the terminal device.

In Step 1114, the NG-(R)AN device sends a notification message to the AMF entity.

The notification message may be used to inform the AMF entity that the connection is already successful. It should be understood that the notification message includes the identification information of the terminal device.

In Step 1115: The AMF entity sends a feedback message to the NEF entity, where the message is used to represent that the terminal device can transmit data by using the N3 connection and the N2 connection that are set up in the foregoing processes, and the feedback message includes context information of the terminal device. It should be understood that FIG. 11 shows detailed steps or operations in this embodiment of this application, but these steps or operations are merely examples. In this embodiment of this application, another operation or variations of the various operations in FIG. 11 may further be performed. In addition, the steps in FIG. 11 may be performed in an order different from that presented in FIG. 11, and the operations in FIG. 11 may not necessarily be all performed. Various solutions of the embodiments of this application are described below with reference to examples.

Figure 12:
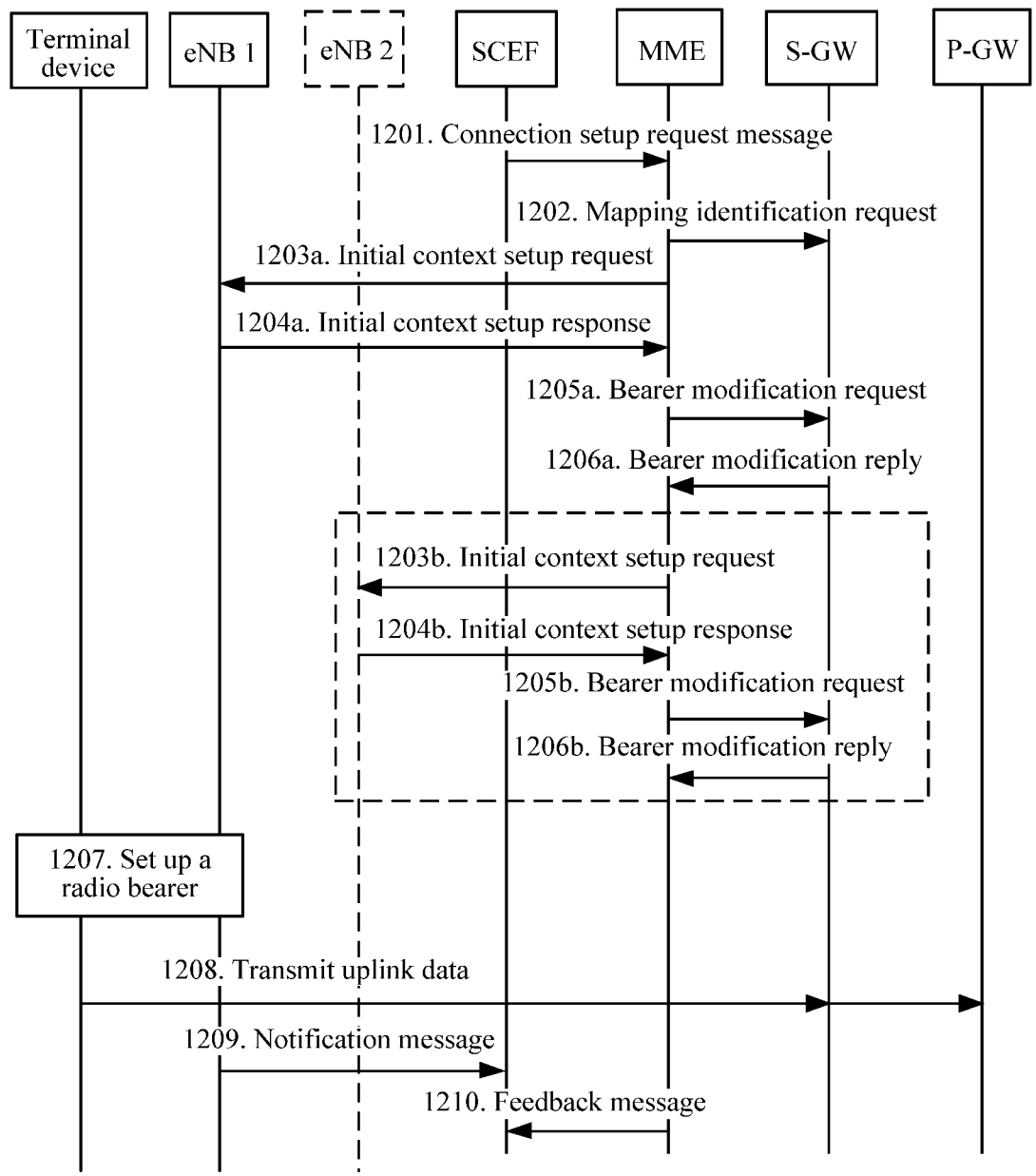
FIG. 12 is a schematic flowchart of a method according to an embodiment of this application.

FIG. 12 is a schematic flowchart of a method according to this application. In this embodiment, the control plane functional entity is the MME, the user plane functional entity is the S-GW entity, the network capability exposure functional entity is the SCEF entity, and each of an eNB 1 and an eNB 2 is the access network device. As shown in FIG. 12, the method includes the following steps.

In Step 1201, the SCEF entity sends a connection setup request message to the MME.

It should be understood that before step 1201, as described in the embodiment in FIG. 4, the MME determines, based on a context release message sent by the terminal device, that the terminal device is switched from the connected mode to the idle mode or the inactive mode. Further, the MME can send prediction information of the terminal device to the SCEF entity by using the prediction network element, and the prediction information includes a location and a moment at which the terminal device is predicted to be switched to the connected mode. Further, the SCEF entity generates the connection setup request message based on the foregoing information.

Before sending the message, the SCEF entity may first switch an identifier of the terminal device outside a core network to an identifier of the terminal device in the core network.

The message may explicitly instruct the MME to set up a connection for the terminal device, or may implicitly instruct the MME to set up a connection for the terminal device.

It should be understood that the connection setup request message may be the first message shown in the embodiment in FIG. 4.

For example, in the explicit indication manner, the connection setup request message may include a flag bit used to set up an S1-MME connection and/or an S1-U connection, information, such as an ECGI, about the location at which the terminal device is switched to the connected mode, identification information, such as an IMSI, of the terminal device, and the like.

After the MME receives the connection setup request message sent by the SCEF entity, if the connection setup request message sent in step 1201 is an explicit message, the MME determines, based on the flag bit in the connection setup request message, whether to set up the connection. For example, when a value of the flag bit used to instruct to set up the connection is 1, the MME determines to set up the connection.

For example, in the implicit indication manner, a name of the connection setup request message may be used to instruct to set up a first connection and/or a second connection. In addition, the implicit connection setup request message includes the information, such as the ECGI, about the location at which the terminal device is switched to the connected mode, the identification information, such as the IMSI, of the terminal device, and the like.

Then, the MME finds, based on the information that is about the location at which the terminal device is switched to the connected mode and that is in the connection setup request message, corresponding eNB 1 and eNB 2 from a relationship list stored in the MME locally. Each of the eNB 1 and the eNB 2 is the access network device in the embodiment in FIG. 4, and the MME predicts that the terminal device connects to the eNB 1 or the eNB 2 when the terminal device is switched to the connected mode.

In Step 1202, the MME sends a mapping identification request to the S-GW entity.

Usually, the S-GW entity and a particular connection of the terminal device are in a one-to-one mapping relationship, for example, a gTP-TEID in one S-GW entity corresponds to an gTP-TEID in one eNB. However, in the present invention, a gTP-TEID in one S-GW entity corresponds to gTP-TEIDs in a plurality of eNBs. This mapping relationship is a one-to-many mapping relationship. Therefore, the mapping identification request may be used to request the S-GW entity to allocate the gTP-TEID in the S-GW to each of the plurality of eNBs. For downlink data, if a buffering method of the eNB is used, the downlink data needs to be sent to the plurality of eNBs at the same time. Therefore, the downlink data obtained by the S-GW entity from the P-GW entity needs to be sent to the plurality of eNBs.

In Step 1203a, the MME sends an initial context setup request message to the eNB 1, where the initial context setup request message carries context information of an S1-MME connection between the eNB 1 and the MME in the MME, for example, a connection port number of the S1-MME connection in the MME; and context information of an S1-U connection between the eNB 1 and the S-GW entity in the S-GW entity, for example, a tunnel number of the S1-U connection in the S-GW, and the tunnel number is prestored in the MME when the terminal device attaches a network.

It should be understood that control plane context information of the terminal device includes the context information of the S1-MME connection between the eNB 1 and the MME in the MME; and user plane context information of the terminal device includes the context information of the S1-U connection between the eNB 1 and the S-GW entity in the S-GW entity.

For example, the initial context setup request message includes an indication bit indicating that a DRB between the terminal device and the eNB 1 is not immediately set up. The initial context setup request message is further used to inform the eNB 1 of context information of the terminal device, for example, a network capability of the terminal device, and an original tunnel number of the S1-U connection in the S-GW that is provided to the terminal device. The initial context setup request message is further used to trigger the eNB 1 to allocate resources required by the connections to the terminal device.

After receiving the message, the eNB 1 stores the information carried in the initial context setup request message, for example, identification information MME-UE-S1AP-ID of the S1-MME connection between the MME and the eNB 1 in the MME, and identification information of the S1-U connection between the eNB 1 and the S-GW entity in the S-GW entity, to separately allocate the network resources to the connections.

It should be understood that the initial context setup request message in the embodiment in FIG. 12 includes the first identification information or the second identification information in the embodiment in FIG. 4.

In Step 1204a, send an initial context setup response message to the MME. The initial context setup response message carries identification information ENB-UE-S1AP-ID of the S1-MME connection between the MME and the eNB 1 in the eNB 1, namely, the first identification information in the embodiment in FIG. 4; and identification information gTP-TEID of the S1-U connection between the eNB 1 and the S-GW entity in the eNB 1, namely, the second identification information in the embodiment in FIG. 4.

After receiving the initial context setup response message, the MME may store the ENB-UE-S1AP-ID. In this case, the S1-MME connection between the eNB 1 and the MME is set up.

In Step 1205a, the MME sends a bearer modification request message to the S-GW entity, where the bearer modification request message carries the identification information gTP-TEID of the S1-U connection in the S-GW entity.

In Step 1206a, the S-GW entity sends a bearer modification reply message to the MME, where the message is used to confirm that the bearer modification request message sent in step 1205a is received, so that the S1-U connection between the eNB 1 and the S-GW entity is set up.

In Step 1203b, the MME sends an initial context setup request message to the eNB 2, where the initial context setup request message carries identification information of an S1-MME connection between the eNB 2 and the MME in the MME, and identification information of an S1-U connection between the eNB 2 and the S-GW entity in the S-GW entity.

For example, the initial context setup request message includes an indication bit used to instruct not to immediately set up a DRB between the terminal device and the eNB 2.

After receiving the message, the eNB 2 stores the information carried in the initial context setup request message, for example, identification information MME-UE-S1AP-ID of the S1-MME connection between the MME and the eNB 1 in the MME, and the identification information of the S1-U connection between the eNB 2 and the S-GW entity in the S-GW entity, to separately allocate network resources to the connections.

It should be understood that the initial context setup request message in the embodiment in FIG. 12 includes the first identification information or the second identification information in the embodiment in FIG. 4.

In Step 1204b, send an initial context setup response message to the MME. The initial context setup response message carries identification information ENB-UE-S1AP-ID of the S1-MME connection between the MME and the eNB 2 in the eNB 2, namely, the first identification information in the embodiment in FIG. 4; and identification information gTP-TEID of the S1-U connection between the eNB 2 and the S-GW entity in the eNB 2, namely, the second identification information in the embodiment in FIG. 4.

After receiving the initial context setup response message, the MME may store the ENB-UE-S1AP-ID. In this case, the S1-MME connection between the eNB 2 and the MME is set up.

In Step 1205a, the MME sends a bearer modification request message to the S-GW entity, where the bearer modification request message carries the identification information gTP-TEID of the S1-U connection in the eNB 2.

In Step 1206a, the S-GW entity sends a bearer modification reply message to the MME.

The message may be used to confirm that the bearer modification request message sent in step 1205a is received, so that it is determined that the S1-U connection between the eNB 2 and the S-GW is set up.

If the terminal device determines that the eNB 1 is an actual access network device to which the terminal device connects when the terminal device is switched to the connected mode, in step 1207, when the terminal device needs to transmit uplink data, the terminal device sets up a wireless connection to the eNB 1.

The wireless connection may include an RRC connection and a DRB that are set up between the terminal device and the eNB 1. In this case, the terminal device may send the uplink data to the eNB 1.

In Step 1208, the terminal device transmits the uplink data.

In Step 1209, the eNB 1 sends a notification message to the MME. It should be understood that the notification message is the third message in the embodiment in FIG. 4 and is used to inform the MME of current location information of the terminal device or information about the current connected eNB 1.

In Step 1210, the MME sends a feedback message to the SCEF entity, where the message is used to represent that the terminal device can transmit data by using the S1-MME connection and the S1-U connection that are set up in the foregoing processes, and the feedback message includes the location information of the terminal device or the information about the connected eNB 1.

It should be understood that FIG. 12 shows detailed steps or operations in this embodiment of this application, but these steps or operations are merely examples. In this embodiment of this application, another operation or variations of the various operations in FIG. 12 may further be performed. In addition, the steps in FIG. 12 may be performed in an order different from that presented in FIG. 12, and the operations in FIG. 12 may not necessarily be all performed.

Figure 13:
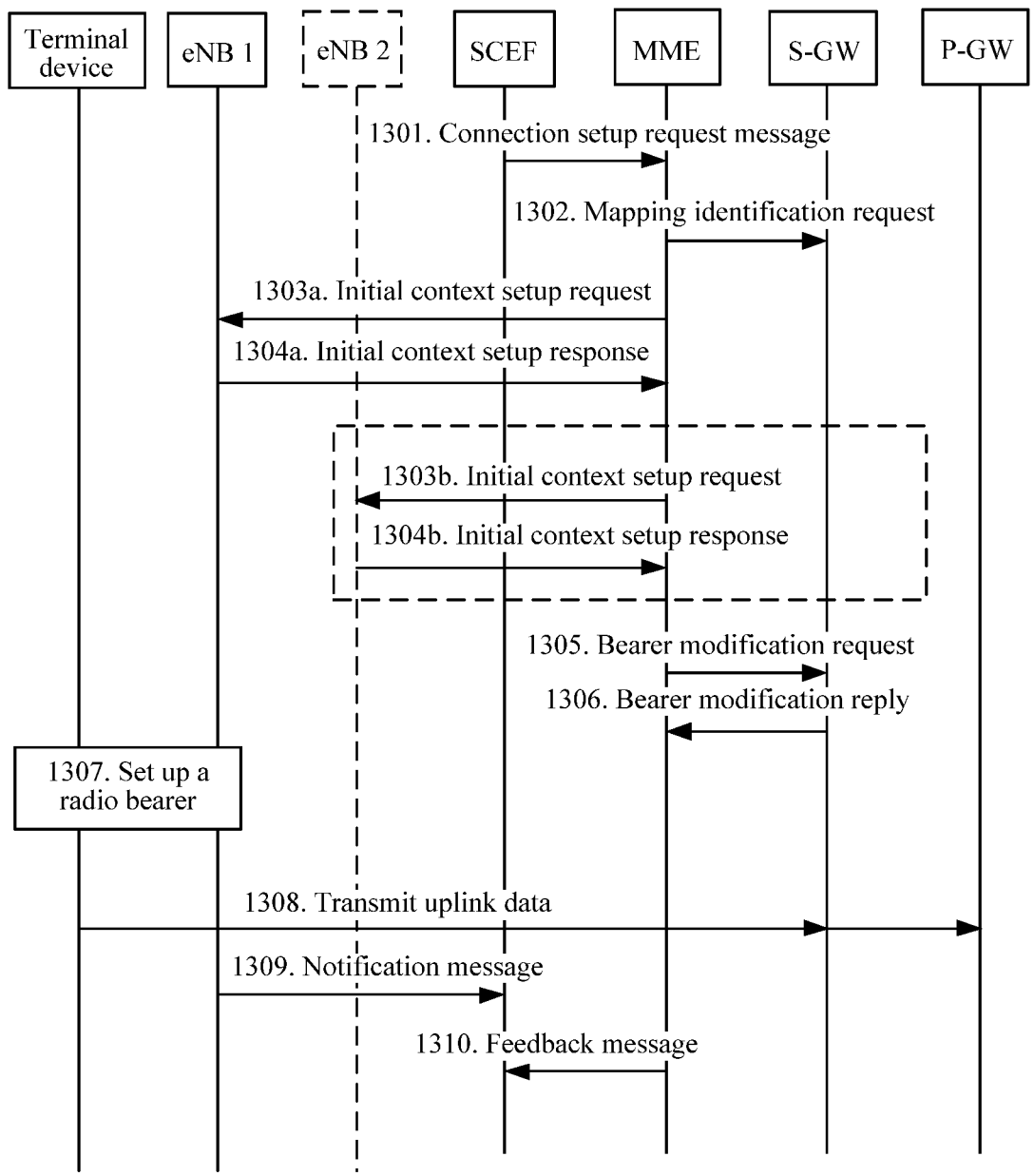
FIG. 13 is a schematic flowchart of a method according to an embodiment of this application.

FIG. 13 is a schematic flowchart of a method according to this application. In this embodiment, the control plane functional entity is the MME, the user plane functional entity is the S-GW entity, the network capability exposure functional entity is the SCEF entity, and each of an eNB 1 and an eNB 2 is the access network device. As shown in FIG. 13, the method includes the following steps.

In Step 1301, the SCEF entity sends a connection setup request message to the MME.

It should be understood that before step 1301, as described in the embodiment in FIG. 4, the MME determines, based on a context release message sent by the terminal device, that the terminal device is switched from the connected mode to the idle mode or the inactive mode. Further, the MME can send prediction information of the terminal device to the SCEF entity by using the prediction network element, and the prediction information includes a location and a moment at which the terminal device is predicted to be switched to the connected mode. Further, the SCEF entity generates the connection setup request message based on the foregoing information.

Before sending the message, the SCEF first switches an identifier of the terminal device outside a core network to an identifier of the terminal device in the core network. The connection setup request message in step 1301 may explicitly instruct the MME to set up a connection for the terminal device, or may implicitly instruct the MME to set up a connection for the terminal device.

It should be understood that the connection setup request message may be the first message shown in the embodiment in FIG. 4.

For example, in the explicit indication manner, the connection setup request message includes a flag bit used to instruct to set up an S1-MME connection and/or an S1-U connection, information, such as an ECGI, about a location at which the terminal device is switched to the connected mode, identification information, such as an IMSI, of the terminal device, and the like. It should be understood that the identification information of the terminal device may be the identifier of the terminal device outside the core network or the identifier of the terminal device in the core network.

After the MME receives the connection setup request message sent by the SCEF entity, if the connection setup request message sent in step 1201 is an explicit message, the MME determines, based on the flag bit in the connection setup request message, whether to set up the connection. For example, when a value of the flag bit used to instruct to set up the connection is 1, the MME determines to set up the connection. For example, in the implicit indication manner, a name of the connection setup request message may be used to instruct to set up a first connection and/or a second connection. The implicit connection setup request message may include the information, such as the ECGI, about the location at which the terminal device is switched to the connected mode, the identification information, such as the IMSI, of the terminal device, and the like.

Then, the MME finds, based on the information that is about the location at which the terminal device is switched to the connected mode and that is in the connection setup request message, corresponding eNB 1 and eNB 2 from a mapping relationship list stored in the MME locally. Each of the eNB 1 and the eNB 2 is the access network device in the embodiment in FIG. 4, and the MME predicts that the terminal device connects to the eNB 1 or the eNB 2 when the terminal device is switched to the connected mode.

In Step 1302, the MME sends a mapping identification request to the S-GW entity.

The mapping identification request is the same as that described in the foregoing embodiment, and details are not described herein again.

In Step 1303a, the MME sends an initial context setup request message to the eNB 1, where the initial context setup request message carries identification information of an S1-MME connection between the eNB 1 and the MME in the MME, and identification information of an S1-U connection between the eNB 1 and the S-GW entity in the S-GW entity.

For example, the initial context setup request message includes an indication bit used to instruct not to immediately set up a DRB between the terminal device and the eNB 1.

After receiving the message, the eNB 1 stores identification information MME-UE-S1AP-ID of the S1-MME connection between the MME and the eNB 1 in the MME, and the identification information of the S1-U connection between the eNB 1 and the S-GW entity in the S-GW entity, to separately allocate network resources to the S1-MME connection and the S1-U connection.

It should be understood that the initial context setup request message in the embodiment in FIG. 13 includes the first identification information or the second identification information in the embodiment in FIG. 4.

In Step 1304a, the eNB 1 sends an initial context setup response message to the MME.

The initial context setup response message carries identification information ENB-UE-S1AP-ID of the S1-MME connection between the MME and the eNB 1 in the eNB 1, namely, the first identification information in the embodiment in FIG. 4; and identification information gTP-TEID of the S1-U connection between the eNB 1 and the S-GW in the eNB 2, namely, the second identification information in the embodiment in FIG. 4.

After receiving the initial context setup response message, the MME stores the ENB-UE-S1AP-ID. In this case, the S1-MME connection between the eNB 1 and the MME is set up.

In Step 1303b, the MME sends an initial context setup request message to the eNB 2.

The initial context setup request message carries identification information of an S1-MME connection between the eNB 2 and the MME in the MME, and identification information of an S1-U connection between the eNB 2 and the S-GW entity in the S-GW entity.

For example, the initial context setup request message includes an indication bit indicating that a DRB between the terminal device and the eNB 2 is not immediately set up.

After receiving the message, the eNB 2 stores identification information MME-UE-S1AP-ID of the S1-MME connection between the MME and the eNB 2 in the MME, and identification information of the S1-U connection between the eNB 2 and the S-GW entity in the S-GW entity, to separately allocate network resources to the S1-MME connection and the S1-U connection.

It should be understood that the initial context setup request message in the embodiment in FIG. 13 includes the first identification information or the second identification information in the embodiment in FIG. 4.

In Step 1304b, the eNB 2 sends an initial context setup response message to the MME.

The initial context setup response message carries identification information ENB-UE-S1AP-ID of the S1-MME connection between the MME and the eNB 2 in the eNB 2, namely, the first identification information in the embodiment in FIG. 4; and identification information gTP-TEID of the S1-U connection between the eNB 2 and the S-GW in the S-GW, namely, the second identification information in the embodiment in FIG. 4.

After receiving the initial context setup response message, the MME stores the ENB-UE-S1AP-ID. In this case, the S1-MME connection between the eNB 2 and the MME is set up.

In Step 1305, the MME sends a bearer modification request message to the S-GW entity.

The bearer modification request message carries identification information gTP-TEID of the S1-U connection in the eNB 2, and the identification information gTP-TEID of the S1-U connection in the eNB 1.

In Step 1306, the S-GW entity sends a bearer modification reply message to the MME.

The message may be used to confirm that the bearer modification request message sent in step 604 is received. The S1-U connection between the eNB 2 and the S-GW entity, and the S1-U connection between the eNB 1 and the S-GW entity are set up.

It should be understood that, different from the embodiment shown in FIG. 12, in the embodiment shown in FIG. 13, the bearer modification request message sent by the MME to the S-GW entity carries both information about the S1-U connection between the eNB 1 and the S-GW entity and information about the S1-U connection between the eNB 2 and the S-GW entity.

If the terminal device determines that the eNB 1 is an actual access network device to which the terminal device connects when the terminal device is switched to the connected mode, when the terminal device needs to transmit uplink data, the terminal device performs step 1307 of setting up a wireless connection to the eNB 1.

The wireless connection may include an RRC connection and a DRB that are set up between the terminal device and the eNB 1. In this case, the terminal device may send the uplink data to the eNB 1.

In Step 1308, the terminal device sends the uplink data.

In Step 1309, the eNB 1 sends a notification message to the MME.

The notification message may be the third message in the embodiment in FIG. 4 and is used to inform the MME of current location information of the terminal device or information about the current connected eNB 1.

In Step 1310, the MME sends a feedback message to the SCEF entity.

The message may be used to represent that the terminal device can transmit data by using the S1-MME connection and the S1-U connection that are set up in the foregoing processes, and the feedback message includes the current location information of the terminal device or the information about the current connected eNB 1.

It should be understood that, the embodiments of FIG. 12 and FIG. 13 show schematic flowcharts in which the terminal device is switched to the connected mode when the terminal device needs to transmit the uplink data in the 4G system. When the terminal device needs to transmit the downlink data, processes of pre-setting up the connections may be the same as those in steps 1201 to 1206b, or may be the same as those in steps 1301 to 1306b. For brevity, details are not described again.

It should be understood that FIG. 13 shows detailed steps or operations in this embodiment of this application, but these steps or operations are merely examples. In this embodiment of this application, another operation or variations of the various operations in FIG. 13 may further be performed. In addition, the steps in FIG. 13 may be performed in an order different from that presented in FIG. 13, and the operations in FIG. 13 may not necessarily be all performed.

Figure 14:
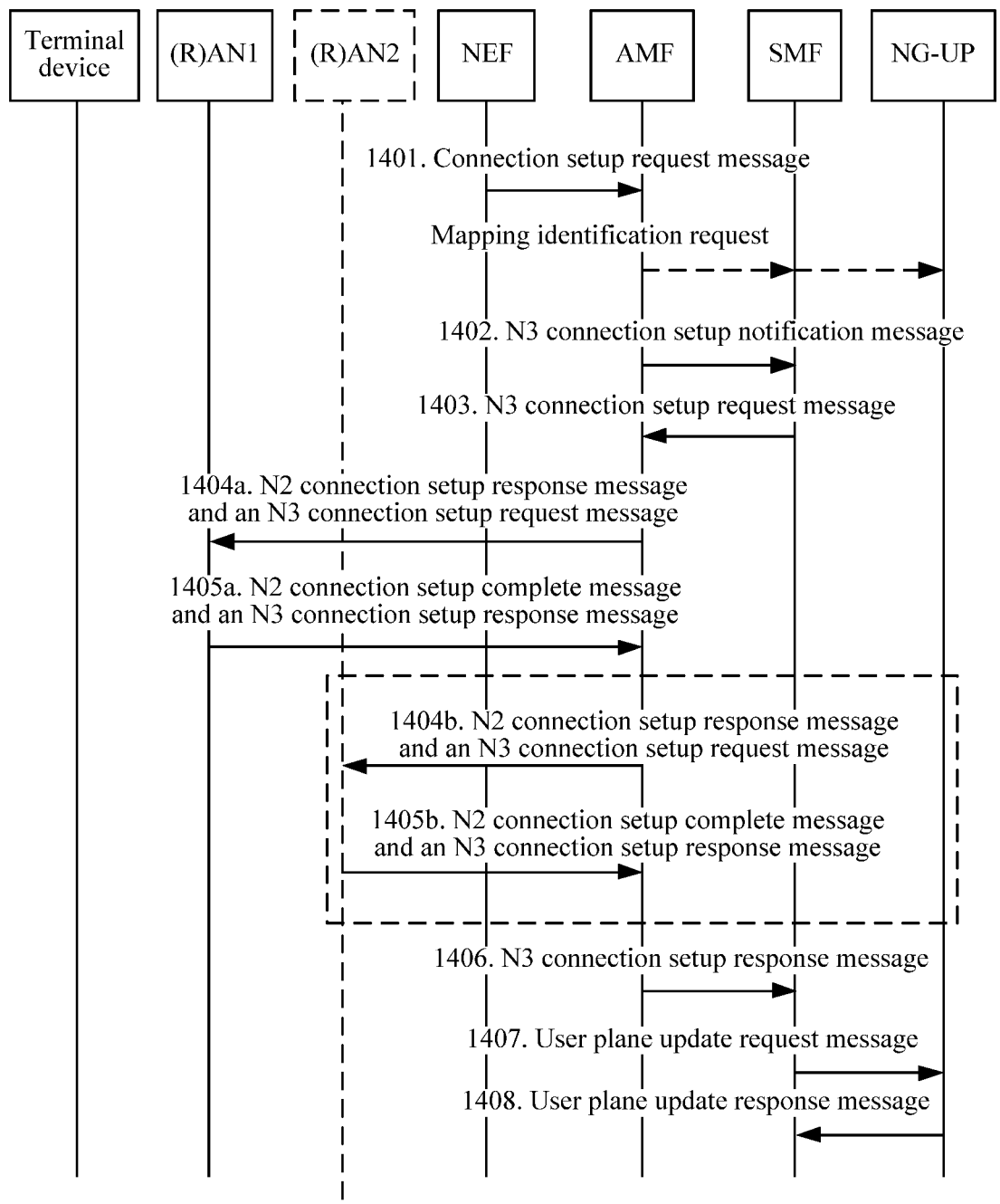
FIG. 14 is a schematic flowchart of a method according to an embodiment of this application.

FIG. 14 is a schematic flowchart of a method according to this application. In this embodiment, the first control plane functional entity is the SMF entity, the second control plane functional entity is the AMF entity, the user plane functional entity is the NG-UP entity, and the network capability exposure functional entity is the NEF entity. As shown in FIG. 14, the method includes the following steps.

In Step 1401: The NEF entity sends a terminal device connection setup request message to the AMF entity.

It should be understood that before step 1401, as described in the embodiment in FIG. 4, the AMF entity determines, based on a context release message sent by the terminal device, that the terminal device is switched from the connected mode to the idle mode or the inactive mode. Further, the AMF entity can send prediction information of the terminal device to the NEF entity by using the prediction network element, and the prediction information includes a location and a moment at which the terminal device is predicted to be switched to the connected mode. Further, the NEF entity generates the connection setup request message based on the foregoing information. The message includes information about the predicted location at which the terminal device is switched to the connected mode, and identification information of the terminal device.

It should be understood that the setup request message may be the first message in the embodiment in FIG. 4. The connection setup request message may explicitly instruct the control plane functional entity to start a process of setting up an N2 connection and/or a process of setting up an N3 connection, or may implicitly instruct the control plane functional entity to start a process of setting up an N2 connection and/or a process of setting up an N3 connection. For example, the first connection in the embodiment shown in FIG. 4 is the N2 connection in the embodiment in FIG. 14, and the second connection is the N3 connection in the embodiment in FIG. 14.

It should be further understood that the connection setup message may explicitly or implicitly instruct the AMF entity to set up the connection for the terminal device.

In Step 1402, the AMF entity sends an N3 connection notification message to the SMF entity.

The N3 connection notification message may be the second message described in the embodiment in FIG. 4, and the N3 connection notification message includes the information carried in the connection setup request message in step 1401.

In Step 1403, after receiving the message in step 1402, the SMF entity sends an N3 connection setup request message to the AMF entity.

The connection setup request message carries context information of the N3 connection in the SMF entity. For example, the connection setup request message may include identification information of the N3 connection in the SMF entity. It should be understood that the SMF entity or the AMF entity predicts, based on context information of the terminal device that is carried in the connection setup request message, that an access network device to which the terminal device connects when the terminal device is switched to the connected mode is a (R)AN1 device or a (R)AN2 device.

In Step 1404a, the AMF entity forwards, to the (R)AN1 device, the N3 connection setup request message received from the SMF entity, and sends an N2 connection setup response message to the (R)AN1 device.

It should be understood that the N3 connection setup request message and the N2 connection setup response message may be a same message, or may be two different messages. If the N3 connection setup request message and the N2 connection setup response message are two different messages, an order of sending the messages is not limited in this application.

It should be understood that user plane context information of the terminal device includes the context information of the N3 connection in the SMF, and control plane context information of the terminal device includes context information of the N2 connection in the AMF entity.

After the (R)AN 1 device receives the message sent in step 1404a, the (R)AN1 device stores information used to set up the N3 connection, for example, identification information of the N3 connection in the NG-UP entity; and information used to set up the N2 connection, for example, identification information of the N2 connection in the AMF entity.

Further, in step 1405a, an N2 connection setup complete message and an N3 connection setup response message are sent to the AMF entity. The N3 connection setup response message includes context information of the N3 connection in the (R)AN1 device, including identification information of the N3 connection in the (R)AN1 device and the like. The N2 connection setup complete message includes context information of the N2 connection in the (R)AN1 device, including identification information of the N2 connection in the (R)AN 1 device, and the like. After receiving the message sent in step 1405a, the AMF stores the context information of the N2 connection in the (R)AN1 device. In this case, the N2 connection is set up.

Similarly, in step 1404b, the AMF forwards, to the (R)AN2 device, the N3 connection setup request message received from the SMF, and the AMF also sends an N2 connection setup response message to the (R)AN2 device.

It should be understood that the N3 connection setup request message and the N2 connection setup response message may be a same message, or may be two different messages. If the N3 connection setup request message and the N2 connection setup response message are two different messages, an order of sending the messages is not limited in this application.

After the (R)AN2 device receives the message sent in step 1404a, the (R)AN2 device stores context information used to set up the N3 connection, for example, identification information of the N3 connection in the NG-UP entity; and context information used to set up the N2 connection, for example, identification information of the N2 connection in the AMF entity.

Further, in step 1405a, an N2 connection setup complete message and an N3 connection setup response message are sent to the AMF entity. For example, the N3 connection setup response message includes context information of the N3 connection in the (R)AN 2 device, including identification information of the N3 connection in the (R)AN2 device and the like. The N2 connection setup complete message includes context information of the N2 connection in the (R)AN2 device, including identification information of the N2 connection in the (R)AN 2 device, and the like.

After receiving the message sent in step 1405a, the AMF stores the context information of the N2 connection in the (R)AN2 device. In this case, the N2 connection is set up.

Further, in step 1406, the AMF entity forwards the N3 connection setup response message to the SMF entity, and the N3 connection setup response message carries the context information of the N3 connection in the (R)AN2 device and/or the context information of the N3 connection in the (R)AN1 device.

It should be understood that the user plane context information of the terminal device includes the context information of the N3 connection in the (R)AN2 device and/or the context information of the N3 connection in the (R)AN1 device.

In Step 1407, after receiving the N3 connection setup response message, the SMF entity sends a user plane update request message to the NG-UP entity.

The user plane update request message may include the context information of the N3 connection in the (R)AN 2 device and/or the context information of the N3 connection in the (R)AN 1 device in the N3 connection setup response message.

After receiving the message, the NG-UP stores the context information of the N3 connection in the (R)AN1 device and/or the context information of the N3 connection in the (R)AN2 device. In this case, the N3 connection is set up.

In Step 1408, the NG-UP entity sends a user plane update response message to the SMF entity.

The user plane update response message may be used to confirm that the N3 connection is set up.

It should be understood that step 1406 may be divided into sending, by the AMF entity, two N3 connection setup response messages to the SMF entity. The two N3 connection setup response messages respectively include the identification information of the N3 connection in the (R)AN2 device and the like, and the identification information of the N3 connection in the (R)AN1 device and the like. An execution order of the two N3 connection setup response messages is not limited in this embodiment of this application. For example, actually, the two N3 connection setup response messages are respectively used to set up a connection between the (R)AN1 device and the user plane functional entity and a connection between the (R)AN2 device and the user plane functional entity.

It should be further understood that step 1407 may be divided into sending, by the SMF entity, two user plane update request messages to the NG-UP entity. The two user plane update request messages respectively carry the identification information of the N3 connection in the (R)AN2 device and the like, and the identification information of the N3 connection in the (R)AN1 device and the like. An execution order of the two user plane update request messages is not limited in this embodiment of this application.

It should be further understood that step 1408 may be divided into sending, by the NG-UP entity, two user plane update response messages to the SMF entity. The two user plane update response messages are respectively used to confirm that the connection between the (R)AN1 device and the user plane functional entity and the connection between the (R)AN2 device and the user plane functional entity are set up. An execution order of the two user plane update response messages is not limited in this embodiment of this application.

According to the foregoing steps, the connection between the (R)AN1 device and the first control plane functional entity is set up, and the connection between the (R)AN1 device and the user plane functional entity is set up; similarly, the connection between the (R)AN2 device and the first control plane functional entity is set up, and the connection between the (R)AN2 device and the user plane functional entity is set up.

Further, when the terminal device needs to transmit uplink data, the terminal device sets up a wireless connection to an access network device. For example, when the (R)AN1 device is the actual access network device to which the terminal device connects when the terminal device is switched to the connected mode, the terminal device sets up a wireless connection to the (R)AN 1 device.

Further, the connection for sending the uplink data by the terminal device is already set up. Therefore, the terminal device may send the uplink data.

It should be understood that if the (R)AN1 device is the actual access network device to which the terminal device connects when the terminal device is switched to the connected mode, the (R)AN1 device may send a notification message to the AMF entity. It should be understood that the notification message is the third message in the embodiment in FIG. 4, and the notification message is used to inform the AMF entity that the (R)AN1 device already successfully provides a service to the terminal device. It should be understood that, the notification message includes the identification information of the terminal device.

Further, the AMF entity sends a feedback message to the NEF entity, the message may be used to represent that the terminal device can transmit data by using the N3 connection and the N2 connection that are set up in the foregoing processes, and the feedback message includes the context information of the terminal device.

It should be understood that when the terminal device needs to perform the downlink transmission, a transmission process with the access network device is similar to steps 909 to 913 shown in FIG. 9, or similar to steps 1109 to 1115 shown in FIG. 11, and details are not described herein again.

It should be understood that FIG. 14 shows detailed steps or operations in this embodiment of this application, but these steps or operations are merely examples. In this embodiment of this application, another operation or variations of the various operations in FIG. 14 may further be performed. In addition, the steps in FIG. 14 may be performed in an order different from that presented in FIG. 14, and the operations in FIG. 14 may not necessarily be all performed.

The schematic flowcharts in which the context information of the terminal device is pre-sent to the plurality of access network devices in the 4G system and the 5G system are respectively described with reference to FIG. 12 to FIG. 14.

Figure 15:
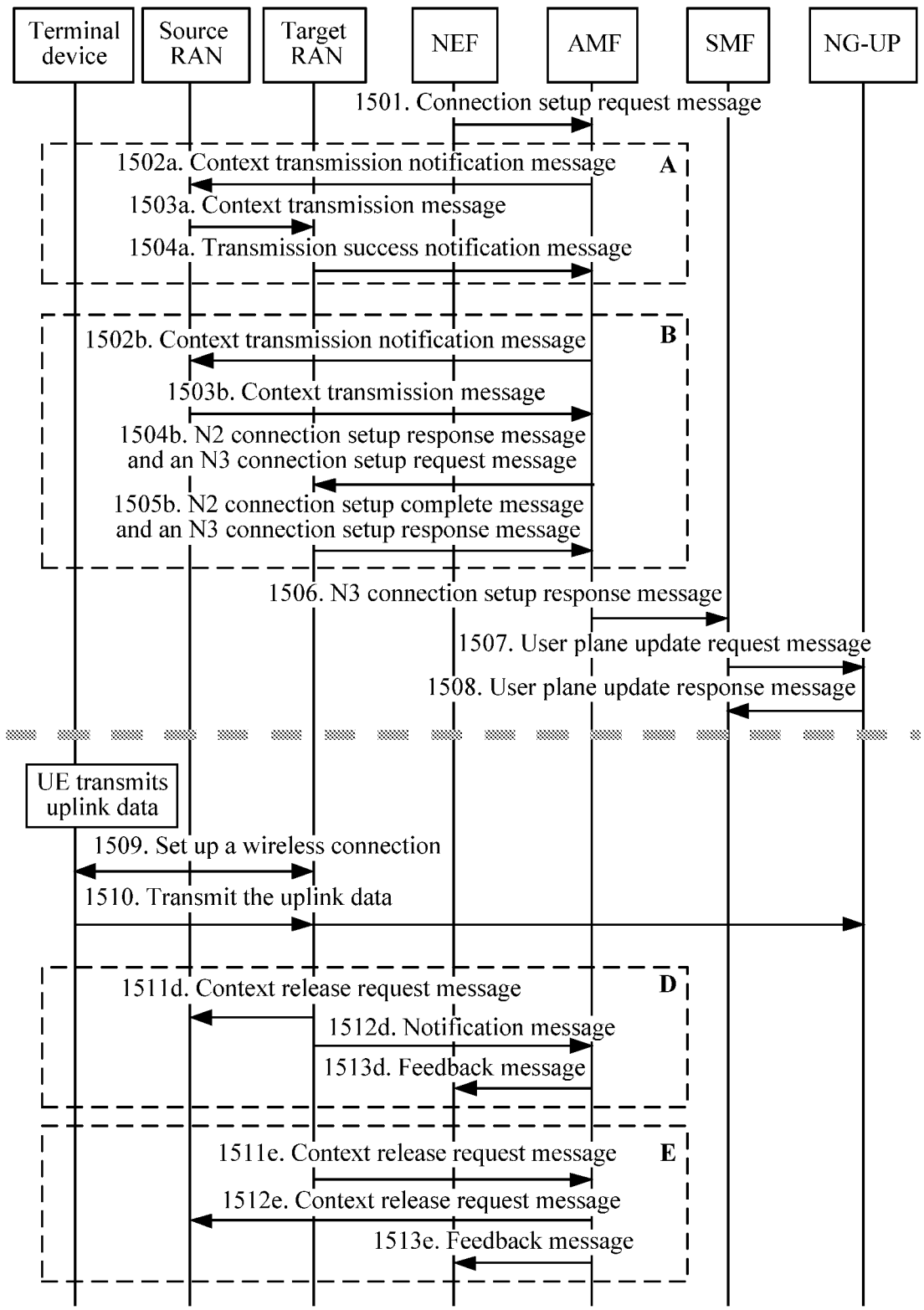
FIG. 15 is a schematic flowchart of a method according to an embodiment of this application.

FIG. 15 is a schematic flowchart of a method according to this application. In this embodiment, the first control plane functional entity is the SMF entity, the second control plane functional entity is the AMF entity, the user plane functional entity is the NG-UP entity, and the network capability exposure functional entity is the NEF. Further, an embodiment of this application shows a source access network (Source AN) device to which the terminal device connects before the terminal device is in the idle mode or the inactive mode, and a target access network (Target AN) device to which the terminal device connects when the terminal device is switched to the connected mode and that is determined based on access network information of the terminal device. As shown in FIG. 15, the method includes the following steps.

In Step 1501, the NEF entity sends a connection setup request message to the AMF entity.

It should be understood that before step 1501, as described in the embodiment in FIG. 4, the AMF entity determines, based on a context release message sent by the terminal device, that the terminal device is switched from the connected mode to the idle mode or the inactive mode. Further, the AMF entity can send prediction information of the terminal device to the NEF entity by using the prediction network element, and the prediction information includes a location and a moment at which the terminal device is predicted to be switched to the connected mode. Further, the NEF entity generates the connection setup request message based on the foregoing information. The connection setup request message carries the access network information of the terminal device. For example, the connection setup request message carries an ECGI of the terminal device, and identification information of the terminal device or identification information of an access network device. Therefore, the AMF entity may determine the target access network (Target AN) device of the terminal device based on the access network information.

In Step 1502a, the AMF entity sends a context transmission notification message to the source access network device.

The context transmission notification message may be used to instruct the source access network device to send context information of the terminal device to the target access network device. Optionally, the context transmission notification message carries identification information of the target access network device.

In Step 1503a, the source access network device sends the context information of the terminal device to the target access network device.

In Step 1504a, the target access network device sends a transmission success notification message to the AMF entity.

The transmission success notification message may be used to inform the AMF entity that the context information of the terminal device is already received.

Another optional manner of obtaining the context information of the terminal device by the target access network device may be replaced with steps 1502b to 1504b.

In Step 1502b, the AMF entity sends a context transmission notification message to the source access network device.

The context transmission notification message is used to instruct the source access network device to send the context information of the terminal device to the AMF entity.

In Step 1503b, the source access network device sends a context transmission message to the AMF entity.

The context transmission message carries the context information of the terminal device.

In Step 1504b, the AMF entity forwards, to the target access network device, the context information of the terminal device that is obtained from the source access network device.

The context information of the terminal device may include information used to set up an N3 connection, for example, identification information of the N3 connection in the NG-UP entity; and information used to set up an N2 connection, for example, identification information of the N2 connection in the AMF entity.

After the target RAN device receives the message sent in step 1506, the target RAN device stores the information used to set up the N3 connection, for example, the identification information of the N3 connection in the NG-UP entity; and the information used to set up the N2 connection, for example, the identification information of the N2 connection in the AMF entity.

Further, in step 1505*b*, an N2 connection setup complete message and an N3 connection setup response message are sent to the AMF entity. The N3 connection setup response message includes information of the N3 connection in a target RAN device, including identification information of the N3 connection in the target RAN device and the like. The N2 connection setup complete message includes information that is about the N2 connection and that is of the target RAN device, including identification information of the N2 connection in the target RAN device and the like.

After receiving the message sent in step 1505*b*, the AMF entity stores the information of the N2 connection in the target RAN device. In this case, the N2 connection is set up.

In addition, in step 1506, the AMF entity forwards the N3 connection setup response message to the SMF entity.

In Step 1507, after receiving the N3 connection setup response message, the SMF entity sends a user plane update request message to the NG-UP entity.

The user plane update request message includes the information of the N3 connection in the target RAN device in the N3 connection setup response message.

After receiving the message, the NG-UP entity stores the target RAN device-related information used to set up the N3 connection. In this case, the N3 connection is set up.

In Step 1508, the NG-UP entity sends a user plane update response message to the SMF entity, to confirm that the N3 connection is set up.

Further, when the terminal device needs to transmit uplink data, the terminal device performs step 1509 of setting up a wireless connection, and further performs step 1510 of transmitting the uplink data.

In Step 1511*d*, the target AN device sends a context release request message to the source AN device.

The context release request message is used to instruct the source AN device to delete the stored context information of the terminal device, to facilitate reducing a network resource.

In Step 1512*d*, the target AN device sends a notification message to the AMF entity.

It should be understood that the notification message may be the third message in the embodiment in FIG. 4, and the notification message is used to inform the AMF entity that the target AN device already successfully provides a service to the terminal device. It should be understood that the notification message includes the identification information of the terminal device.

In Step 1513*d*, the AMF entity sends a feedback message to the NEF entity.

The message may be used to represent that the terminal device can transmit data by using the N3 connection and the N2 connection that are set up in the foregoing processes, and the feedback message includes the context information of the terminal device.

It should be understood that steps 1511*d* to 1513*d* may alternatively be replaced with steps 1511*e* to 1513*e*.

In Step 1511*e*, the target AN device sends a context release request message to the AMF entity.

The context release request message may be used to request the AMF entity to forward the context release request message to the source AN device. It should be further understood that another function of the context release request message is informing the AMF entity that the target AN device already successfully provides a service to the terminal device. Optionally, the notification message includes the identification information of the terminal device.

Further, the AMF entity performs step 1512*e* of sending, by the AMF, the context release request message to the source AN device, where the context release request message is used to instruct the source AN device to delete the stored context information of the terminal device, to facilitate reducing a network resource.

In Step 1513*e*, the AMF entity sends a feedback message to the NEF entity.

The message may be used to represent that the terminal device can transmit data by using the N3 connection and the N2 connection that are set up in the foregoing processes, and the feedback message includes the context information of the terminal device.

It should be understood that before step 701, as described in the embodiment in FIG. 4, the AMF entity determines, based on the context release message sent by the terminal device, that the terminal device is switched from the connected mode to the idle mode or the inactive mode. Further, the AMF entity can send the prediction information of the terminal device to the NEF entity by using the prediction network element, and the prediction information includes the location and the moment at which the terminal device is predicted to be switched to the connected mode. Further, the NEF entity generates the connection setup request message based on the foregoing information.

Figure 16:
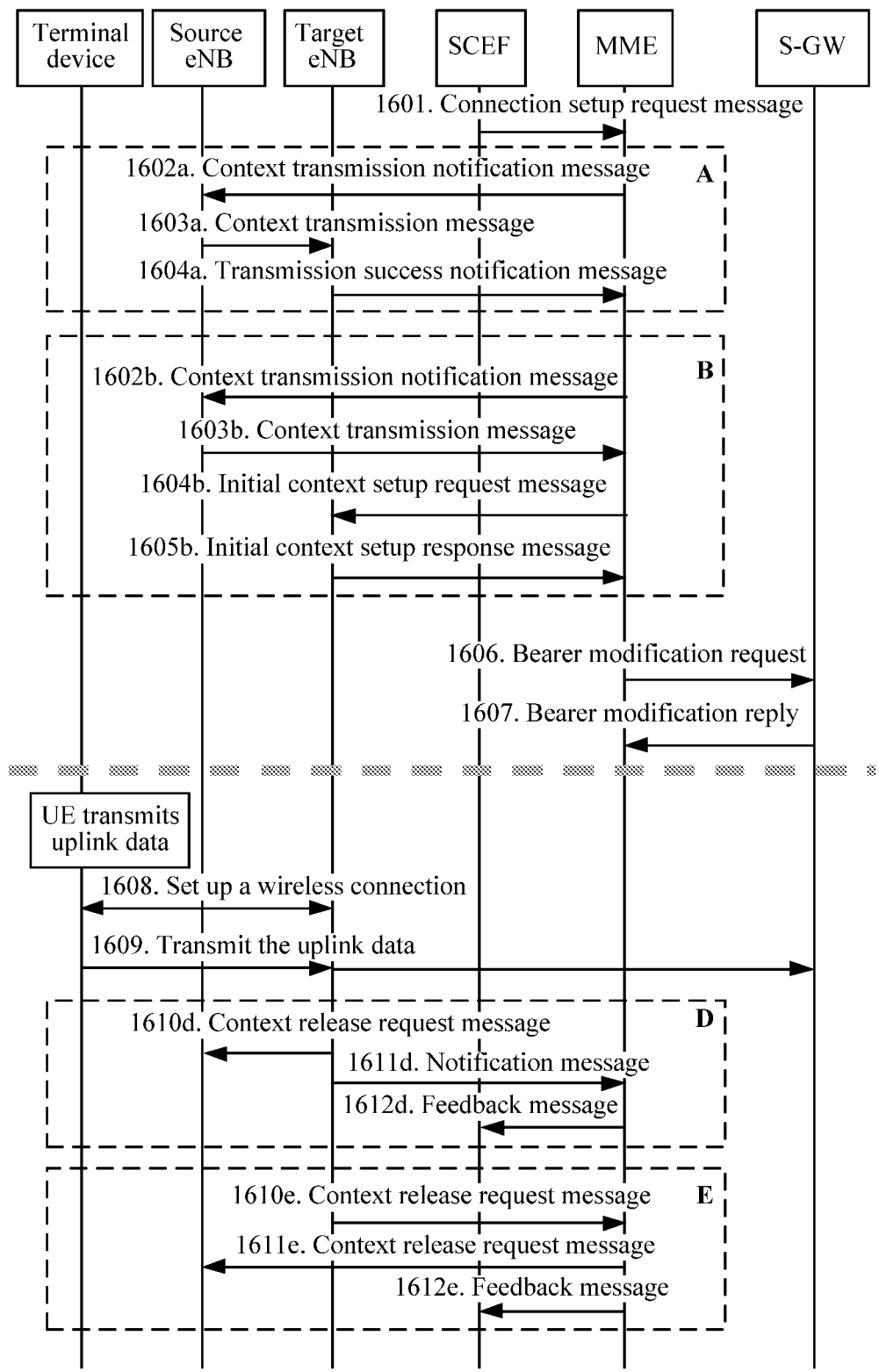
FIG. 16 is a schematic flowchart of a method according to an embodiment of this application.

FIG. 16 is a schematic flowchart of a method according to this application. In this embodiment, the first control plane functional entity is the MME, the user plane functional entity is the S-GW entity, and the network capability exposure functional entity is the SCEF entity. Further, an embodiment of this application shows a source access network device (for example, a source eNB) to which the terminal device connects before the terminal device is in the idle mode or the inactive mode, and a target access network device (for example, a target eNB) to which the terminal device may connect when the terminal device is switched to the connected mode and that is predicted based on access network information of the terminal device. As shown in FIG. 16, the method includes the following steps.

In Step 1601: The SCEF entity sends a connection setup request message to the MME.

It should be understood that before step 1501, as described in the embodiment in FIG. 4, the AMF entity determines, based on a context release message sent by the terminal device, that the terminal device is switched from the connected mode to the idle mode or the inactive mode. Further, the AMF entity can send prediction information of the terminal device to the NEF entity by using the prediction network element, and the prediction information includes a location and a moment at which the terminal device is predicted to be switched to the connected mode. Further, the NEF entity generates the connection setup request message based on the foregoing information.

The connection setup request message carries the access network information of the terminal device. For example, the connection setup request message carries an ECGI of the terminal device, and identification information of the terminal device or identification information of an access network device. Therefore, the MME may determine the target access network device (Target eNB) of the terminal device based on the access network information.

In Step 1602*a*, the MME sends a context transmission notification message to the source access network device.

The context transmission notification message may be used to instruct the source access network device to send context information of the terminal device to the target access network device. Optionally, the context transmission notification message carries identification information of the target access network device.

In Step 1603a, the source access network device sends the context information of the terminal device to the target access network device.

In Step 1604a, the target access network device sends a transmission success notification message to the MME.

The transmission success notification message may be used to inform the MME that the context information of the terminal device is already received.

Another optional manner of obtaining the context information of the terminal device by the target access network device may be replaced with steps 1602b to 1604b.

In Step 1602b, the MME sends a context transmission notification message to the source access network device, where the context transmission notification message is used to instruct the source access network device to send the context information of the terminal device to the MME.

In Step 1603b, the source access network device sends a context transmission message to the MME, where the context transmission message carries the context information of the terminal device.

In Step 1604b, the MME sends an initial context setup request message to the target eNB.

The initial context setup request message carries context information of an S1-MME connection between the target eNB and the MME in the MME, for example, identification information of the S1-MME connection in the MME; and context information of an S1-U connection between the eNB and the S-GW entity in the S-GW entity, for example, identification information of the S1-U connection in the S-GW.

For example, the initial context setup request message includes an indication bit indicating that a DRB between the terminal device and the target eNB is not immediately set up. The initial context setup request message is further used to inform the target eNB of the context information of the terminal device, for example, a network capability of the terminal device, and an original tunnel number of the S1-U connection in the S-GW entity that is provided to the terminal device. The initial context setup request message is further used to trigger the target eNB to allocate resources required by the connections to the terminal device.

After receiving the message, the target eNB stores information carried in the initial context setup request message, for example, identification information MME-UE-S1AP-ID of the S1-MME connection between the MME and the target eNB in the MME, and identification information of the S1-U connection between the target eNB and the S-GW entity in the S-GW entity.

It should be understood that the initial context setup request message in the embodiment in FIG. 16 includes the first identification information or the second identification information in the embodiment in FIG. 4.

In Step 1605b, send an initial context setup response message to the MME.

The initial context setup response message may carry identification information ENB-UE-S1AP-ID of the S1-MME connection between the MME and the target eNB in the target eNB, namely, the first identification information in the embodiment in FIG. 4; and identification information gTP-TEID of the S1-U connection between the eNB and the S-GW in the target eNB, namely, the second identification information in the embodiment in FIG. 4.

After receiving the initial context setup response message, the MME stores the ENB-UE-S1AP-ID. In this case, the S1-MME connection between the eNB and the MME is set up.

In Step 1606, the MME sends a bearer modification request message to the S-GW entity.

The bearer modification request message carries identification information gTP-TEID of the S1-U connection in the eNB.

In Step 1607, the S-GW entity sends a bearer modification reply message to the MME, where the message is used to confirm that the bearer modification request message sent in step 604 is received, so that the S1-U connection between the target eNB and the S-GW entity is set up.

Further, when the terminal device needs to transmit uplink data, the terminal device performs step 1608 of setting up a wireless connection, and further performs step 1609 of transmitting the uplink data.

In Step 1610d, the target eNB sends a context release request message to the source eNB.

The context release request message is used to instruct the source eNB to delete the stored context information of the terminal device, to facilitate reducing a network resource.

In Step 1611d, the target eNB sends a notification message to the MME.

It should be understood that the notification message may be the third message in the embodiment in FIG. 4, and the notification message is used to inform the MME that the target eNB already successfully provides a service to the terminal device. It should be understood that the notification message may include the identification information of the terminal device.

In Step 1612d, the MME sends a feedback message to the SCEF entity.

The message may be used to represent that the terminal device can transmit data by using the S1-MME connection and the S1-U connection that are set up in the foregoing processes, and the feedback message includes the context information of the terminal device.

It should be understood that steps 1610d to 1612d may alternatively be replaced with steps 1610e to 1612e.

In Step 1610e, the target eNB sends a context release request message to the MME.

The context release request message may be used to request the MME to forward the context release request message to the source eNB. It should be further understood that another function of the context release request message is informing the MME that the target eNB already successfully provides a service to the terminal device. Optionally, the notification message includes the identification information of the terminal device.

Further, the MME performs step 1611e of sending, by the MME, the context release request message to the source eNB, where the context release request message is used to instruct the source eNB to delete the stored context information of the terminal device, to facilitate reducing a network resource.

In Step 1612e, the MME sends a feedback message to the SCEF entity.

The message may be used to represent that the terminal device can transmit data by using the S1-MME connection and the S1-U connection that are set up in the foregoing processes, and the feedback message includes the context information of the terminal device.

It should be understood that FIG. 16 shows detailed steps or operations in this embodiment of this application, but these steps or operations are merely examples. In this embodiment of this application, another operation or variations of the various operations in FIG. 16 may further be performed. In addition, the steps in FIG. 16 may be performed in an order different from that presented in FIG. 16, and the operations in FIG. 16 may not necessarily be all performed.

Figure 17:
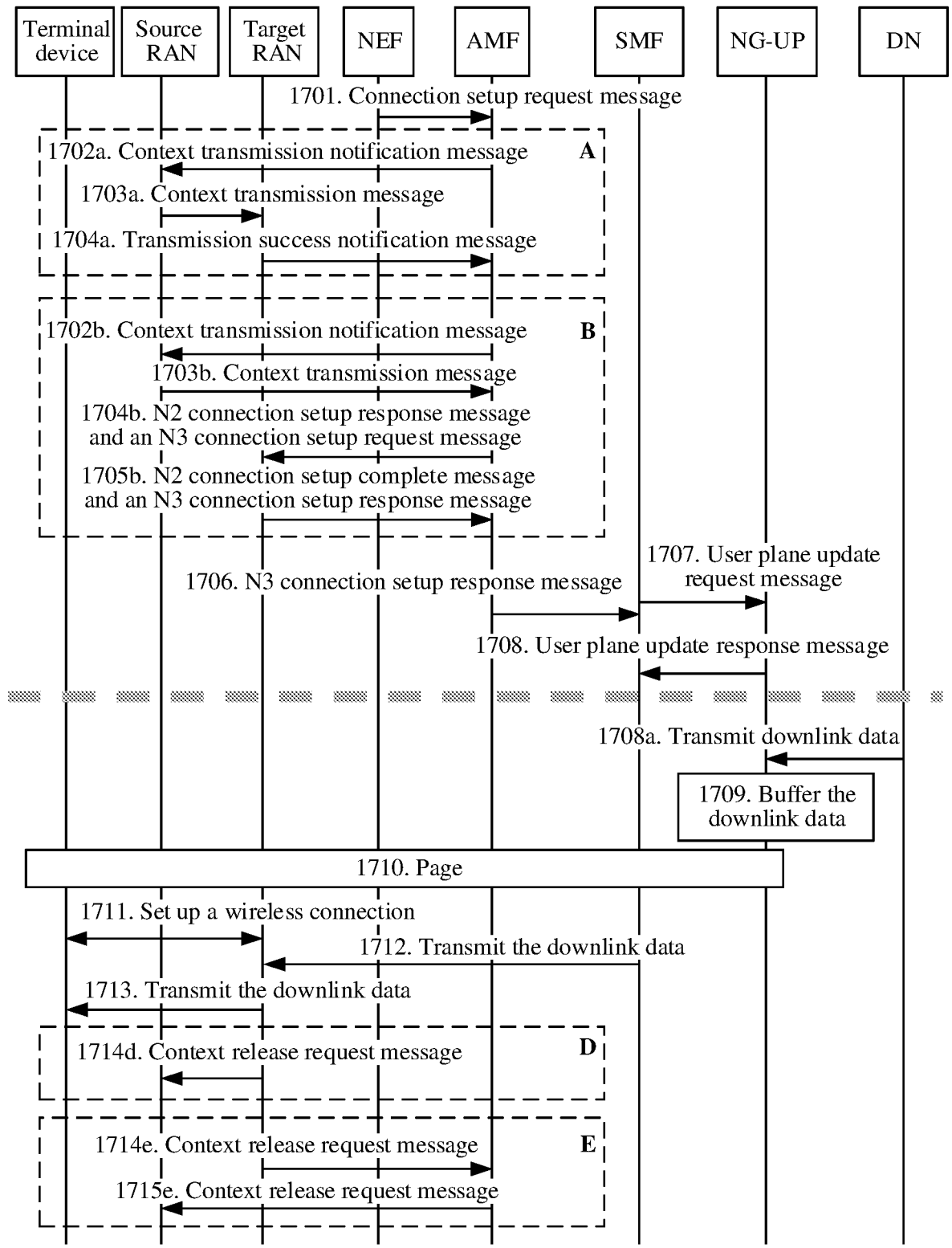
FIG. 17 is a schematic flowchart of a method according to an embodiment of this application.

FIG. 17 is a schematic flowchart of a method according to this application. In this embodiment, the first control plane functional entity is the SMF, the second control plane functional entity is the AMF entity, the user plane functional entity is the NG-UP entity, and the network capability exposure functional entity is the NEF entity. Further, an embodiment of this application shows a source access network (Source AN) device to which the terminal device connects before the terminal device is in the idle mode or the inactive mode, and a target access network (Target AN) device to which the terminal device may connect when the terminal device is switched to the connected mode and that is predicted based on access network information of the terminal device. As shown in FIG. 17, the method includes the following steps.

In Step 1701, the NEF entity sends a connection setup request message to the AMF entity.

It should be understood that before step 1701, as described in the embodiment in FIG. 4, the AMF entity determines, based on a context release message sent by the terminal device, that the terminal device is switched from the connected mode to the idle mode or the inactive mode. Further, the AMF entity can send prediction information of the terminal device to the NEF entity by using the prediction network element, and the prediction information includes a location and a moment at which the terminal device is predicted to be switched to the connected mode. Further, the NEF entity generates the connection setup request message based on the foregoing information.

The connection setup request message carries the access network information of the terminal device. For example, the connection setup request message carries an ECGI of the terminal device, and identification information of the terminal device or identification information of an access network device. Therefore, the AMF entity may determine the target access network (Target AN) device of the terminal device based on the access network information.

In Step 1702a, the AMF entity sends a context transmission notification message to the source access network device.

The context transmission notification message is used to instruct the source access network device to send context information of the terminal device to the target access network device. Optionally, the context transmission notification message carries identification information of the target access network device.

In Step 1703a, the source access network device sends the context information of the terminal device to the target access network device.

In Step 1704a, the target access network device sends a transmission success notification message to the AMF entity.

The transmission success notification message may be used to inform the AMF entity that the context information of the terminal device is already received.

Another optional manner of obtaining the context information of the terminal device by the target access network device may be replaced with steps 1702b to 1704b.

In Step 1702b, the AMF entity sends a context transmission notification message to the source access network device.

The context transmission notification message may be used to instruct the source access network device to send the context information of the terminal device to the AMF entity.

In Step 1703b, the source access network device sends a context transmission message to the AMF entity.

The context transmission message carries the context information of the terminal device.

In Step 1704b, the AMF entity forwards, to the target RAN device, an N3 connection setup request message received from the SMF entity, and sends an N2 connection setup response message to the target RAN device.

It should be understood that the N3 connection setup request message and the N2 connection setup response message may be a same message, or may be two different messages. If the N3 connection setup request message and the N2 connection setup response message are two different messages, an order of sending the messages is not limited in this application.

After the target access network device receives the message sent in step 1704b, the target RAN device stores information used to set up an N3 connection, for example, identification information of the N3 connection in the target RAN device; and information used to set up an N2 connection, for example, identification information of the N2 connection in the AMF entity.

Further, in step 1705b, an N2 connection setup complete message and an N3 connection setup response message are sent to the AMF entity.

The N3 connection setup response message includes the information of the N3 connection in the target RAN device, including the identification information of the N3 connection in the target RAN device and the like. The N2 connection setup complete message includes information that is about the N2 connection and that is of the target RAN device, including identification information of the N2 connection in the target RAN device and the like.

After receiving the message sent in step 1705b, the AMF stores context information of the N2 connection in the target RAN device. In this case, the N2 connection is set up.

In addition, in step 1706, the AMF entity forwards the N3 connection setup response message to the SMF entity.

In Step 1707, after receiving the N3 connection setup response message, the SMF entity sends a user plane update request message to the NG-UP.

The user plane update request message may include context information of the N3 connection in the NG-(R)AN in the N3 connection setup response message.

After receiving the message, the NG-UP entity stores the target RAN device-related information used to set up the N3 connection. In this case, the N3 connection is set up.

In Step 1708, the NG-UP entity sends a user plane update response message to the SMF entity.

The user plane update response message may be used to confirm that the N3 connection is set up.

Further, when the data network transmits downlink data of the terminal device, step 1708a of transmitting, by the DN, the downlink data to the NG-UP entity is performed.

In Step 1709, the NG-UP entity buffers the downlink data of the terminal device.

In Step 1710, the NG-UP sends a paging message to the terminal device through the target RAN device.

Further, step 1711 of setting up, by the terminal device, a wireless connection to the target RAN device.

In Step 1712, the SMF entity sends the downlink data of the terminal device to the target RAN device.

In Step 1713, the target RAN device sends the downlink data to the terminal device.

In Step 1714d, the target RAN device sends a context release request message to the source RAN device.

The context release request message is used to instruct the source RAN device to delete the stored context information of the terminal device, to facilitate reducing a network resource.

It should be understood that step 1714d may alternatively be replaced with steps 1714e to 1715e.

In Step 1714e, the target RAN device sends a context release request message to the AMF entity.

The context release request message is used to request the AMF entity to forward the context release request message to the source RAN device. It should be further understood that another function of the context release request message is informing the AMF entity that the target RAN device already successfully provides a service to the terminal device. Optionally, the notification message includes the identification information of the terminal device.

Further, the AMF entity performs step 1715e of sending, by the AMF entity, the context release request message to the source RAN device, where the context release request message is used to instruct the source RAN device to delete the stored context information of the terminal device, to facilitate reducing a network resource.

Figure 18:
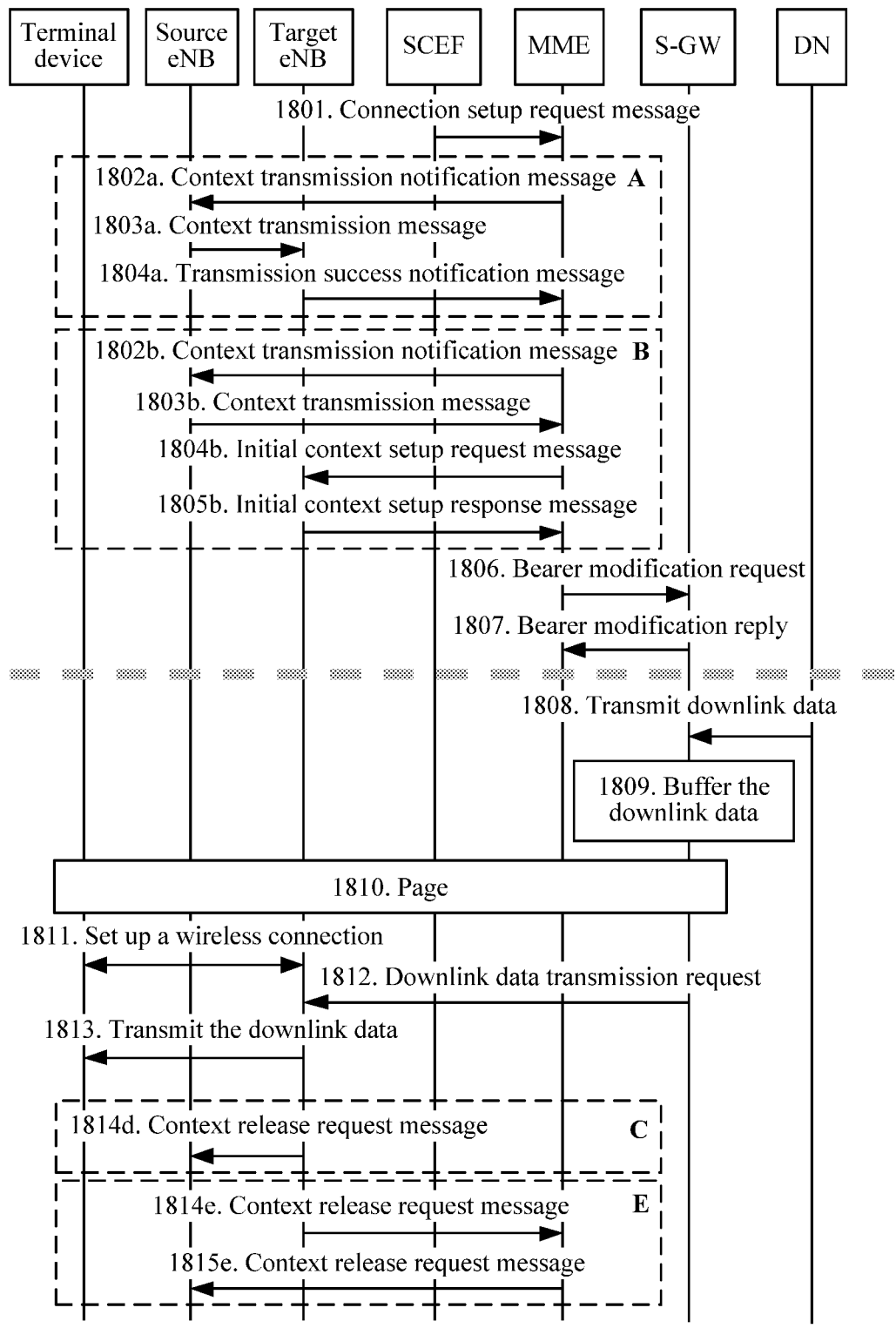
FIG. 18 is a schematic flowchart of a method according to an embodiment of this application.

It should be understood that FIG. 17 shows detailed steps or operations in this embodiment of this application, but these steps or operations are merely examples. In this embodiment of this application, another operation or variations of the various operations in FIG. 17 may further be performed. In addition, the steps in FIG. 17 may be performed in an order different from that presented in FIG. 17, and the operations in FIG. 17 may not necessarily be all performed. FIG. 18 is a schematic flowchart of a method according to this application. In this embodiment, the first control plane functional entity is the MME, the user plane functional entity is the S-GW entity, and the network capability exposure functional entity is the SCEF entity. Further, an embodiment of this application shows a source access network device (Source eNB) to which the terminal device connects before the terminal device is in the idle mode or the inactive mode, and a target access network device (Target eNB) to which the terminal device may connect when the terminal device is switched to the connected mode and that is predicted based on access network information of the terminal device. As shown in FIG. 18, the method includes the following steps.

In Step 1801, the SCEF entity sends a connection setup request message to the MME.

It should be understood that before step 1801, as described in the embodiment in FIG. 4, the MME determines, based on a context release message sent by the terminal device, that the terminal device is switched from the connected mode to the idle mode or the inactive mode. Further, the MME can send prediction information of the terminal device to the SCEF entity by using the prediction network element, and the prediction information includes a location and a moment at which the terminal device is predicted to be switched to the connected mode. Further, the SCEF entity generates the connection setup request message based on the foregoing information. The connection setup request message carries the access network information of the terminal device. For example, the connection setup request message carries an ECGI of the terminal device, and identification information of the terminal device or identification information of an access network device. Therefore, the MME may determine the target access network device (Target eNB) of the terminal device based on the access network information.

In Step 1802a, the MME sends a context transmission notification message to the source access network device.

The context transmission notification message is used to instruct the source access network device to send context information of the terminal device to the target access network device. Optionally, the context transmission notification message carries identification information of the target access network device.

In Step 1803a, the source access network device sends the context information of the terminal device to the target access network device.

In Step 1804a, the target access network device sends a transmission success notification message to the MME.

The transmission success notification message may be used to inform the MME that the context information of the terminal device is already received.

Another optional manner of obtaining the context information of the terminal device by the target access network device may be replaced with steps 1802b to 1804b.

In Step 1802b, the MME sends a context transmission notification message to the source access network device.

The context transmission notification message is used to instruct the source access network device to send the context information of the terminal device to the MME.

In Step 1803b, the source access network device sends a context transmission message to the MME.

The context transmission message carries the context information of the terminal device.

In Step 1804b, the MME sends an initial context setup request message to the target eNB.

The initial context setup request message carries context information of an S1-MME connection between the target eNB and the MME in the MME, for example, identification information of the S1-MME connection in the MME; and context information of an S1-U connection between the target eNB and the S-GW entity in the S-GW entity, for example, identification information of the S1-U connection in the S-GW entity.

After receiving the message, the target eNB stores information carried in the initial context setup request message, for example, identification information MME-terminal device-S1AP-ID of the S1-MME connection between the MME and the target eNB in the MME, and identification information of the S1-U connection between the target eNB and the S-GW entity in the S-GW entity.

It should be understood that the initial context setup request message in the embodiment in FIG. 18 includes the first identification information or the second identification information in the embodiment in FIG. 4.

In Step 1805b: Send an initial context setup response message to the MME.

The initial context setup response message carries identification information ENB-UE-S1AP-ID of the S1-MME connection between the MME and the target eNB in the target eNB, namely, the first identification information in the embodiment in FIG. 4; and identification information gTP-TEID of the S1-U connection between the target eNB and the S-GW entity in the target eNB, namely, the second identification information in the embodiment in FIG. 4.

After receiving the initial context setup response message, the MME stores the ENB-UE-S1AP-ID. In this case, the S1-MME connection between the target eNB and the MME is set up.

In Step 1806, the MME sends a bearer modification request message to the S-GW entity.

The bearer modification request message carries the identification information gTP-TEID of the S1-U connection in the target eNB.

In Step 1807, the S-GW entity sends a bearer modification reply message to the MME.

The message may be used to confirm that the bearer modification request message sent in step 1806 is received, so that it is determined that the S1-U connection between the target eNB and the S-GW entity is set up.

In Step 1808, the DN sends downlink data to the S-GW entity.

In Step 1809, the S-GW entity buffers the downlink data sent by the DN.

In Step 1810, the S-GW entity informs, by using a downlink data notification message (Downlink Data Notification, DNN), the MME that there is the downlink data of the terminal device.

Then, the MME sends a paging message to the terminal device.

Further, step 1811 of setting up, by the terminal device, a wireless connection to the target eNB, and further, step 1812 and step 1813 are performed to transmit the downlink data.

In Step 1814*d*, the target eNB sends a context release request message to the source eNB.

The context release request message is used to instruct the source eNB to delete the stored context information of the terminal device, to facilitate reducing a network resource.

It should be understood that step 1814*d* may alternatively be replaced with steps 1814*e* to 1815*e*.

In Step 1814*e*, the target eNB sends a context release request message to the MME.

The context release request message is used to request the MME to forward the context release request message to the source eNB. It should be further understood that another function of the context release request message is informing the MME that the target eNB already successfully provides a service to the terminal device. Optionally, the notification message includes the identification information of the terminal device.

Further, the MME performs step 1815*e* of sending, by the MME, the context release request message to the source eNB, where the context release request message is used to instruct the source eNB to delete the stored context information of the terminal device, to facilitate reducing a network resource.

It should be understood that FIG. 18 shows detailed steps or operations in this embodiment of this application, but these steps or operations are merely examples. In this embodiment of this application, another operation or variations of the various operations in FIG. 18 may further be performed. In addition, the steps in FIG. 18 may be performed in an order different from that presented in FIG. 18, and the operations in FIG. 18 may not necessarily be all performed.

Figure 19:
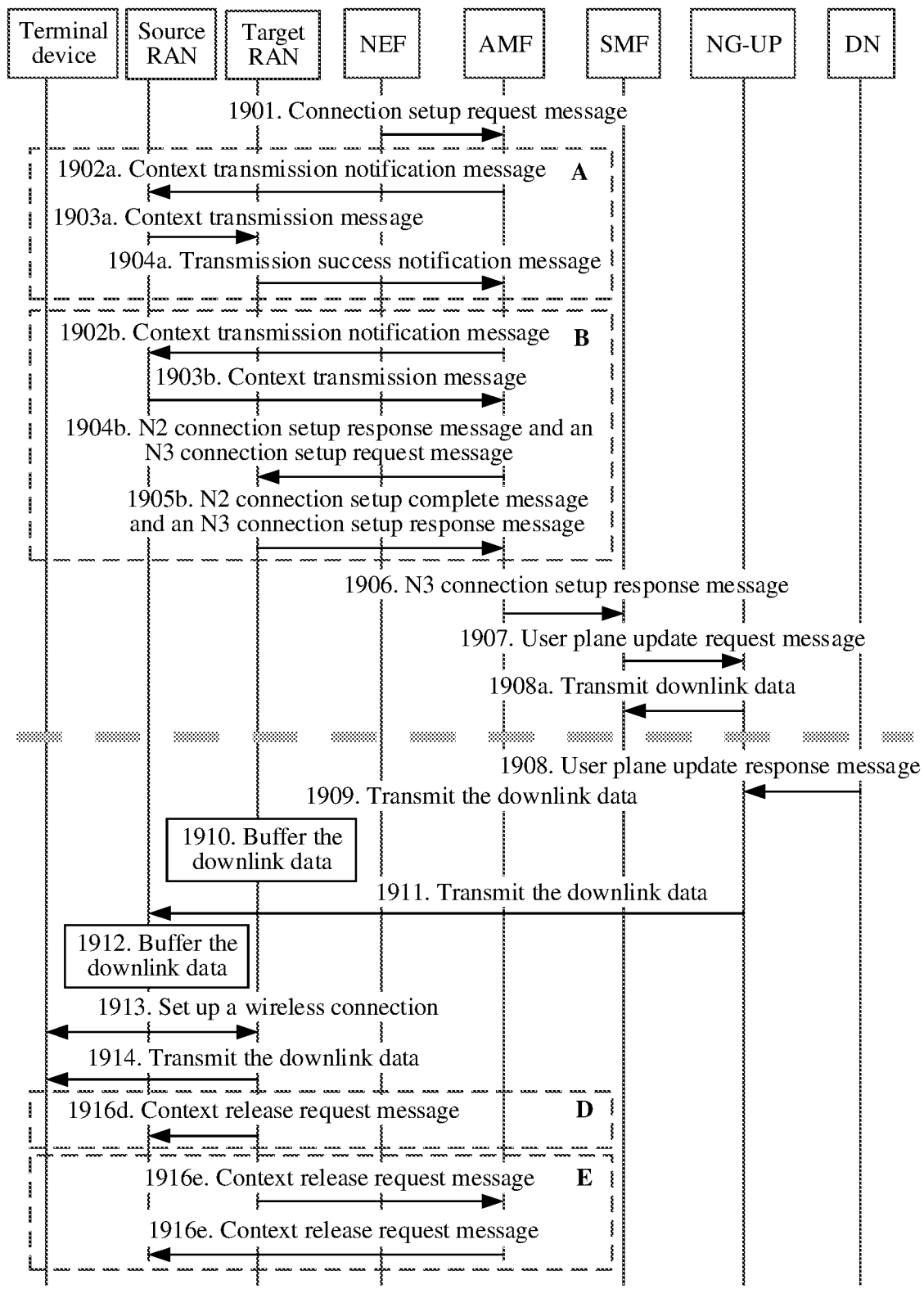
FIG. 19 is a schematic flowchart of a method according to an embodiment of this application.

FIG. 19 is a schematic flowchart of a method according to this application. In this embodiment, the first control plane functional entity is the SMF entity, the second control plane functional entity is the AMF entity, the user plane functional entity is the NG-UP entity, and the network capability exposure functional entity is the NEF. Further, an embodiment of this application shows a source access network (Source RAN) device to which the terminal device connects when the terminal device is switched to the connected mode, and a target access network (Target RAN) device to which the terminal device may connect when the terminal device is switched to the connected mode and that is predicted based on access network information of the terminal device. As shown in FIG. 19, the method includes the following steps.

In Step 1901, the NEF entity sends a connection setup request message to the AMF entity.

It should be understood that before step 1901, as described in the embodiment in FIG. 4, the AMF entity determines, based on a context release message sent by the terminal device, that the terminal device is switched from the connected mode to the idle mode or the inactive mode. Further, the AMF entity can send prediction information of the terminal device to the NEF entity by using the prediction network element, and the prediction information includes a location and a moment at which the terminal device is predicted to be switched to the connected mode. Further, the NEF entity generates the connection setup request message based on the foregoing information. The connection setup request message carries the access network information of the terminal device. For example, the connection setup request message carries an ECGI of the terminal device, and identification information of the terminal device or identification information of an access network device. Therefore, the AMF entity may determine the target access network (Target RAN) device of the terminal device based on the access network information.

In Step 1902*a*, the AMF entity sends a context transmission notification message to the source access network device.

The context transmission notification message is used to instruct the source access network device to send context information of the terminal device to the target access network device. Optionally, the context transmission notification message carries identification information of the target access network device.

In Step 1903*a*, the source access network device sends the context information of the terminal device to the target access network device.

In Step 1904*a*, the target access network device sends a transmission success notification message to the AMF entity.

The transmission success notification message may be used to inform the AMF entity that the context information of the terminal device is already received.

Another optional manner of obtaining the context information of the terminal device by the target access network device may be replaced with steps 1902*b* to 1904*b*.

In Step 1902*b*, the AMF entity sends a context transmission notification message to the source access network device.

The context transmission notification message is used to instruct the source access network device to send the context information of the terminal device to the AMF entity.

In Step 1903*b*, the source access network device sends a context transmission message to the AMF entity.

The context transmission message carries the context information of the terminal device.

In Step 1904*b*, the AMF entity forwards, to the target RAN device, an N3 connection setup request message received from the SMF entity, and sends an N2 connection setup response message to the target RAN device.

It should be understood that the N3 connection setup request message and the N2 connection setup response message may be a same message, or may be two different messages. If the N3 connection setup request message and the N2 connection setup response message are two different messages, an order of sending the messages is not limited in this application.

The N3 connection setup request message includes context information that is related to the NG-UP entity and that is stored in the SMF entity, including identifier information of a PDU session, endpoint information of the N3 connection in the NG-UP, quality of service of the PDU session, and the like.

The N2 connection setup response message includes context information of the N2 connection in the AMF entity, including an endpoint of the N2 connection in the AMF entity, and the like. It should be noted that the message includes a flag bit indicating that "a wireless connection does not need to be immediately set up".

After the target RAN device receives the message sent in step 1904b, the target RAN device stores the information used to set up the N3 connection, for example, identification information of the N3 connection in the target RAN device; and the information used to set up the N2 connection, for example, identification information of the N2 connection in the AMF entity.

Further, in step 1905b, an N2 connection setup complete message and an N3 connection setup response message are sent to the AMF entity.

The N3 connection setup response message includes information of the N3 connection in the target RAN device, including the identification information of the N3 connection in the target RAN device and the like. The N2 connection setup complete message includes identification information of the N2 connection in the target RAN device and the like.

After receiving the message sent in step 1905b, the AMF entity stores context information of the N2 connection in the target RAN device. In this case, the N2 connection is set up.

In addition, in step 1906, the AMF entity forwards the N3 connection setup response message to the SMF entity.

In Step 1907, after receiving the N3 connection setup response message, the SMF entity sends a user plane update request message to the NG-UP entity.

The user plane update request message includes context information of the N3 connection in the target RAN device in the N3 connection setup response message.

After receiving the message, the NG-UP entity stores the identification information of the N3 connection in the target RAN device. In this case, the N3 connection is set up.

In Step 1908, the NG-UP sends a user plane update response message to the SMF entity, to confirm that the N3 connection is set up.

Further, when the data network needs to transmit downlink data to the terminal device, step 1908a of transmitting, by the DN, the downlink data to the NG-UP entity is performed.

In Step 1909, the NG-UP transmits the downlink data of the terminal device to the target RAN device.

In Step 1910, the target RAN device buffers the downlink data of the terminal device.

In Step 1911, the NG-UP entity transmits the downlink data of the terminal device to the source RAN device.

In Step 1912, the source RAN device buffers the downlink data of the terminal device.

It should be understood that in steps 1909 to 1912, both the source RAN device and the target RAN device buffer the data, to reduce a case in which the terminal device cannot send the downlink data received from the target RAN device because the first control plane functional entity incorrectly predicts the target RAN device of the terminal device. For example, if the terminal device is still in the scope of the source RAN, the terminal device may still receive the downlink data of the terminal device from the source RAN device.

In Step 1913, the terminal device sets up a wireless connection to the target RAN device.

In Step 1914, the target RAN device sends the downlink data of the terminal device to the terminal device.

In Step 1916d, the target RAN device sends a context release request message to the source RAN device.

The context release request message is used to instruct the source RAN device to delete the stored context information of the terminal device, to facilitate reducing a network resource.

It should be understood that step 1916d may alternatively be replaced with steps 1916e to 1917e.

In Step 1916e, the target RAN device sends a context release request message to the AMF entity. The context release request message is used to request the AMF to forward the context release request message to the source RAN device. It should be further understood that another function of the context release request message is informing the AMF entity that the target RAN device already successfully provides a service to the terminal device. Optionally, the notification message includes the identification information of the terminal device.

Further, the AMF entity performs step 1917e of sending, by the AMF entity, the context release request message to the source RAN device, where the context release request message is used to instruct the source RAN device to delete the stored context information of the terminal device, to facilitate reducing a network resource.

It should be understood that FIG. 19 shows detailed steps or operations in this embodiment of this application, but these steps or operations are merely examples. In this embodiment of this application, another operation or variations of the various operations in FIG. 19 may further be performed. In addition, the steps in FIG. 19 may be performed in an order different from that presented in FIG. 19, and the operations in FIG. 19 may not necessarily be all performed.

Figure 20:
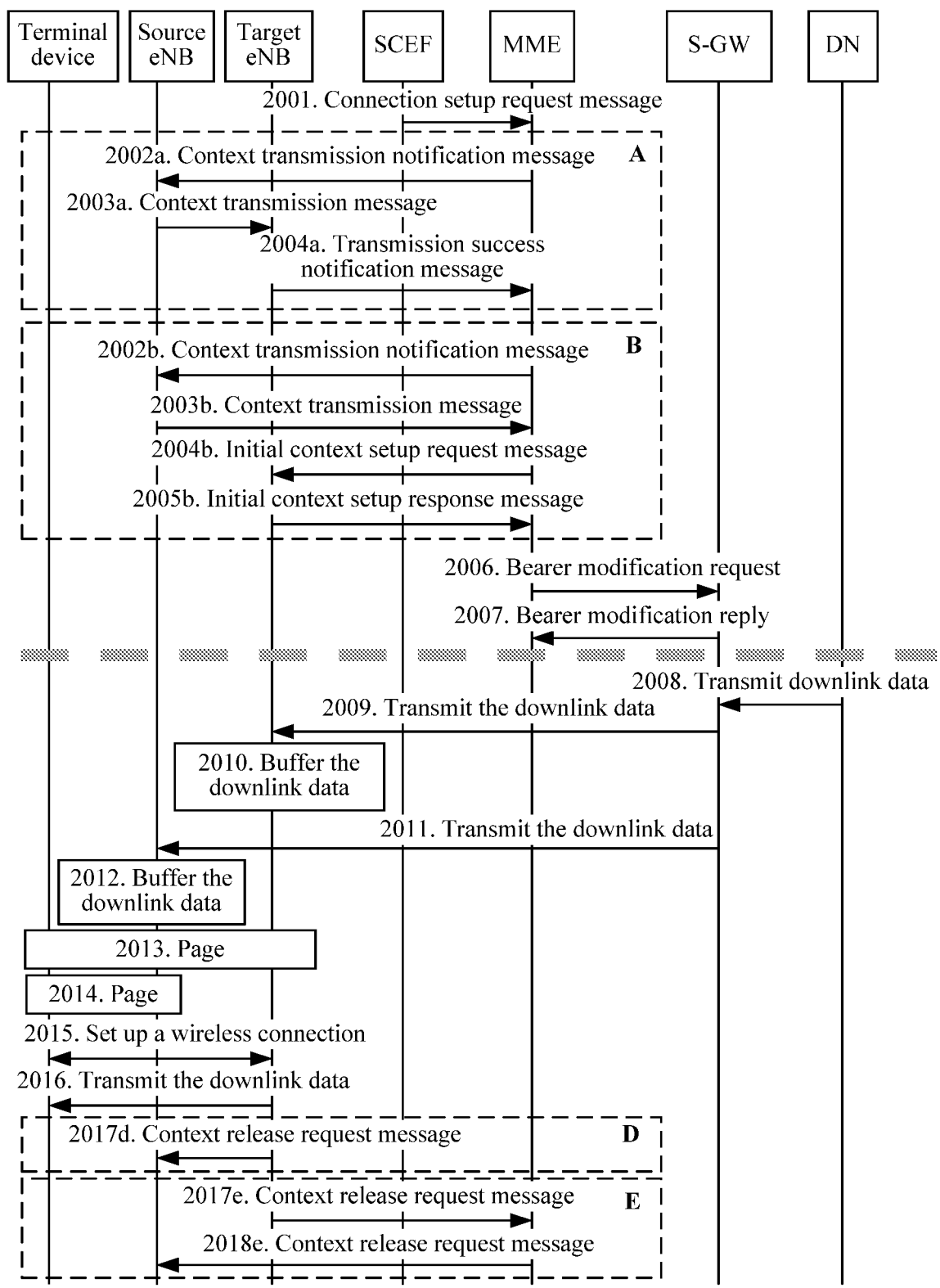
FIG. 20 is a schematic flowchart of a method according to an embodiment of this application.

FIG. 20 is a schematic flowchart of a method according to this application. In this embodiment, the first control plane functional entity is the MME, the user plane functional entity is the S-GW entity, and the network capability exposure functional entity is the SCEF entity. Further, an embodiment of this application shows a source access network device (Source eNB) to which the terminal device connects before the terminal device is in the idle mode or the inactive mode, and a target access network device (Target eNB) that to which the terminal device may connect when the terminal device is switched to the connected mode and that is predicted based on access network information of the terminal device. As shown in FIG. 20, the method includes the following steps.

In Step 2001, the SCEF entity sends a connection setup request message to the MME.

It should be understood that before step 601, as described in the embodiment in FIG. 4, the MME determines, based on a context release message sent by the terminal device, that the terminal device is switched from the connected mode to the idle mode or the inactive mode. Further, the MME can send prediction information of the terminal device to the SCEF entity by using the prediction network element, and the prediction information includes a location and a moment at which the terminal device is predicted to be switched to the connected mode. Further, the SCEF entity generates the connection setup request message based on the foregoing information.

The connection setup request message carries the access network information of the terminal device. For example, the connection setup request message carries an ECGI of the terminal device, and identification information of the terminal device or identification information of an access network device. In this case, the MME may determine the target access network device (Target eNB) of the terminal device based on the access network information.

In Step 2002a, the MME sends a context transmission notification message to the source access network device.

The context transmission notification message is used to instruct the source access network device to send context information of the terminal device to the target access network device. Optionally, the context transmission notification message carries identification information of the target access network device.

In Step 2003a, the source access network device sends the context information of the terminal device to the target access network device.

In Step 2004a, the target access network device sends a transmission success notification message to the MME.

The transmission success notification message may be used to inform the MME that the context information of the terminal device is already received.

Another optional manner of obtaining the context information of the terminal device by the target access network device may be replaced with steps 2002b to 2004b.

In Step 2002b, the MME sends a context transmission notification message to the source access network device, where the context transmission notification message is used to instruct the source access network device to send the context information of the terminal device to the MME.

In Step 2003b, the source access network device sends a context transmission message to the MME, where the context transmission message carries the context information of the terminal device.

In Step 2004b, the MME sends an initial context setup request message to the target eNB.

The initial context setup request message carries context information of an S1-MME connection between the target eNB and the MME in the MME, for example, identification information of the S1-MME connection in the MME; and context information of an S1-U connection between the target eNB and the S-GW entity in the S-GW entity, for example, identification information of the S1-U connection in the S-GW entity.

It should be understood that the initial context setup request message in the embodiment in FIG. 20 includes the first identification information or the second identification information in the embodiment in FIG. 4.

In Step 2005b, send an initial context setup response message to the MME.

The initial context setup response message carries identification information ENB-UE-S1AP-ID of the S1-MME connection between the MME and the target eNB in the target eNB, namely, the first identification information in the embodiment in FIG. 4; and identification information gTP-TEID of the S1-U connection between the target eNB and the S-GW entity in the target eNB, namely, the second identification information in the embodiment in FIG. 4.

After receiving the initial context setup response message, the MME stores the ENB-UE-S1AP-ID. In this case, the S1-MME connection between the eNB and the MME is set up.

In Step 2006, the MME sends a bearer modification request message to the S-GW entity, where the bearer modification request message carries the identification information gTP-TEID of the S1-U connection in the target eNB.

In Step 2007, the S-GW entity sends a bearer modification reply message to the MME.

The message may be used to confirm that the bearer modification request message sent in step 2006 is received, so that the S1-U bearer between the target eNB and the S-GW is set up.

In Step 2008, the DN transmits downlink data of the terminal device to the S-GW entity.

In Step 2009, the S-GW entity sends the downlink data of the terminal device to the target eNB.

In Step 2010, the target eNB buffers the downlink data of the terminal device that is sent by the S-GW entity.

In Step 2011, the S-GW sends the downlink data of the terminal device to the source eNB.

In Step 2012, the source eNB buffers the downlink data of the terminal device that is sent by the S-GW entity.

In Step 2013, the target eNB initiates paging to the terminal device.

In Step 2014, the source eNB initiates paging to the terminal device.

In Step 2015, the terminal device sets up a wireless connection to the target eNB.

In Step 2016, transmit the downlink data.

In Step 2017d, the target eNB sends a context release request message to the source eNB.

The context release request message is used to instruct the source eNB to delete the stored context information of the terminal device, to facilitate reducing a network resource.

It should be understood that step 2017d may alternatively be replaced with steps 2017e to 2018e.

In Step 2017e, the target eNB sends a context release request message to the MME.

The context release request message is used to request the MME to forward the context release request message to the source eNB. It should be further understood that another function of the context release request message is informing the MME that the target eNB already successfully provides a service to the terminal device. Optionally, the notification message includes the identification information of the terminal device.

Further, the MME performs step 2018e of sending, by the MME, the context release request message to the source eNB, where the context release request message is used to instruct the source eNB to delete the stored context information of the terminal device, to facilitate reducing a network resource.

It should be understood that FIG. 20 shows detailed steps or operations in this embodiment of this application, but these steps or operations are merely examples. In this embodiment of this application, another operation or variations of the various operations in FIG. 20 may further be performed. In addition, the steps in FIG. 20 may be performed in an order different from that presented in FIG. 20, and the operations in FIG. 20 may not necessarily be all performed.

It should be understood that the target access network device described in the embodiments in FIG. 15 to FIG. 20 is a predicted access network device to which the terminal device may connect when the terminal device is switched to the connected mode.

It should be understood that sequence numbers of the foregoing processes do not mean execution orders in the embodiments of the present invention. The execution orders of the processes should be determined according to functions and internal logic of the processes, and should not be construed as any limitation on the implementation processes of the embodiments of the present invention.

Figure 21:
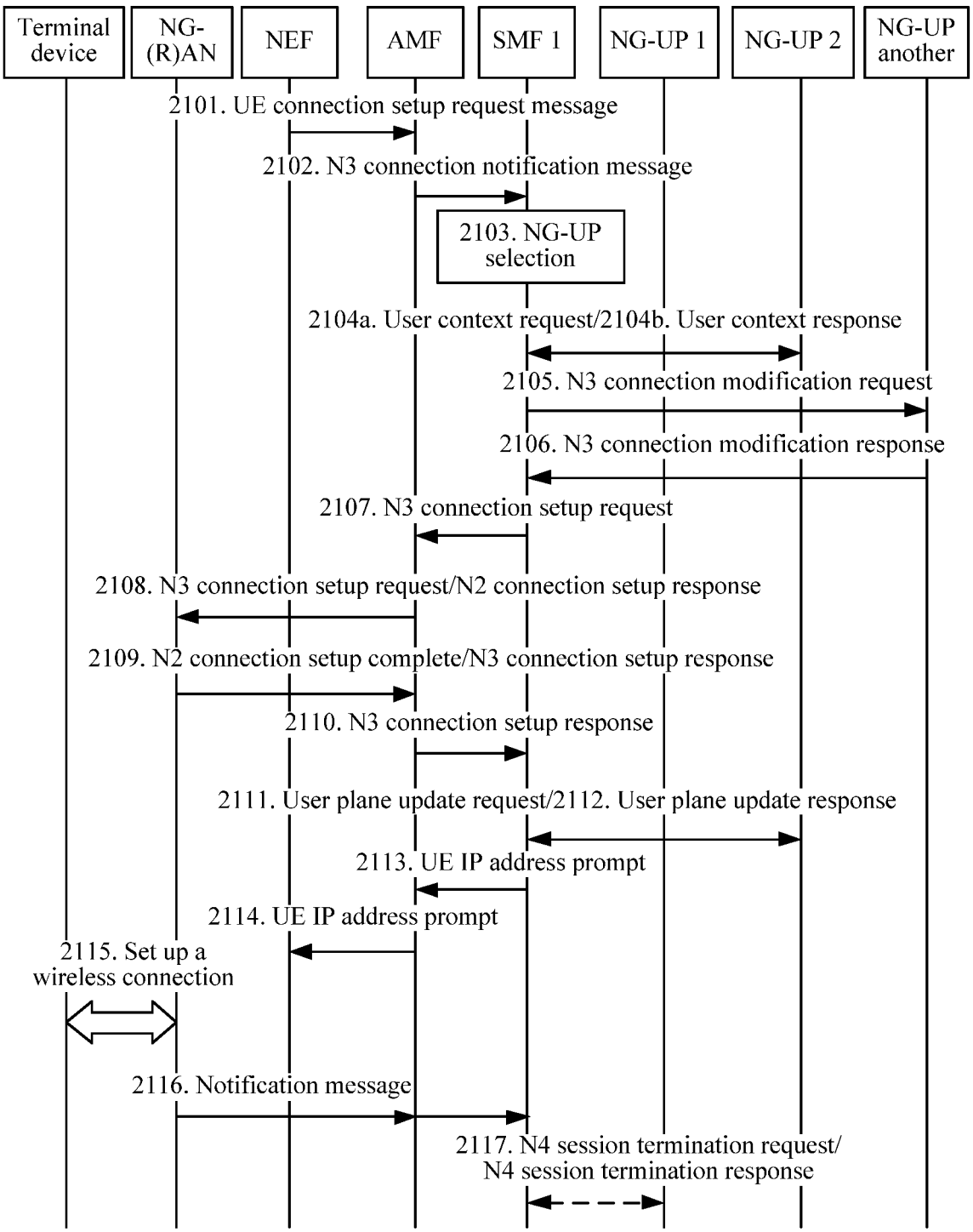
FIG. 21 is a schematic flowchart of a method according to an embodiment of this application.

FIG. 21 is a schematic flowchart of a method according to this application. In this embodiment, the first control plane functional entity is an SMF2 entity; the second control plane functional entity is the AMF entity; user plane function entities are an NG-UP1 entity, an NG-UP2 entity, and a next generation user plane anchor (NG-UP anchor) entity; and the network capability exposure functional entity is the NEF entity. As shown in FIG. 21, the method includes the following steps.

In Step 2101, the NEF entity sends a terminal device connection setup request message to the AMF entity, where the connection setup request message includes information about a location at which the terminal device is restored to the connected mode, and identification information of the terminal device, for example, the connection setup request message includes context information of the terminal device.

It should be understood that the setup request message may be the first message in the embodiment in FIG. 4. The connection setup request message may explicitly instruct the control plane functional entity to start a process of setting up an N2 connection and/or an N3 connection, or may implicitly instruct the control plane functional entity to start a process of setting up an N2 connection and/or an N3 connection. For example, the first connection in the embodiment shown in FIG. 4 is the N2 connection in the embodiment in FIG. 21, and the second connection is the N3 connection in the embodiment in FIG. 21.

It should be further understood that the connection setup message may explicitly or implicitly instruct the AMF entity to set up the network connection for the terminal device.

After the AMF entity receives the connection setup request message, the AMF entity selects the SMF 1 entity as the first control plane functional entity based on a local policy and the information about the location at which the terminal device is restored to the connected mode.

In Step 2102, the AMF entity sends an N3 connection notification message to the SMF 1 entity, where the N3 connection notification message is the second message described in the embodiment in FIG. 4, the N3 connection notification message includes the information carried in the connection setup request message in step 2101. For example, the notification message may be a PDU session setup request message, and the message carries identification information used to instruct to pre-set up the connection, to request the SMF 2 entity to send the N3 connection setup request message to the NG-UP 2 entity.

In Step 2103a, after the SMF1 entity receives the N3 connection notification message in step 2102, the terminal device obtains the context information of the terminal device.

In Step 2103, the SMF 1 entity selects, based on the local policy and the information about the location at which the terminal device is restored to the connected mode, the NG-UP2 entity as the user plane functional entity of the terminal device, where the NG-UP 1 entity is the user plane functional entity when the terminal device is in the connected mode last time. The SMF1 entity creates context information of the N3 connection for the terminal device. For example, the context information of the N3 connection includes identification information of the N3 connection in the NG-UP 2, and identification information of an N9 connection in the NG-UP 2. Optionally, the context information of the N3 connection includes an Internet protocol (IP) address allocated by the SMF 1 to the terminal device.

It should be understood that the SMF1 entity or the AMF entity predicts, based on the context information of the terminal device that is carried in the connection setup request message, that an access network device to which the terminal device connects when the terminal device is restored to the connected mode is a (R)AN device.

In Step 2104a, the SMF1 entity sends a user context request message to the NG-UP 2 entity, where the user context request message carries context information of the N3 connection in the SMF1 entity. For example, the user context request message includes the identification information of the N3 connection in the NG-UP 2 entity, and identification information of the N9 connection stored in the SMF 2 at the NG-UP anchor entity.

The N9 connection is a connection between the NG-UP entity and the NG-UP anchor entity. Because a plurality of NG-UP entities may be connected to the NG-UP anchor entity, the N9 connection is used to transmit data between the NG-UP anchor entity and the plurality of NG-UP entities. After the NG-UP2 entity receives the message sent in step 2104a, the NG-UP2 entity stores the information used to set up the N9 connection, for example, the identification information of the N9 connection at the NG-UP anchor entity; and the information used to set up the N3 connection, for example, the identification information of the N3 connection in the NG-UP2 entity.

In Step 2104b, the NG-UP2 entity sends a user context response message to the SMF1 entity.

In Step 2105, the SMF 1 sends an N3 connection modification request to the NG-UP anchor entity, where the connection modification request includes the identification information of the N9 connection in the NG-UP 2.

Optionally, the N3 connection modification request is further used to instruct the NG-UP anchor entity not to delete information about the NG-UP1 entity. For example, in the N3 connection modification request, a value of a flag bit used to instruct the NG-UP anchor entity not to delete the information about the NG-UP1 entity is 1.

It should be understood that when the N3 connection modification request includes the flag bit used to instruct the NG-UP anchor entity not to delete the information about the NG-UP1 entity, the terminal device connection setup request message sent by the NEF entity to the AMF entity in step 2101 further includes information about an access network device to which the terminal device connects when the terminal device is in the connected mode last time.

It should be further understood that when the terminal device connection setup request message sent by the NEF entity to the AMF entity further includes the information about the access network device (for example, information about a (R)AN2 device) to which the terminal device connects when the terminal device is in the connected mode last time, steps of an interaction process in which a core network device sets up user context information for the (R)AN2 device are similar to steps 702 to 708 in FIG. 7, or similar to steps 902 to 908 in FIG. 9, or similar to steps 1102 to 1108 in FIG. 11, and details are not described herein.

The N3 connection modification request includes NG-UP 2-related context information stored in the SMF1 entity, and the context information includes endpoint information of the N3 connection in the NG-UP2 entity, an IP address of the NG-UP 2 entity, and the like.

In Step 2106, the NG-UP anchor entity sends an N3 connection modification response message to the SMF1 entity. In this case, the N9 connection is set up.

In Step 2107, the SMF1 entity sends the N3 connection setup request message to the AMF entity. The message includes context information created by the SMF1 entity for the N3 connection. For example, the N3 connection setup request message includes an identifier of a PDU session, descriptions about quality of service of the PDU session, and the identification information of the N3 connection in the NG-UP 2 that are of the terminal device and that are sent by the SMF1 entity to the NG-(R)AN device.

In Step 2108, the AMF entity forwards, to the NG-(R)AN device, the N3 connection setup request message received from the SMF1 entity, and the AMF entity also sends an N2 connection setup response message to the NG-(R)AN device.

It should be understood that the N3 connection setup request message and the N2 connection setup response message may be a same message, or may be two different messages. If the N3 connection setup request message and the N2 connection setup response message are two different messages, an order of sending the messages is not limited in this application.

The N3 connection setup request message includes information that is related to the NG-UP2 entity and that is stored in the SMF1 entity. The information includes information about the identifier of the PDU session, endpoint information of the N3 connection in the NG-UP2 entity, the quality of service of the PDU session, and the like.

The N2 connection setup response message includes information about the AMF entity. The information includes an endpoint of the N2 connection in the AMF entity. It should be noted that the message includes a flag bit indicating that "a wireless connection does not need to be immediately set up".

After the NG-(R)AN device receives the message sent in step 2108, the NG-(R)AN device stores information used to set up the N3 connection, for example, the identification information of the N3 connection in the NG-UP 2; and information used to set up the N2 connection, for example, identification information of the N2 connection in the AMF entity.

Further, in step 2109, the NG-(R)AN device sends an N2 connection setup complete message and an N3 connection setup response message to the AMF entity. For example, the N3 connection setup response message includes information of the N3 connection in the NG-(R)AN device, including identification information of the N3 connection in the NG-(R)AN device and the like. The N2 connection setup complete message includes information that is about the N2 connection and that is of the NG-(R)AN device, including identification information of the N2 connection in the NG-(R)AN device and the like.

After receiving the message sent in step 2109, the AMF entity stores context information of the N2 connection in the NG-(R)AN device. In this case, the N2 connection is set up.

Further, in step 2110, the AMF entity forwards the N3 connection setup response message to the SMF1 entity, and the N3 connection setup response message carries context information of the N3 connection in the NG-(R)AN device.

In Step 2111, after receiving the N3 connection setup response message, the SMF1 entity sends a user plane update request message to the NG-UP2 entity.

The user plane update request message may include the context information that is of the N3 connection in the NG-(R)AN device and that is created for the terminal device in the N3 connection setup response message.

After receiving the message, the NG-UP2 entity stores NG-(R)AN device-related terminal device context information used to set up the N3 connection. In this case, the N3 connection is set up.

In Step 2112, the NG-UP entity sends a user plane update response message to the SMF1 entity, where the user plane update response message may be used to confirm that the N3 connection is set up.

According to the foregoing steps, the connection between the NG-(R)AN device and the first control plane functional entity is set up, and the connection between the NG-(R)AN device and the user plane functional entity is set up.

In Step 2113, the SMF 2 entity sends a terminal device IP address prompt message to the AMF entity, where the message includes an IP address allocated by the SMF 2 entity to the terminal device. Optionally, the message includes information informing the AS that the identification information of an original terminal device IP address does not need to be deleted.

In Step 2114, the AMF entity sends the terminal device IP address prompt message to the NEF, where the message includes the IP address allocated by the SMF 2 to the terminal device. Optionally, the message includes the information informing the AS that the identification information of the original terminal device IP address does not need to be deleted.

Further, in step 2115, when the terminal device needs to transmit uplink data, the terminal device sets up a wireless network connection to a target access network device. For example, when the (R)AN device is the target access network device, the terminal device sets up a wireless network connection to the (R)AN device.

Further, the connection for sending the uplink data by the terminal device is already set up. Therefore, the terminal device may send the uplink data.

In Step 2116, it should be understood that if the (R)AN device is the target access network device to which the terminal device connects, the (R)AN device may send a notification message to the AMF entity. It should be understood that the notification message is the third message in the embodiment in FIG. 4, and the notification message is used to inform the AMF entity that the (R)AN device already successfully provides a service to the terminal device. It should be understood that, the notification message includes the identification information of the terminal device.

Further, the AMF entity sends the notification message to the SMF1 entity, where the message is used to indicate that (R)AN already successfully provides the service to the terminal device, and the notification message includes the identification information of the terminal device.

In Step 2117, the SMF1 entity sends a session termination request message to the NG-UP1 entity, to instruct the NG-UP1 entity to delete the stored context information of the terminal device. After the NG-UP1 entity deletes the stored context information of the terminal device, the NG-UP 1 sends the session termination request message to the SMF1 entity.

It should be understood that when the terminal device needs to perform the downlink transmission, a transmission process with the target access network device is similar to steps 909 to 913 shown in FIG. 9, or similar to steps 1109 to 1115 shown in FIG. 11, and details are not described herein again.

The schematic flowcharts in the embodiments of this application are described above in detail from a method perspective with reference to FIG. 4 to FIG. 21, and related devices in the embodiments of this application are described below from an apparatus perspective with reference to FIG. 22 to FIG. 25.

Figure 22:
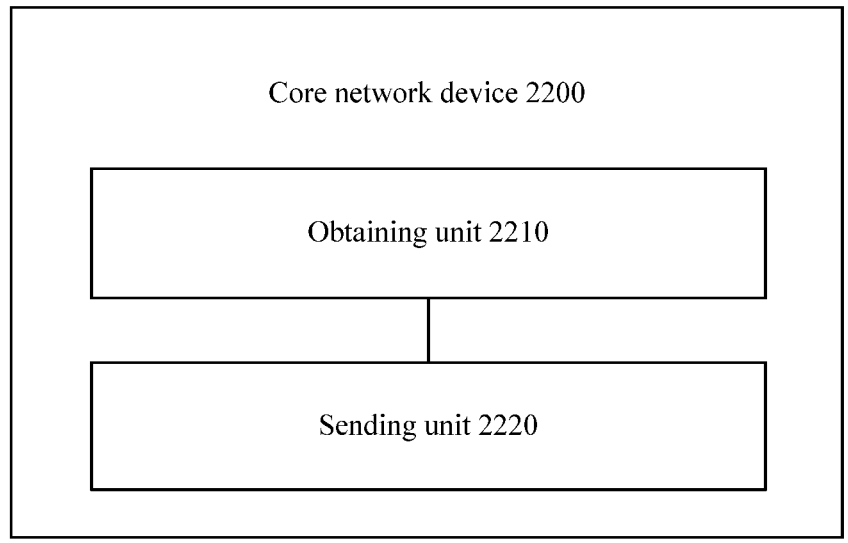
FIG. 22 is a schematic block diagram of a core network device according to an embodiment of this application.

FIG. 22 is a schematic structural block diagram of a network device according to another embodiment. FIG. 22 is a schematic block diagram of a core network device 2200 according to an embodiment of the present invention. It should be understood that the core network device 2200 can perform the steps performed by the first control plane functional entity in the methods in FIG. 4 to FIG. 21. To avoid repetition, details are not described herein again. The core network device 2200 includes: an obtaining unit 2210, configured to obtain access network information of a terminal device, where the terminal device is in an idle mode or an inactive mode; and a sending unit 2220, configured to send context information of the terminal device to an access network device based on the access network information obtained by the obtaining unit 2210.

It should be understood that the action performed by the obtaining unit 2210 may be implemented by a processor, and the action performed by the sending unit 2220 may be implemented by a transceiver under control of the processor.

Therefore, when the terminal device is in the idle mode or the inactive mode, in this embodiment of this application, the first control plane functional entity obtains the access network information of the terminal device, and pre-sends the context information of the terminal device to the access network device corresponding to the access network information. When the terminal device needs to transmit data, for example, the terminal device needs to be switched from the idle mode or the inactive mode to a connected mode, the terminal device does not need to wait for the process of transmitting the context information of the terminal device, thereby facilitating reducing a delay.

Figure 23:
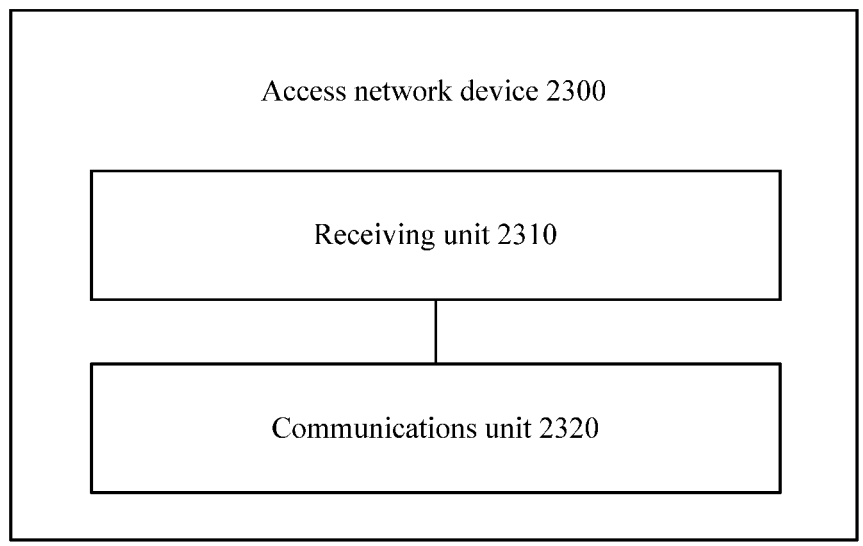
FIG. 23 is a schematic block diagram of an access network device according to an embodiment of this application.

FIG. 23 is a schematic block diagram of an access network device 2300 according to another embodiment. It should be understood that the access network device 2300 can perform the steps performed by the access network device in the methods in FIG. 4 to FIG. 21. To avoid repetition, details are not described herein again. The access network device 2300 includes: a receiving unit 2310, configured to receive context information of a terminal device that is sent by a first control plane functional entity, where the terminal device is in an idle mode or an inactive mode; and a communications unit 2320, configured to communicate with the terminal device based on the context information of the terminal device that is received by the receiving unit 2310.

It should be understood that the action performed by the obtaining unit 2310 may be implemented by a processor, and the action performed by the sending unit 2320 may be implemented by a transceiver under control of the processor.

Therefore, when the terminal device is in the idle mode or the inactive mode, in this embodiment of this application, the first control plane functional entity obtains access network information of the terminal device, and pre-sends the context information of the terminal device to the access network device corresponding to the access network information. When the terminal device needs to transmit data, for example, the terminal device needs to be switched from the idle mode or the inactive mode to a connected mode, the terminal device does not need to wait for the process of transmitting the context information of the terminal device, thereby facilitating reducing a delay.

Figure 24:
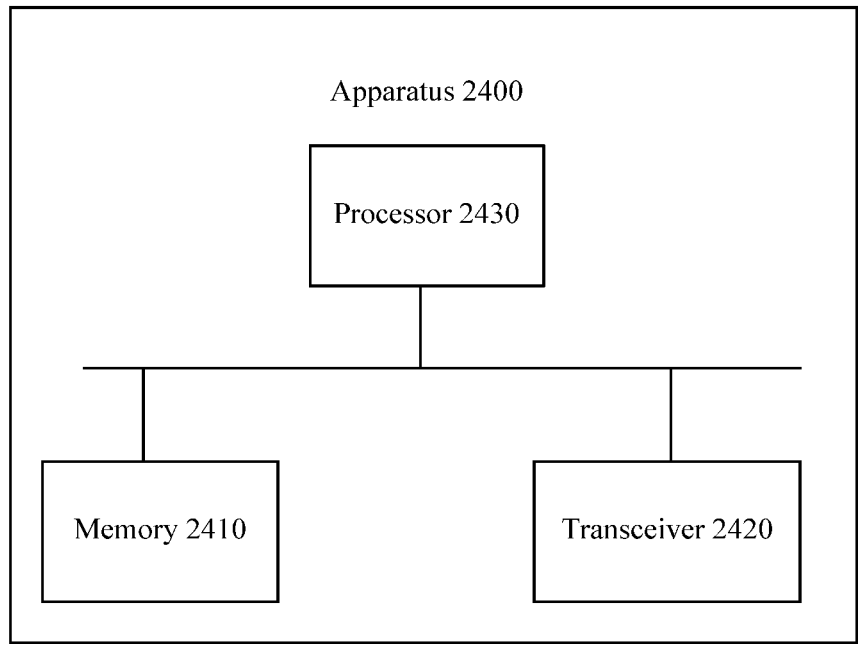
FIG. 24 is a schematic structural block diagram of an apparatus according to an embodiment of this application.

FIG. 24 is a schematic structural block diagram of an apparatus according to another embodiment. FIG. 24 shows an apparatus 2400 according to an embodiment of the present invention. It should be understood that the apparatus 2400 can perform the steps performed by the first control plane functional entity in the methods in FIG. 4 to FIG. 21. To avoid repetition, details are not described herein again. The apparatus 2400 includes: a memory 2410, configured to store a program;

a transceiver 2420, configured to communicate with another device; and a processor 2430, configured to perform the program stored in the memory 2410, where the processor 2430 is separately connected to the memory 2410 and the transceiver 2420, and is configured to perform an instruction stored in the memory 2410, to perform the following step when executing the instruction:

obtaining, by the processor 2430 by using the transceiver 2420, access network information of a terminal device, where the terminal device is in an idle mode or an inactive mode; and sending context information of the terminal device to an access network device based on the access network information.

It should be understood that the apparatus 2400 may be the first control plane functional entity in the foregoing embodiments, and may be configured to perform steps and/or procedures corresponding the first control plane functional entity in the foregoing method embodiments.

Therefore, when the terminal device is in the idle mode or the inactive mode, in this embodiment of this application, the first control plane functional entity obtains the access network information of the terminal device, and pre-sends the context information of the terminal device to the access network device corresponding to the access network information. When the terminal device needs to transmit data, For example, the terminal device needs to be switched from the idle mode or the inactive mode to a connected mode, the terminal device does not need to wait for the process of transmitting the context information of the terminal device, thereby facilitating reducing a delay.

Figure 25:
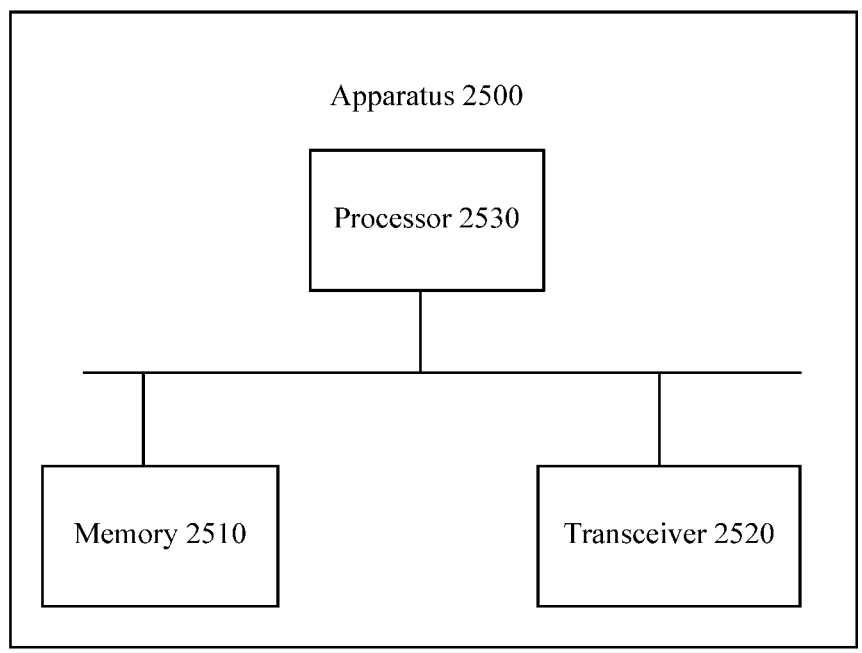
FIG. 25 is a schematic structural block diagram of an apparatus according to another embodiment of this application.

FIG. 25 is a schematic structural block diagram of an apparatus according to another embodiment. FIG. 25 shows an apparatus 2500 according to an embodiment of the present invention. It should be understood that the apparatus 2500 can perform the steps performed by the access network device in the methods in FIG. 4 to FIG. 20. To avoid repetition, details are not described herein again. The apparatus 2500 includes: a memory 2510, configured to store a program;

a transceiver 2520, configured to communicate with another device; and a processor 2530, configured to perform the program stored in the memory 2510, where the processor 2530 is separately connected to the memory 2510 and the transceiver 2520, and is configured to perform an instruction stored in the memory 2510, to perform the following step when executing the instruction:

receiving, by the processor 2530 by using the transceiver 2520, context information of the terminal device that is sent by the first control plane functional entity, where the terminal device is in an idle mode or an inactive mode; and communicating with the terminal device based on the context information of the terminal device.

It should be understood that the apparatus 2500 may be the access network device in the foregoing embodiments in FIG. 4 to FIG. 21, and may be configured to perform the steps and/or the procedures corresponding to the access network device in the foregoing method embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
    obtaining, in an obtaining step, by a first control plane functional entity, from a network capability exposure functional entity, access network information of a terminal device, wherein the terminal device is maintained in an idle mode or an inactive mode during the obtaining step;
    wherein the obtaining step further comprises:
        receiving, by the first control plane functional entity, the access network information of the terminal device from the network capability exposure functional entity; or
        receiving, by the first control plane functional entity, location prediction information of the terminal device from the network capability exposure functional entity, and obtaining the access network information of the terminal device based on the location prediction information;
    sending, by the first control plane functional entity, context information of the terminal device to an access network device different from the network capability exposure functional entity based on the access network information, wherein the access network device comprises a network device configured to communicate directly with the terminal device, and
    receiving, by the first control plane functional entity, identification information from the access network device.

2. The method according to claim 1, wherein the context information of the terminal device comprises:
    user plane context information of the terminal device; and
    control plane context information of the terminal device.

3. The method according to claim 1, further comprising:
    receiving, by the first control plane functional entity, first identification information from the access network device, the first identification information is used to identify a connection between the access network device and the first control plane functional entity.

4. The method according to claim 1, further comprising:
    receiving, by the first control plane functional entity, second identification information from the access network device, the second identification information is used to identify a connection between the access network device and a user plane functional entity;
    sending, by the first control plane functional entity, an update request message to the user plane functional entity, the update request message comprising the second identification information; and
    receiving, by the first control plane functional entity, an update response message from the user plane functional entity.

5. The method according to claim 1, wherein when the terminal device is in the inactive mode, the method further comprises:
    obtaining, by the first control plane functional entity, the context information of the terminal device from the access network device on which the terminal device currently camps.

6. The method according to claim 1, further comprising:
    obtaining, by the first control plane functional entity, current location information of the terminal device, or information about an access network device to which the terminal device connects when the terminal device is switched to a connected mode.

7. The method according to claim 6, further comprising:
sending, by the first control plane functional entity, a feedback message to the network capability exposure functional entity, the feedback message comprising the current location information of the terminal device or the information about the access network device to which the terminal device connects when the terminal device is switched to the connected mode.

8. A communication method, comprising:
receiving, in a receiving step, by an access network device comprising a network device configured to communicate directly with a terminal device, context information of the terminal device from a first control plane functional entity configured to obtain access network information of the terminal device from a network capability exposure functional entity different from the access network device and send the context information to the access network device based on one of: the access network information provided from the network capability exposure functional entity or the access network information retrieved based on location prediction information of the terminal device provided from the network capability exposure functional entity, wherein the terminal device is maintained in an idle mode or an inactive mode during the receiving step;
sending, by the access network device, identification information to the first control plane functional entity; and
transmitting, by the access network device, data with the terminal device based on the context information of the terminal device.

9. The method according to claim 8, further comprising:
sending, by the access network device, first identification information and second identification information to the first control plane functional entity, the first identification information comprising identification information of a connection between the access network device and the first control plane functional entity, and the second identification information comprising identification information of a connection between the access network device and a user plane functional entity.

10. The method according to claim 8, further comprising:
sending, by the access network device, current location information of the terminal device or information about the access network device to the first control plane functional entity.

11. A communication method, comprising:
obtaining, in an obtaining step, by a first control plane functional entity, from a network capability exposure functional entity, access network information of a terminal device, wherein the terminal device is maintained in an idle mode or an inactive mode during the obtaining step;
wherein the obtaining step further comprises:
receiving, by the first control plane functional entity, the access network information of the terminal device from the network capability exposure functional entity; or
receiving, by the first control plane functional entity, location prediction information of the terminal device from the network capability exposure functional entity, and obtaining the access network information of the terminal device based on the location prediction information;

sending, by the first control plane functional entity, context information of the terminal device to an access network device different from the network capability exposure functional entity based on the access network information, wherein the access network device comprises a network device configured to communicate directly with the terminal device;
sending, by the access network device, identification information to the first control plane functional entity; and
transmitting, by the access network device, data with the terminal device based on the context information of the terminal device.

12. The method according to claim 11, wherein the context information of the terminal device comprises:
user plane context information of the terminal device; and
control plane context information of the terminal device.

13. The method according to claim 11, method further comprising:
sending, by the access network device, first identification information to the first control plane functional entity; the first identification information is used to identify a connection between the access network device and the first control plane functional entity.

14. The method according to claim 13, further comprising:
sending, by the access network device, second identification information to the first control plane functional entity, the second identification information is used to identify a connection between the access network device and a user plane functional entity;
sending, by the first control plane functional entity, an update request message to the user plane functional entity, the update request message comprising the second identification information; and
receiving, by the first control plane functional entity, an update response message from the user plane functional entity.

15. The method according to claim 11, further comprising:
obtaining, by the first control plane functional entity, current location information of the terminal device, or information about an access network device to which the terminal device connects when the terminal device is switched to a connected mode.

16. The method according to claim 15, further comprising:
sending, by the first control plane functional entity, a feedback message to the network capability exposure functional entity, the feedback message comprising the current location information of the terminal device or the information about the access network device to which the terminal device connects when the terminal device is switched to the connected mode.

17. The method according to claim 11, further comprising:
sending, by the access network device, current location information of the terminal device or information about the access network device to the first control plane functional entity.

18. The method according to claim 11, wherein, when the terminal device is in the inactive mode, the method further comprises:
obtaining, by the first control plane functional entity, the context information of the terminal device from the access network device on which the terminal device currently camps.

* * * * *